(12) United States Patent
Lin et al.

(10) Patent No.: US 12,372,756 B2
(45) Date of Patent: Jul. 29, 2025

(54) PHOTOGRAPHING OPTICAL LENS ASSEMBLY, IMAGE CAPTURING APPARATUS AND ELECTRONIC DEVICE

(71) Applicant: LARGAN PRECISION CO., LTD., Taichung (TW)

(72) Inventors: Cheng-Chen Lin, Taichung (TW); Hsin-Hsuan Huang, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/414,630

(22) Filed: Jan. 17, 2024

(65) Prior Publication Data
US 2024/0151948 A1    May 9, 2024

Related U.S. Application Data

(63) Continuation of application No. 17/011,028, filed on Sep. 3, 2020, now Pat. No. 11,914,106, which is a continuation of application No. 15/391,085, filed on Dec. 27, 2016, now Pat. No. 10,802,251.

(60) Provisional application No. 62/378,296, filed on Aug. 23, 2016.

(51) Int. Cl.
| | | |
|---|---|---|
| G02B 13/00 | (2006.01) | |
| G02B 5/00 | (2006.01) | |
| G02B 9/60 | (2006.01) | |
| G02B 13/02 | (2006.01) | |
| G02B 27/00 | (2006.01) | |

(52) U.S. Cl.
CPC ......... *G02B 13/0045* (2013.01); *G02B 5/00* (2013.01); *G02B 9/60* (2013.01); *G02B 13/0065* (2013.01); *G02B 13/02* (2013.01); *G02B 27/0025* (2013.01)

(58) Field of Classification Search
CPC ...... G02B 13/0045; G02B 9/60; G02B 13/02; G02B 13/0065
See application file for complete search history.

(56) References Cited

U.S. PATENT DOCUMENTS

| | | |
|---|---|---|
| 2,433,438 A | 12/1947 | Cox |
| 2,596,799 A | 5/1952 | Tillyer et al. |
| 3,030,863 A | 4/1962 | Schwartz |

(Continued)

FOREIGN PATENT DOCUMENTS

| | | |
|---|---|---|
| CN | 105372792 A | 3/2016 |
| CN | 107462976 A | 12/2017 |

(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007).*

*Primary Examiner* — Cara E Rakowski
(74) *Attorney, Agent, or Firm* — McClure, Qualey & Rodack, LLP

(57) ABSTRACT

A photographing optical lens assembly includes, in order from an object side to an image side along an optical axis, a first lens element, a second lens element, a third lens element, a fourth lens element and a fifth lens element. The first lens element has positive refractive power. The second lens element has negative refractive power. The third lens element has an object-side surface being convex in a paraxial region thereof.

8 Claims, 45 Drawing Sheets

(56) References Cited

U.S. PATENT DOCUMENTS

| | | | |
|---|---|---|---|
| 3,215,037 A | 11/1965 | Ernst et al. |
| 3,502,394 A | 3/1970 | Kobayashi et al. |
| 3,552,831 A | 1/1971 | Shoemaker et al. |
| 3,774,991 A | 11/1973 | Shimizu |
| 3,868,174 A | 2/1975 | Yakota |
| 3,887,269 A | 6/1975 | Nakagawa |
| 3,922,072 A | 11/1975 | Rogers |
| 3,998,527 A | 12/1976 | Ikeda et al. |
| 4,126,378 A | 11/1978 | Ogino |
| 4,134,645 A | 1/1979 | Sugiyama |
| 4,324,458 A | 4/1982 | Sato |
| 4,338,001 A | 7/1982 | Matsui |
| 4,514,051 A | 4/1985 | Hamanishi |
| 4,659,186 A | 4/1987 | Sato et al. |
| 4,733,953 A | 3/1988 | Yamamoto et al. |
| 4,738,496 A | 4/1988 | Canzek |
| 4,747,677 A | 5/1988 | Horikawa et al. |
| 4,767,201 A | 8/1988 | Fujita et al. |
| 4,790,638 A | 12/1988 | Iwasaki et al. |
| 4,802,717 A | 2/1989 | Kebo |
| 4,983,026 A | 1/1991 | Kudo et al. |
| 4,993,817 A | 2/1991 | Hoogland |
| 5,016,994 A | 5/1991 | Braat |
| 5,208,702 A | 5/1993 | Shiraiwa |
| 5,633,736 A | 5/1997 | Griffith |
| 5,715,096 A | 2/1998 | Meyers |
| 5,745,307 A | 4/1998 | Kouthoofd et al. |
| 7,050,245 B2 | 5/2006 | Tesar et al. |
| 7,787,196 B2 | 8/2010 | Asami et al. |
| 7,889,442 B2 | 2/2011 | Suzuki et al. |
| 7,982,976 B2 | 7/2011 | Asami |
| 8,649,112 B2 | 2/2014 | Tsai et al. |
| 9,025,258 B2 | 5/2015 | Chen et al. |
| 9,341,820 B2 | 5/2016 | Chen et al. |
| 9,411,133 B1 | 8/2016 | Hsieh et al. |
| 10,386,605 B2 | 8/2019 | Chen |
| 10,802,251 B2 | 10/2020 | Lin et al. |
| 2008/0239515 A1 | 10/2008 | Asami |
| 2010/0188555 A1 | 7/2010 | Hirao |
| 2011/0310231 A1 | 12/2011 | Yamaguchi et al. |
| 2012/0212660 A1 | 8/2012 | Tang et al. |
| 2012/0314296 A1 | 12/2012 | Shabtay |
| 2013/0335605 A1* | 12/2013 | Kuo .................... G02B 13/009 359/689 |
| 2014/0015997 A1 | 1/2014 | Baba |
| 2014/0139933 A1 | 5/2014 | Chen et al. |
| 2014/0168500 A1 | 6/2014 | Chen |
| 2014/0233111 A1 | 8/2014 | Teraoka |
| 2014/0300975 A1 | 10/2014 | Tsai et al. |
| 2015/0226954 A1 | 8/2015 | Miyamoto |
| 2015/0253647 A1 | 9/2015 | Mercado |
| 2015/0309328 A1* | 10/2015 | Takakubo ...... G02B 15/144515 359/557 |
| 2016/0044250 A1* | 2/2016 | Shabtay .................... G02B 7/09 |
| 2016/0062084 A1 | 3/2016 | Chen et al. |
| 2016/0062105 A1 | 3/2016 | Kawamura |
| 2016/0139365 A1 | 5/2016 | Tang et al. |
| 2016/0301835 A1 | 10/2016 | Lin |
| 2016/0356990 A1 | 12/2016 | Liu |
| 2016/0356991 A1 | 12/2016 | Liu |
| 2017/0075096 A1 | 3/2017 | Shi |
| 2017/0139184 A1 | 5/2017 | Bae |
| 2017/0269330 A1 | 9/2017 | Jhang et al. |
| 2017/0269332 A1 | 9/2017 | Jhang |
| 2018/0003803 A1 | 1/2018 | Kakani |
| 2018/0017767 A1 | 1/2018 | Chen |
| 2018/0052234 A1 | 2/2018 | Upton |
| 2018/0239110 A1 | 8/2018 | Gong |
| 2018/0307006 A1 | 10/2018 | Kang et al. |

FOREIGN PATENT DOCUMENTS

| | | |
|---|---|---|
| CN | 107664811 A | 2/2018 |
| CN | 108663771 A | 10/2018 |
| JP | 50145226 A | 11/1975 |
| JP | 54055424 A | 5/1979 |
| JP | 58095314 A | 6/1983 |
| JP | 60023814 A | 2/1985 |
| JP | 61059409 A | 3/1986 |
| JP | S62125312 A | 6/1987 |
| JP | 62203119 A | 9/1987 |
| JP | S62217214 A | 9/1987 |
| JP | 63274904 A | 11/1988 |
| JP | 03172813 A | 7/1991 |
| JP | H03181901 A | 8/1991 |
| JP | H11133315 A | 5/1999 |
| JP | 2008250136 A | 10/2008 |
| JP | 2009069369 A | 4/2009 |
| JP | 2009294528 A | 12/2009 |
| JP | 2012003022 A | 1/2012 |
| JP | 2014206739 A | 10/2014 |
| KR | 20100001525 A | 1/2010 |
| WO | 2012176791 A1 | 12/2012 |
| WO | 2018010245 A1 | 1/2018 |
| WO | 2018058754 A1 | 4/2018 |

* cited by examiner

PHOTOGRAPHING OPTICAL LENS ASSEMBLY, IMAGE CAPTURING APPARATUS AND ELECTRONIC DEVICE

RELATED APPLICATIONS

This application is a continuation of U.S. application Ser. No. 17/011,028, filed Sep. 3, 2020, U.S. Pat. No. 11,914,106 issued on Feb. 27, 2024, which is a continuation of U.S. application Ser. No. 15/391,085, filed Dec. 27, 2016, U.S. Pat. No. 10,802,251 issued on Oct. 13, 2020, which claims priority to U.S. Provisional Application Ser. No. 62/378,296, filed Aug. 23, 2016, which is herein incorporated by reference.

BACKGROUND

Technical Field

The present disclosure relates to a photographing optical lens assembly and an image capturing apparatus. More particularly, the present disclosure relates to a photographing optical lens assembly and an image capturing apparatus with a compact size applicable to electronic devices.

Description of Related Art

With the popularity of photographing module applications, photographing modules can be utilized in electronic devices, such as various intelligent electronic devices, wearable devices, digital cameras, multiple lens devices, surveillance systems, driving recording systems, rearview camera systems and human-computer interaction platform, etc. Thus, specifications of photographing modules in response to market demands are becoming diverse and strict.

In conventional telephoto lens assemblies with smaller field of view, the volume thereof is hard to reduce due to restrictions of shape of lens surface and variations of lens material, and it cannot be balanced among molding of lens elements, assembling convenience and system sensitivity. Hence, one lens assembly which has telephoto characteristic, compactness, easy assembling and high image quality will fully satisfy market specifications and demands.

SUMMARY

According to one aspect of the present disclosure, a photographing optical lens assembly includes, in order from an object side to an image side along an optical axis, a first lens element, a second lens element, a third lens element, a fourth lens element and a fifth lens element. The first lens element has positive refractive power. The second lens element has negative refractive power. The third lens element has an object-side surface being convex in a paraxial region thereof. The photographing optical lens assembly has a total of five lens elements. When a central thickness of the second lens element is CT2, a central thickness of the fourth lens element is CT4, a focal length of the first lens element is f1, a sum of axial distances between every two of the lens elements of the photographing optical lens assembly that are adjacent to each other is $\Sigma AT$, and an axial distance between an image-side surface of the fifth lens element and an image surface is BL, the following conditions are satisfied:

$0 < CT4/CT2 < 0.58;$ $0 < f1/CT2 < 5.50;$ and $0 < \Sigma AT/BL < 0.68.$

According to another aspect of the present disclosure, a photographing optical lens assembly includes, in order from an object side to an image side along an optical axis, a first lens element, a second lens element, a third lens element, a fourth lens element and a fifth lens element. The first lens element has positive refractive power. The second lens element with negative refractive power has an object-side surface being concave in a paraxial region thereof. The third lens element has an object-side surface being convex in a paraxial region thereof. The photographing optical lens assembly has a total of five lens elements. When a central thickness of the second lens element is CT2, a central thickness of the fourth lens element is CT4, a focal length of the first lens element is f1, a focal length of the fourth lens element is f4, a curvature radius of the object-side surface of the second lens element is R3, a curvature radius of an image-side surface of the second lens element is R4, an axial distance between the third lens element and the fourth lens element is T34, and an axial distance between the fourth lens element and the fifth lens element is T45, the following conditions are satisfied:

$0 < CT4/CT2 < 0.58;$ $0 < |f1/f4| < 0.75;$ $-10.0 < (R3+R4)/(R3-R4) < 0.20;$ and $0 \le T34/T45 < 9.50.$ According to further another aspect of the present disclosure, an image capturing apparatus includes the photographing optical lens assembly of the aforementioned aspect and an image sensor, wherein the image sensor is disposed on the image surface of the photographing optical lens assembly.

According to yet another aspect of the present disclosure, an electronic device includes the image capturing apparatus of the aforementioned aspect.

According to still another aspect of the present disclosure, a photographing optical lens assembly includes, in order from an object side to an image side, a first lens element, a second lens element, a third lens element, a fourth lens element and a fifth lens element. The first lens element has positive refractive power. The second lens element has negative refractive power. The third lens element has an object-side surface being convex in a paraxial region thereof. The photographing optical lens assembly has a total of five lens elements. At least one surface of at least one of the first lens element, the second lens element, the third lens element, the fourth lens element and the fifth lens element includes at least one inflection point. When a central thickness of the second lens element is CT2, a central thickness of the fourth lens element is CT4, and an axial distance between an object-side surface of the first lens element and an image-side surface of the fifth lens element is TD, the following conditions are satisfied:

$0 < CT4/CT2 < 0.58;$ and $1.20 < TD/CT2 < 6.0.$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
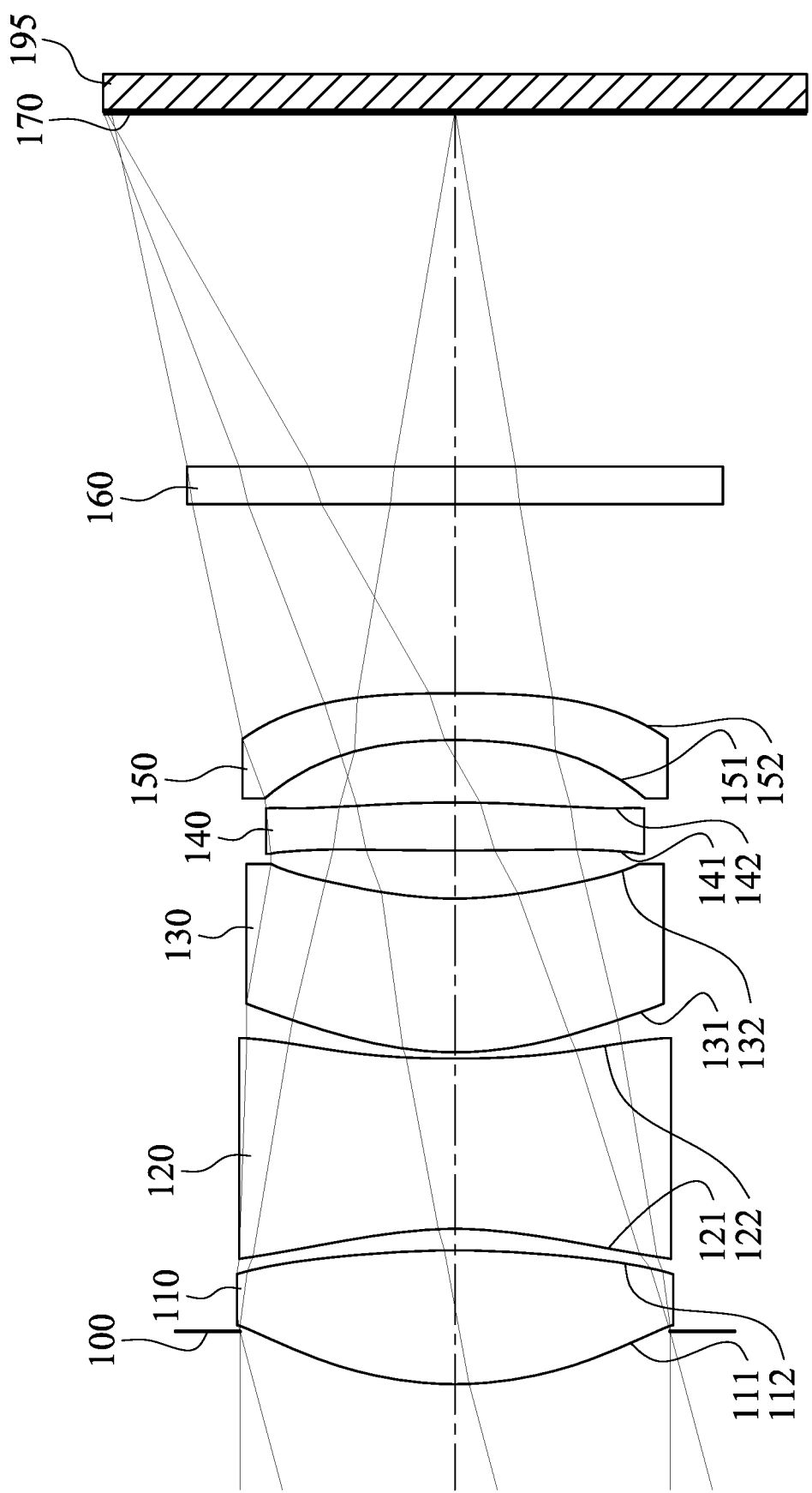
FIG. 1 is a schematic view of an image capturing apparatus according to the 1 st embodiment of the present disclosure.

A photographing optical lens assembly includes, in order from an object side to an image side along an optical axis, a first lens element, a second lens element, a third lens element, a fourth lens element and a fifth lens element, wherein the photographing optical lens assembly has a total of five lens elements.

According to the photographing optical lens assembly of the present disclosure, there is an air space between every two lens elements of the first lens element, the second lens element, the third lens element, the fourth lens element and the fifth lens element that are adjacent to each other. That is, each of the first through fifth lens elements is a single and non-cemented lens element, and there is a space between every two adjacent lens elements. Moreover, the manufacturing process of the cemented lenses is more complex than the non-cemented lenses. In particular, a cementing surface of one lens element and a cementing surface of the following lens element need to have accurate curvature to ensure these two lens elements will be highly cemented. However, during the cementing process, those two lens elements might not be highly cemented due to displacements and it is thereby not favorable for image quality of the photographing optical lens assembly. Therefore, according to the photographing optical lens assembly of the present disclosure, having an air space in a paraxial region between every two adjacent lens elements avoids the problem generated by the cemented lens elements.

The first lens element has positive refractive power, so that the main light converging ability can be provided so as to control the total track length of the photographing optical lens assembly and reduce the volume thereof.

The second lens element with negative refractive power can have an object-side surface being concave in a paraxial region thereof, so that the negative refractive power of the second lens element can be strengthened, the positive refractive power of the first lens element can be balanced, and chromatic aberrations of the photographing optical lens assembly can be corrected.

The third lens element has an object-side surface being convex in a paraxial region thereof and can have an image-side surface being concave in a paraxial region thereof. Therefore, it is favorable for enhancing image quality by correcting aberrations and astigmatism of the photographing optical lens assembly.

The fourth lens element can have positive refractive power, so that the Petzval Field can be corrected by balancing the distribution of the refractive power of the photographing optical lens assembly.

The fifth lens element can have an image-side surface being concave in a paraxial region thereof, so that the back focal length of the photographing optical lens assembly can be controlled so as to avoid the excessive total track length thereof.

At least one surface of at least one of the first lens element, the second lens element, the third lens element, the fourth lens element and the fifth lens element can include at least one inflection point. Therefore, it is favorable for reducing the incident angle on the image surface from the off-axial field of view by adjusting shape variations of the lens surfaces, so that the imaging illumination can be maintained and off-axial aberrations can be corrected effectively.

When a refractive power of the first lens element is P1, a refractive power of the second lens element is P2, a refractive power of the third lens element is P3, a refractive power of the fourth lens element is P4, and a refractive power of the fifth lens element is P5, |P1| and |P2| are two largest absolute values among |P1|, |P2|, |P3|, |P4| and |P5|. Therefore, the refractive power on the image side of the photographing optical lens assembly can be suppressed by contributing the demand refractive power from the first lens element and the second lens element, so that compactness can be obtained and the photographing optical lens assembly can be utilized widely.

At least three of the first lens element, the second lens element, the third lens element, the fourth lens element and the fifth lens element have an Abbe number smaller than 30.0. Therefore, it is favorable for converging light of different wavelengths, so that the image overlay can be avoided.

When a central thickness of the second lens element is CT2, and a central thickness of the fourth lens element is CT4, the following condition is satisfied: $0 < CT4/CT2 < 0.58$. Therefore, the incident light can be suppressed by adjusting the thickness ratio of the second lens element and the fourth lens element, so that the manufacturing yield rate of lens elements can be increased and favorable image quality can be maintained.

When a focal length of the first lens element is f1, and the central thickness of the second lens element is CT2, the following condition is satisfied: $0 < f1/CT2 < 5.50$. Therefore, it is favorable for balancing the refractive power on the object side of the photographing optical lens assembly and reducing the sensitivity thereof by properly distributing the ratio of the refractive power of the first lens element and the central thickness of the second lens element.

When a sum of axial distances between every two of the lens elements of the photographing optical lens assembly that are adjacent to each other is $\Sigma AT$, and an axial distance between an image-side surface of the fifth lens element and an image surface is BL, the following condition is satisfied: $0 < \Sigma AT/BL < 0.68$. Therefore, it is favorable for balancing characteristics between compactness and image quality and obtaining sufficient space between the lens element and the image surface to dispose other optical element by adjusting the ratio of the axial distance between the lens elements and the back focal length. Preferably, the following condition can be satisfied: $0 < \Sigma AT/BL < 0.50$. More preferably, the following condition can be satisfied: $0 < \Sigma AT/BL < 0.40$.

When the focal length of the first lens element is f1, and a focal length of the fourth lens element is f4, the following condition is satisfied: $0 < |f1/f4| < 0.90$. Therefore, it is favorable for moderating the variation of the light after incident into the photographing optical lens assembly by adjusting the distribution of the refractive power of the first lens element and the fourth lens element so as to reduce the stray light thereof. Preferably, the following condition can be satisfied: $0 < |f1/f4| < 0.75$.

When a curvature radius of the object-side surface of the second lens element is R3, and a curvature radius of an image-side surface of the second lens element is R4, the following condition is satisfied: $-10.0 < (R3+R4)/(R3-R4) < 0.20$. Therefore, it is favorable for correcting aberrations of the photographing optical lens assembly effectively by controlling the distribution of surface curvatures of the second lens element so as to enhance image quality. Preferably, the following condition can be satisfied: $-5.0 < (R3+R4)/(R3-R4) < 0$.

When an axial distance between the third lens element and the fourth lens element is T34, and an axial distance between the fourth lens element and the fifth lens element is T45, the following condition is satisfied: $0 \leq T34/T45 < 9.50$. Therefore, it is favorable for assembling of the photographing optical lens assembly by balancing axial distances of the lens elements on the image side thereof. Preferably, the following condition can be satisfied: $0.30<T34/T45<5.50$. More preferably, the following condition can be satisfied: $0.30<T34/T45<3.50$.

When a maximum optical effective radius of an object-side surface of the first lens element is Y11, and a maximum optical effective radius of the image-side surface of the fifth lens element is Y52, the following condition is satisfied: $0.55<|Y52/Y11|<1.0$. Therefore, it is favorable for reducing the outer diameter of lens barrel by controlling the ratio of the effective radii of the lens elements on the object side and the image side of the photographing optical lens assembly so as to increase flexibility of mechanism design.

When the maximum optical effective radius of the image-side surface of the fifth lens element is Y52, and an entrance pupil diameter of the photographing optical lens assembly is EPD, the following condition is satisfied: $0<|(2\times Y52)/EPD|<1.20$. Therefore, the ratio of the optical effective radius of the image-side surface of the fifth lens element and the entrance pupil diameter of the photographing optical lens assembly can be adjusted, so that the compactness can be obtained for widening the application range. Preferably, the following condition can be satisfied: $0<|(2\times Y52)/EPD|<1.0$. More preferably, the following condition can be satisfied: $0.30<|(2\times Y52)/EPD|<1.0$.

When half of a maximum field of view of the photographing optical lens assembly is HFOV, the following condition is satisfied: $|tan(HFOV)|<0.50$. Therefore, it is favorable for controlling the field of view of the photographing optical lens assembly effectively so as to comply the characteristic of the compact and telephoto photographing optical lens assembly. Preferably, the following condition can be satisfied: $|tan(HFOV)|<0.45$.

When a focal length of the photographing optical lens assembly is f, a vertical distance between an inflection point closest to the optical axis on an object-side surface of the fourth lens element and the optical axis is Yc41, a vertical distance between an inflection point closest to the optical axis on an image-side surface of the fourth lens element and the optical axis is Yc42, a vertical distance between an inflection point closest to the optical axis on an object-side surface of the fifth lens element and the optical axis is Yc51, a vertical distance between an inflection point closest to the optical axis on the image-side surface of the fifth lens element and the optical axis is Yc52, and the following condition is satisfied: $0.05<(10\times Yc4x)/f<2.5$ or $0.05<(10\times Yc5x)/f<2.5$, wherein x=1 or 2. Therefore, the telephoto effect of the photographing optical lens assembly can be performed by correcting off-axial aberrations thereof.

The photographing optical lens assembly can further include at least one prism on the optical axis. When an axial distance between an object-side surface of the first lens element and the image-side surface of the fifth lens element is TD, and a sum of light path lengths on the optical axis in the at least one prism is TP, the following condition is satisfied: $0.20<TD/TP<2.0$. Therefore, it is favorable for obtaining compactness and telephoto structure of the photographing optical lens assembly by adjusting the ratio of the total track length and the light path lengths on the optical axis in the prism. Preferably, the following condition can be satisfied: $0.20<TD/TP<1.50$.

When an axial distance between the second lens element and the third lens element is T23, the axial distance between the third lens element and the fourth lens element is T34, and the central thickness of the second lens element is CT2, the following condition is satisfied: $0<(T23+T34)/CT2<0.90$. Therefore, it is favorable for moldability and homogeneity of the lens element and increasing yield rate of assembling by controlling distances between the lens elements and the thickness of the second lens element.

When an axial distance between an object-side surface of the first lens element and the image-side surface of the fifth lens element is TD, and the central thickness of the second lens element is CT2, the following condition is satisfied: $1.20<TD/CT2<7.50$. Therefore, the proportion of the thickness of the second lens element in the photographing optical lens assembly can be controlled, so that the negative refractive power of the second lens element can be strengthened for enhancing the telephoto characteristic thereof. Preferably, the following condition can be satisfied: $1.20<TD/CT2<6.0$.

When an Abbe number of the second lens element is V2, an Abbe number of the third lens element is V3, an Abbe number of the fourth lens element is V4, and an Abbe number of the fifth lens element is V5, the following condition is satisfied: $0<(V2+V3+V4+V5)/4<35.0$. Therefore, it is favorable for forming a photographing optical lens assembly structure with small field of view and compactness by adjusting the distribution of the material of the lens elements on the image side thereof. Preferably, the following condition can be satisfied: $0<(V2+V3+V4+V5)/4<28.0$.

When a maximum image height of the photographing optical lens assembly is ImgH, and the entrance pupil diameter of the photographing optical lens assembly is EPD, the following condition is satisfied: $0.30<ImgH/EPD<1.20$. Therefore, it is favorable for ensuring the sufficient imaging illumination and maintaining the image resolution so as to provide the telephoto characteristic of the photographing optical lens assembly.

The photographing optical lens assembly can further include an aperture stop which can be located between an imaged object and the first lens element. Therefore, the telecentric effect can be obtained by adjusting the location of the aperture stop, so that the image-receiving efficiency of the image sensor can be increased.

When an axial distance between the aperture stop and the image-side surface of the fifth lens element is SD, the axial distance between the object-side surface of the first lens element and the image-side surface of the fifth lens element is TD, the following condition is satisfied: $0.60<SD/TD<0.98$. Therefore, it is favorable for controlling the location of the aperture stop to lengthen the distance between the exit pupil and the image surface, so that the telecentric effect of the photographing optical lens assembly can be obtained.

According to the photographing optical lens assembly of the present disclosure, the lens elements thereof can be made of glass or plastic materials. When the lens elements are made of glass materials, the distribution of the refractive power of the photographing optical lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the photographing optical lens assembly. Therefore, the total track length of the photographing optical lens assembly can also be reduced.

According to the photographing optical lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof. According to the photographing optical lens assembly of the present disclosure, the refractive power or the focal length of a lens element being positive or negative may refer to the refractive power or the focal length in a paraxial region of the lens element.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, the image surface of the photographing optical lens assembly, based on the corresponding image sensor, can be flat or curved. In particular, the image surface can be a curved surface being concave facing towards the object side.

According to the photographing optical lens assembly of the present disclosure, an aperture stop can be configured as a front stop or a middle stop. A front stop disposed between an object and the first lens element can provide a longer distance between an exit pupil of the photographing optical lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the photographing optical lens assembly and thereby provides a wider field of view for the same.

According to the photographing optical lens assembly of the present disclosure, the photographing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, aerial photography and wearable devices.

According to the present disclosure, an image capturing apparatus is provided. The image capturing apparatus includes the aforementioned photographing optical lens assembly and an image sensor, wherein the image sensor is disposed on the image side of the aforementioned photographing optical lens assembly, that is, the image sensor can be disposed on or near the image surface of the aforementioned photographing optical lens assembly. In the image capturing apparatus, the photographing optical lens assembly is movable for stabilizing an image, for example, the image capturing apparatus can further include an optical image stabilizer (OIS). Therefore, image quality of the photographing optical lens assembly can be further enhanced. Preferably, the image capturing apparatus can further include a barrel member, a holder member or a combination thereof.

According to the present disclosure, an electronic device is provided, which includes the aforementioned image capturing apparatus. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1st-20th specific embodiments are provided for further explanation.

1st Embodiment

Figure 2:
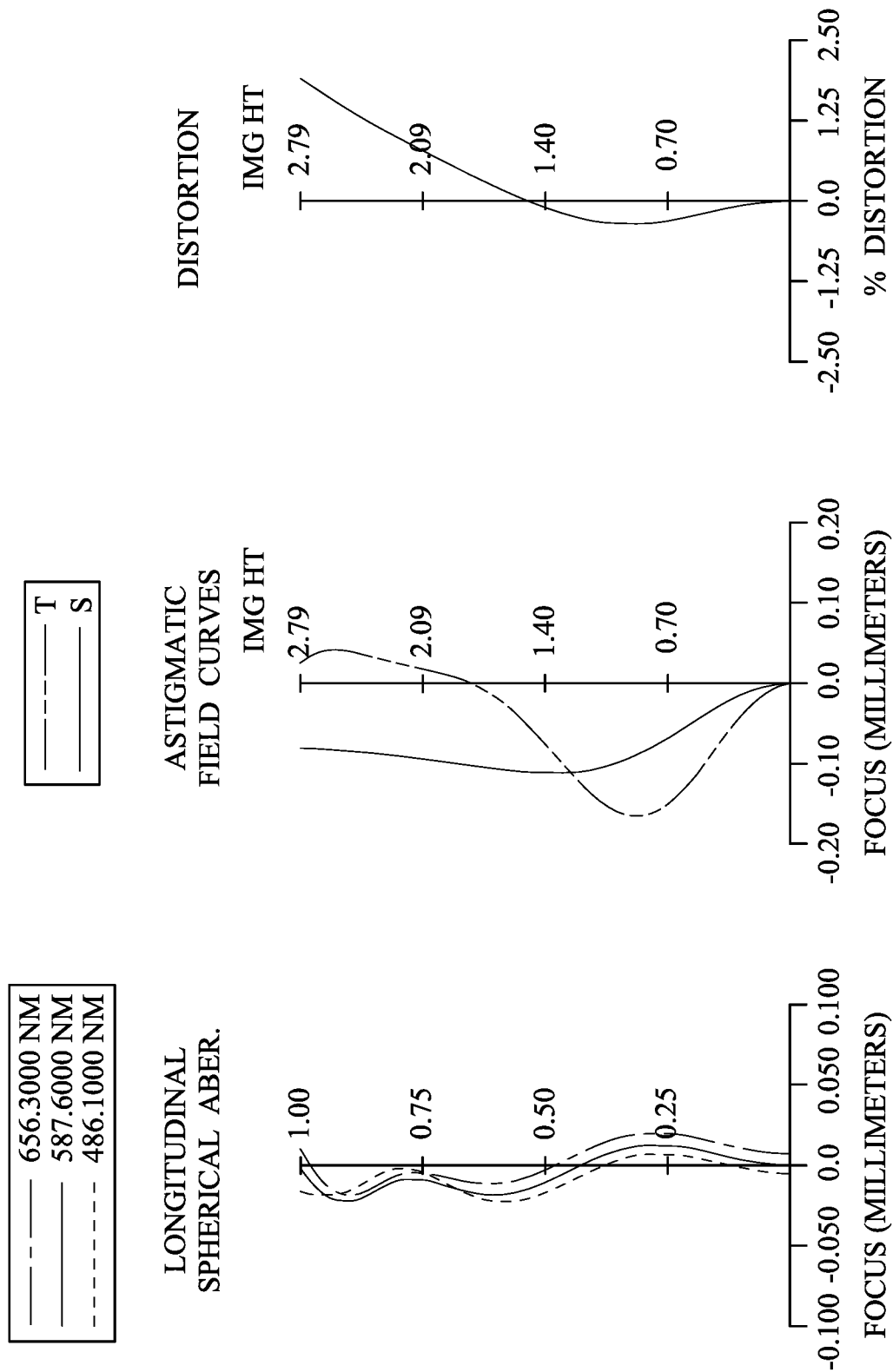
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows spherical aberration curves, astigmatic field curves and a distortion curve of the image capturing apparatus according to the 1st embodiment. In FIG. 1, the image capturing apparatus includes a photographing optical lens assembly (its reference numeral is omitted) and an image sensor 195. The photographing optical lens assembly includes, in order from an object side to an image side along an optical axis, an aperture stop 100, a first lens element 110, a second lens element 120, a third lens element 130, a fourth lens element 140, a fifth lens element 150, a filter 160 and an image surface 170, wherein the image sensor 195 is disposed on the image surface 170 of the photographing optical lens assembly. The photographing optical lens assembly has a total of five lens elements (110-150), and there is an air space between every two lens elements of the first lens element 110, the second lens element 120, the third lens element 130, the fourth lens element 140 and the fifth lens element 150 that are adjacent to each other.

The first lens element 110 with positive refractive power has an object-side surface 111 being convex in a paraxial region thereof and an image-side surface 112 being convex in a paraxial region thereof. The first lens element 110 is made of a plastic material, and has the object-side surface 111 and the image-side surface 112 being both aspheric. Furthermore, the object-side surface 111 of the first lens element 110 includes at least one inflection point.

The second lens element 120 with negative refractive power has an object-side surface 121 being concave in a paraxial region thereof and an image-side surface 122 being concave in a paraxial region thereof. The second lens element 120 is made of a plastic material, and has the object-side surface 121 and the image-side surface 122 being both aspheric. Furthermore, both of the object-side surface 121 and the image-side surface 122 of the second lens element 120 include at least one inflection point.

The third lens element 130 with positive refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of a plastic material, and has the object-side surface 141 and the image-side surface 142 being both aspheric. Furthermore, both of the object-side surface 141 and the image-side surface 142 of the fourth lens element 140 include at least one inflection point.

The fifth lens element 150 with negative refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric.

Furthermore, both of the object-side surface 151 and the image-side surface 152 of the fifth lens element 150 include at least one inflection point.

The filter 160 is made of a glass material and located between the fifth lens element 150 and the image surface 170, and will not affect the focal length of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=10.24 mm; Fno=3.00; and HFOV=15.0 degrees.

In the photographing optical lens assembly according to the 1 st embodiment, when the half of a maximum field of view of the photographing optical lens assembly is HFOV, the following condition is satisfied: |tan(HFOV)|=0.27.

In the photographing optical lens assembly according to the 1st embodiment, when an Abbe number of the second lens element 120 is V2, an Abbe number of the third lens element 130 is V3, an Abbe number of the fourth lens element 140 is V4, and an Abbe number of the fifth lens element 150 is V5, the following condition is satisfied: (V2+V3+V4+V5)/4=22.4.

In the photographing optical lens assembly according to the 1 st embodiment, when a central thickness of the second lens element 120 is CT2, and a central thickness of the fourth lens element 140 is CT4, an axial distance between the second lens element 120 and the third lens element 130 is T23, an axial distance between the third lens element 130 and the fourth lens element 140 is T34, and an axial distance between the fourth lens element 140 and the fifth lens element 150 is T45 the following conditions are satisfied: CT4/CT2=0.28; (T23+T34)/CT2=0.32; and T34/T45=0.77.

In the photographing optical lens assembly according to the 1st embodiment, when an axial distance between the object-side surface 111 of the first lens element 110 and the image-side surface 152 of the fifth lens element 150 is TD, and the central thickness of the second lens element 120 is CT2, the following condition is satisfied: TD/CT2=4.06.

In the photographing optical lens assembly according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=−0.55.

In the photographing optical lens assembly according to the 1st embodiment, when a focal length of the first lens element 110 is f1, a focal length of the fourth lens element 140 is f4, and the central thickness of the second lens element 120 is CT2, the following conditions are satisfied: f1/CT2=2.95; and |f1/f4|=0.37.

In the photographing optical lens assembly according to the 1st embodiment, when an axial distance between the first lens element 110 and the second lens element 120 is T12, the axial distance between the second lens element 120 and the third lens element 130 is T23, the axial distance between the third lens element 130 and the fourth lens element 140 is T34, the axial distance between the fourth lens element 140 and the fifth lens element 150 is T45, a sum of axial distances between every two of the lens elements of the photographing optical lens assembly that are adjacent to each other is ΣAT (that is, ΣAT=T12+T23+T34+T45), and an axial distance between the image-side surface 152 of the fifth lens element 150 and the image surface 170 is BL, the following condition is satisfied: ΣAT/BL=0.24.

In the photographing optical lens assembly according to the 1st embodiment, when a maximum optical effective radius of the object-side surface 111 of the first lens element 110 is Y11, a maximum optical effective radius of the image-side surface 152 of the fifth lens element 150 is Y52, and an entrance pupil diameter of the photographing optical lens assembly is EPD, the following conditions are satisfied: |Y52/Y11|=0.98; and |(2×Y52)/EPD|=0.99.

In the photographing optical lens assembly according to the 1st embodiment, when an axial distance between the aperture stop 100 and the image-side surface 152 of the fifth lens element 150 is SD, and the axial distance between the object-side surface 111 of the first lens element 110 and the image-side surface 152 of the fifth lens element 150 is TD, the following condition is satisfied: SD/TD=0.92.

In the photographing optical lens assembly according to the 1st embodiment, when a maximum image height of the photographing optical lens assembly is ImgH (half of a diagonal length of an effective photosensitive area of the image sensor 195), and an entrance pupil diameter of the photographing optical lens assembly is EPD, the following condition is satisfied: ImgH/EPD=0.82.

Figure 37:
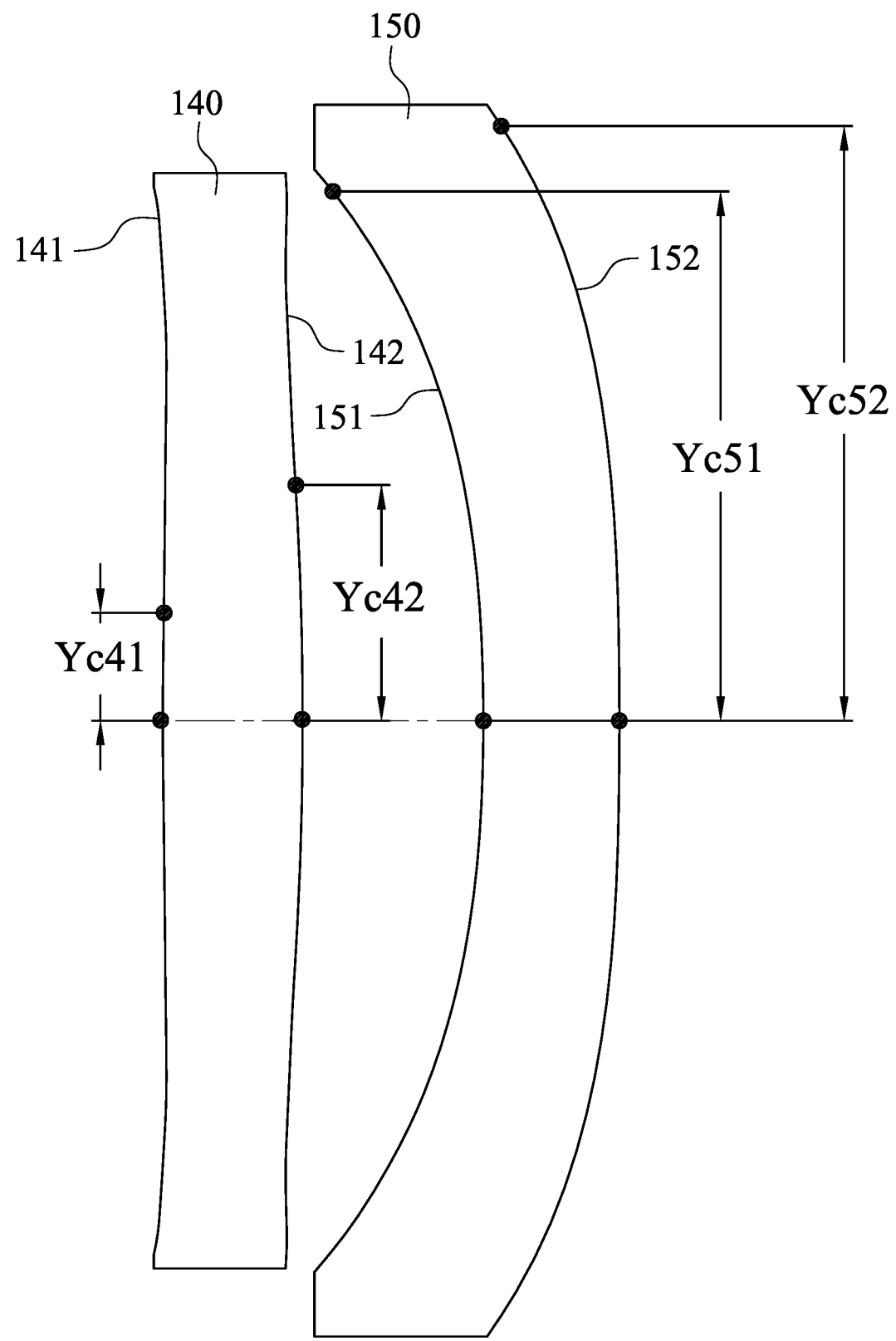
FIG. 37 is a schematic view of parameter Yc41, Yc42, Yc51 and Yc52 of the photographing optical lens assembly of FIG. 1.

FIG. 37 is a schematic view of parameters Yc41, Yc42, Yc51 and Yc52 of the photographing optical lens assembly of FIG. 1. In FIG. 37, when the focal length of the photographing optical lens assembly is f, a vertical distance between an inflection point closest to the optical axis on the object-side surface 141 of the fourth lens element 140 and the optical axis is Yc41, a vertical distance between an inflection point closest to the optical axis on the image-side surface 142 of the fourth lens element 140 and the optical axis is Yc42, a vertical distance between an inflection point closest to the optical axis on the object-side surface 151 of the fifth lens element 150 and the optical axis is Yc51, and a vertical distance between an inflection point closest to the optical axis on the image-side surface 152 of the fifth lens element 150 and the optical axis is Yc52, the following conditions are satisfied: (10×Yc41)/f=0.29; (10×Yc42)/f=0.63; (10×Yc51)/f=1.47; and (10×Yc52)/f=1.62.

The detailed optical data of the 1 st embodiment are shown in Table 1 and the aspheric surface data are shown in Table 2 below.

TABLE 1

1st Embodiment
f = 10.24 mm, Fno = 3.00, HFOV = 15.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.418 | | | | |
| 2 | Lens 1 | 2.942 | ASP | 1.062 | Plastic | 1.545 | 56.0 | 3.98 |
| 3 | | −7.202 | ASP | 0.171 | | | | |
| 4 | Lens 2 | −3.151 | ASP | 1.351 | Plastic | 1.614 | 26.0 | −3.84 |
| 5 | | 10.908 | ASP | 0.050 | | | | |
| 6 | Lens 3 | 2.874 | ASP | 1.220 | Plastic | 1.671 | 19.5 | 22.36 |
| 7 | | 2.949 | ASP | 0.380 | | | | |
| 8 | Lens 4 | 12.992 | ASP | 0.382 | Plastic | 1.660 | 20.4 | 10.68 |
| 9 | | −15.230 | ASP | 0.495 | | | | |
| 10 | Lens 5 | −5.055 | ASP | 0.372 | Plastic | 1.634 | 23.8 | −11.28 |
| 11 | | −17.742 | ASP | 1.500 | | | | |
| 12 | Filter | Plano | | 0.300 | Glass | 1.517 | 64.2 | — |
| 13 | | Plano | | 2.814 | | | | |
| 14 | Image | Plano | | — | | | | |

Reference wavelength is 587.6 nm (d-line).

TABLE 2

Aspheric Coefficients

| Surface # | 2 | 3 | 4 | 5 | 6 |
|---|---|---|---|---|---|
| k= | −1.9357E−01 | 4.3089E−01 | −2.3443E+00 | 2.5780E+01 | −3.5662E−01 |
| A4= | −3.0737E−03 | 1.8183E−02 | 5.6126E−02 | 5.8511E−02 | −4.5426E−03 |
| A6= | −1.4078E−03 | −8.2376E−03 | −2.5780E−02 | −5.7532E−02 | −1.2839E−02 |
| A8= | 8.2386E−04 | 2.5022E−03 | 8.4219E−03 | 2.6300E−02 | −1.6965E−03 |
| A10= | −5.8941E−04 | −1.4182E−03 | −2.2988E−03 | −4.9505E−03 | 7.5824E−03 |
| A12= | 1.5030E−04 | 5.2619E−04 | 5.6562E−04 | −5.3277E−04 | −3.5507E−03 |
| A14= | −2.1177E−05 | −7.3420E−05 | −6.8904E−05 | 2.2291E−04 | 5.2388E−04 |

| Surface # | 7 | 8 | 9 | 10 | 11 |
|---|---|---|---|---|---|
| k= | 1.2147E+00 | −3.5593E+00 | 4.9137E+01 | −2.7612E+01 | 4.8206E+01 |
| A4= | −9.3182E−02 | −8.0541E−02 | −4.5564E−02 | −9.0423E−02 | −6.3676E−02 |
| A6= | 9.8079E−02 | −1.4709E−02 | −5.5895E−02 | −9.0067E−02 | 2.2143E−02 |
| A8= | −7.0749E−02 | 3.5955E−01 | 4.1960E−01 | 3.4843E−01 | 1.8183E−02 |
| A10= | 1.3129E−02 | −5.7337E−01 | −6.1046E−01 | −4.4020E−01 | −3.6778E−02 |
| A12= | 6.7491E−03 | 3.8815E−01 | 3.9980E−01 | 2.7153E−01 | 2.2990E−02 |
| A14= | −2.1697E−03 | −1.2253E−01 | −1.2441E−01 | −8.2276E−02 | −6.4695E−03 |
| A16= | | 1.4786E−02 | 1.4922E−02 | 9.7895E−03 | 6.9134E−04 |

In Table 1, the curvature radius, the thickness and the focal length are shown in millimeters (mm). Surface numbers 0-14 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

According to the 1st embodiment of the present disclosure, when a refractive power of the first lens element 110 is P1 (which is f/f1, a ratio value of the focal length of the photographing optical lens assembly f and the focal length of the first lens element f1), a refractive power of the second lens element 120 is P2 (which is f/f2, a ratio value of the focal length of the photographing optical lens assembly f and a focal length of the second lens element f2), a refractive power of the third lens element 130 is P3 (which is f/f3, a ratio value of the focal length of the photographing optical lens assembly f and a focal length of the third lens element f3), a refractive power of the fourth lens element 140 is P4 (which is f/f4, a ratio value of the focal length of the photographing optical lens assembly f and the focal length of the fourth lens element f4), a refractive power of the fifth lens element 150 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 1st embodiment of the present disclosure, when at least three of the first lens element 110, the second lens element 120, the third lens element 130, the fourth lens element 140 and the fifth lens element 150 have an Abbe number smaller than 30.0. In detail, all of the Abbe numbers of the second lens element 120, the third lens element 130, the fourth lens element 140 and the fifth lens element 150 are smaller than 30.0.

2nd Embodiment

Figure 3:
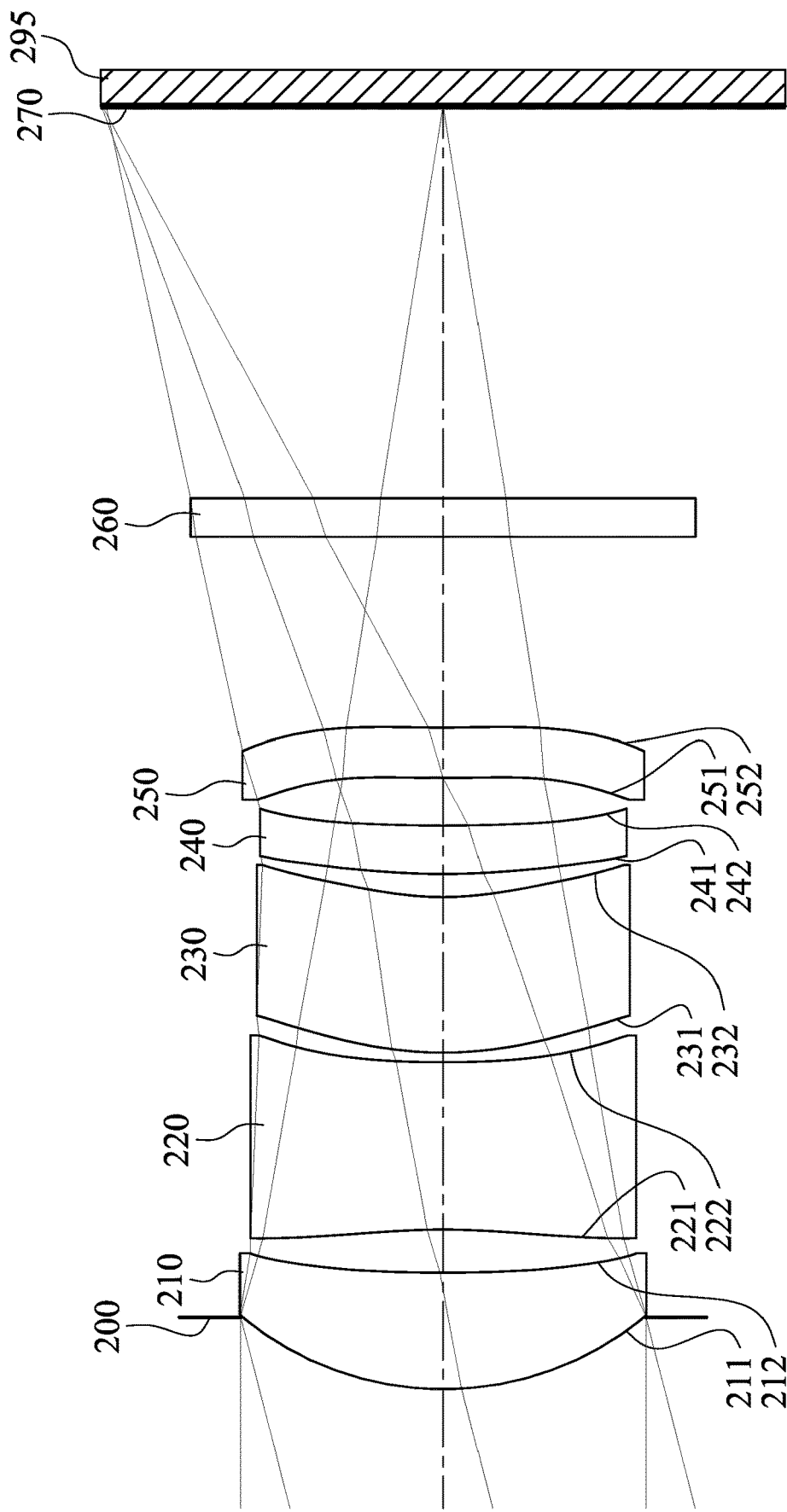
FIG. 3 is a schematic view of an image capturing apparatus according to the 2nd embodiment of the present disclosure.
Figure 4:
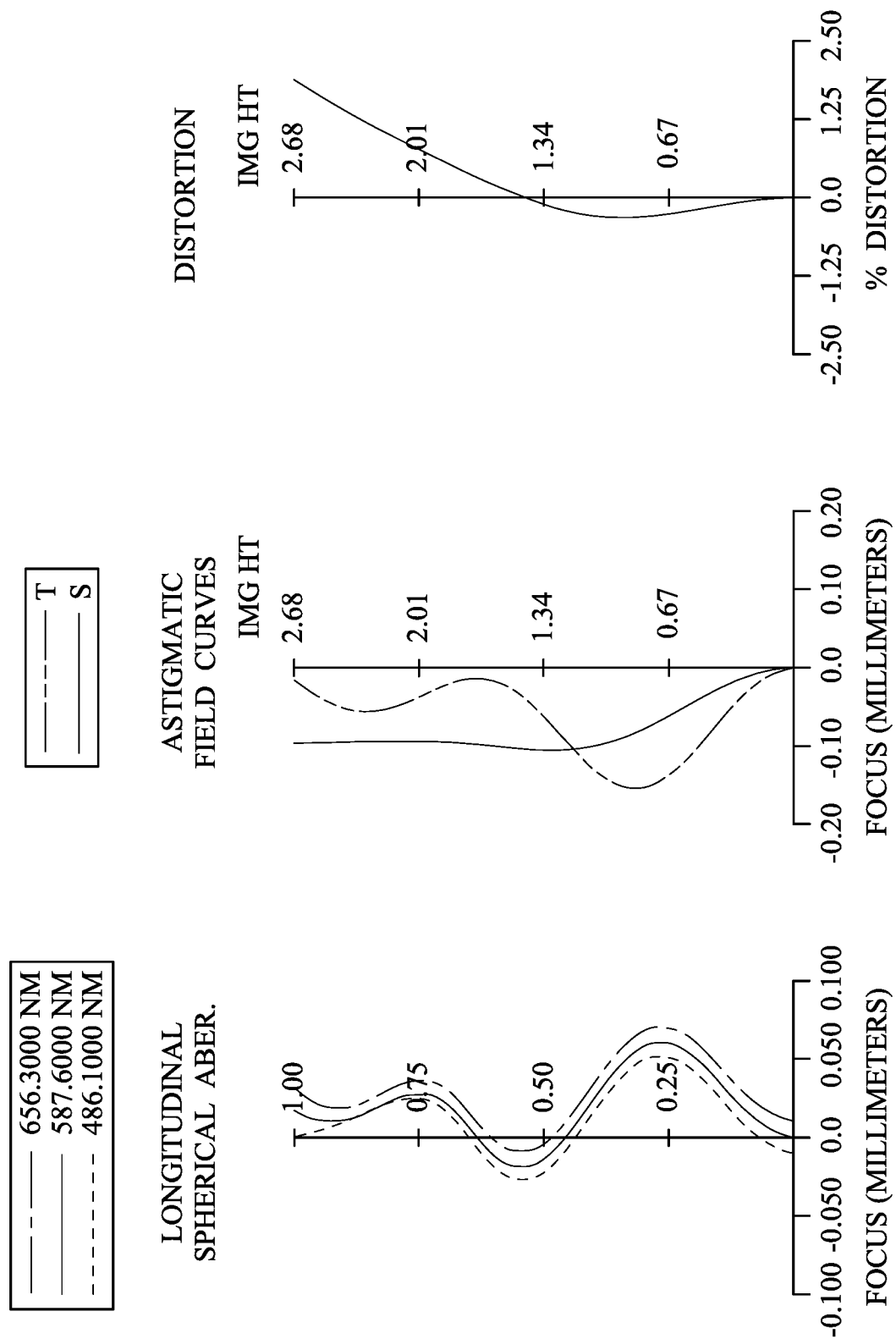
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows spherical aberration curves, astigmatic field curves and a distortion curve of the image capturing apparatus according to the 2nd embodiment. In FIG. 3, the image capturing apparatus includes a photographing optical lens assembly (its reference numeral is omitted) and an image sensor 295. The photographing optical lens assembly includes, in order from an object side to an image side along an optical axis, an aperture stop 200, a first lens element 210, a second lens element 220, a third lens element 230, a fourth lens element 240, a fifth lens element 250, a filter 260 and an image surface 270, wherein the image sensor 295 is disposed on the image surface 270 of the photographing optical lens assembly. The photographing optical lens assembly has a total of five lens elements (210-250), and there is an air space between every two lens elements of the first lens element 210, the second lens element 220, the third lens element 230, the fourth lens element 240 and the fifth lens element 250 that are adjacent to each other.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of a plastic material, and has the object-side surface 221 and the image-side surface 222 being both aspheric. Furthermore, both of the object-side surface 221 and the image-side surface 222 of the second lens element 220 include at least one inflection point.

The third lens element 230 with positive refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric. Furthermore, both of the object-side surface 231 and the image-side surface 232 of the third lens element 230 include at least one inflection point.

The fourth lens element 240 with positive refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric. Furthermore, the object-side surface 241 of the fourth lens element 240 includes at least one inflection point.

The fifth lens element 250 with positive refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric. Furthermore, both of the object-side surface 251 and the image-side surface 252 of the fifth lens element 250 include at least one inflection point.

The filter 260 is made of a glass material and located between the fifth lens element 250 and the image surface 270, and will not affect the focal length of the photographing optical lens assembly.

The detailed optical data of the 2nd embodiment are shown in Table 3 and the aspheric surface data are shown in Table 4 below.

TABLE 3

2nd Embodiment
f = 10.17 mm, Fno = 3.20, HFOV = 14.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.566 | | | | |
| 2 | Lens 1 | 2.484 | ASP | 0.917 | Plastic | 1.545 | 56.0 | 5.33 |
| 3 | | 14.927 | ASP | 0.339 | | | | |
| 4 | Lens 2 | −5.400 | ASP | 1.312 | Plastic | 1.634 | 23.8 | −5.52 |
| 5 | | 10.901 | ASP | 0.075 | | | | |
| 6 | Lens 3 | 2.968 | ASP | 1.220 | Plastic | 1.634 | 23.8 | 96.22 |
| 7 | | 2.622 | ASP | 0.181 | | | | |
| 8 | Lens 4 | 6.118 | ASP | 0.380 | Plastic | 1.639 | 23.5 | 20.71 |
| 9 | | 11.108 | ASP | 0.377 | | | | |
| 10 | Lens 5 | 12.285 | ASP | 0.391 | Plastic | 1.660 | 20.4 | 222.84 |
| 11 | | 13.236 | ASP | 1.500 | | | | |
| 12 | Filter | Plano | | 0.300 | Glass | 1.517 | 64.2 | — |
| 13 | | Plano | | 3.080 | | | | |
| 14 | Image | Plano | | — | | | | |

Reference wavelength is 587.6 nm (d-line).

TABLE 4

| Aspheric Coefficients | | | | | |
|---|---|---|---|---|---|
| Surface # | 2 | 3 | 4 | 5 | 6 |
| k= | 5.4787E−02 | 9.0000E+01 | −1.4669E+00 | 3.5479E+01 | −4.6147E−01 |
| A4= | −3.8154E−04 | 2.1977E−02 | 5.5546E−02 | 6.3873E−02 | −2.8516E−03 |
| A6= | −5.7682E−04 | −2.4280E−02 | −2.5244E−02 | −5.4551E−02 | −1.9166E−02 |
| A8= | 9.1033E−04 | 2.7722E−02 | 8.6513E−03 | 2.7533E−02 | −1.3417E−02 |
| A10= | −6.2710E−04 | −2.1041E−02 | −2.3530E−03 | −4.4088E−03 | 3.2888E−02 |
| A12= | 1.6935E−04 | 7.9964E−03 | 5.7301E−04 | −5.0265E−04 | −1.7422E−02 |
| A14= | −6.4078E−06 | −1.1681E−03 | −5.5022E−05 | 5.6240E−06 | 2.9088E−03 |
| Surface # | 7 | 8 | 9 | 10 | 11 |
| k= | 4.6878E−01 | −3.3007E+00 | 4.9933E+01 | −2.7703E+01 | 4.8081E+01 |
| A4= | −2.4315E−02 | 7.2102E−02 | 4.6257E−02 | −4.4115E−02 | −6.5778E−02 |
| A6= | −1.7817E−01 | −4.1735E−01 | −4.0315E−01 | −2.7098E−01 | −4.6896E−02 |
| A8= | 2.9977E−01 | 7.6730E−01 | 8.8411E−01 | 5.6155E−01 | 1.1458E−01 |
| A10= | −2.2918E−01 | −6.6345E−01 | −8.8015E−01 | −5.2637E−01 | −1.0164E−01 |
| A12= | 8.5134E−02 | 2.8455E−01 | 4.5129E−01 | 2.5970E−01 | 4.6174E−02 |
| A14= | −1.2274E−02 | −5.4949E−02 | −1.1605E−01 | −6.4874E−02 | −1.0596E−02 |
| A16= | | 3.1481E−03 | 1.1839E−02 | 6.4603E−03 | 9.7017E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 10.17 | |f1/f4| | 0.26 |
| Fno | 3.20 | ΣAT/BL | 0.20 |
| HFOV [deg.] | 14.5 | |Y52/Y11| | 0.99 |
| |tan(HFOV)| | 0.26 | |(2 × Y52)/EPD| | 0.99 |
| (V2 + V3 + V4 + V5)/4 | 22.9 | SD/TD | 0.89 |
| CT4/CT2 | 0.29 | ImgH/EPD | 0.84 |
| (T23 + T34)/CT2 | 0.20 | (10 × Yc41)/f | 1.02 |
| T34/T45 | 0.48 | (10 × Yc42)/f | — |
| TD/CT2 | 3.96 | (10 × Yc51)/f | 0.29 |
| (R3 + R4)/(R3 − R4) | −0.34 | (10 × Yc52)/f | 0.30 |
| f1/CT2 | 4.07 | | |

According to the 2nd embodiment of the present disclosure, when a refractive power of the first lens element 210 is P1 (which is f/f1, a ratio value of the focal length of the photographing optical lens assembly f and the focal length of the first lens element f1), a refractive power of the second lens element 220 is P2 (which is f/f2, a ratio value of the focal length of the photographing optical lens assembly f and a focal length of the second lens element f2), a refractive power of the third lens element 230 is P3 (which is f/f3, a ratio value of the focal length of the photographing optical lens assembly f and a focal length of the third lens element f3), a refractive power of the fourth lens element 240 is P4 (which is f/f4, a ratio value of the focal length of the photographing optical lens assembly f and the focal length of the fourth lens element f4), a refractive power of the fifth lens element 250 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 2nd embodiment of the present disclosure, when at least three of the first lens element 210, the second lens element 220, the third lens element 230, the fourth lens element 240 and the fifth lens element 250 have an Abbe number smaller than 30.0. In detail, all of the Abbe numbers of the second lens element 220, the third lens element 230, the fourth lens element 240 and the fifth lens element 250 are smaller than 30.0.

3rd Embodiment

Figure 5:
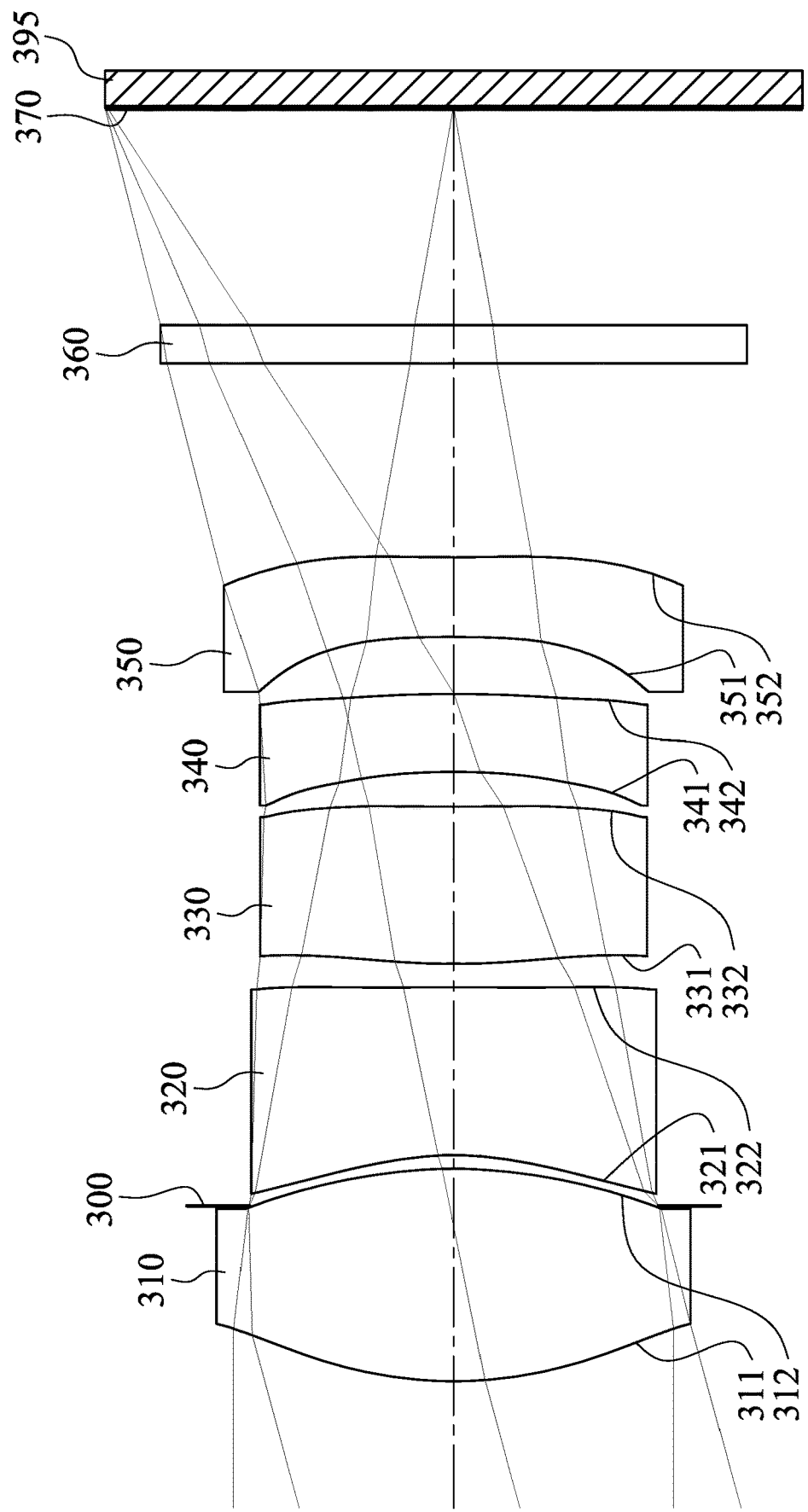
FIG. 5 is a schematic view of an image capturing apparatus according to the 3rd embodiment of the present disclosure.
Figure 6:
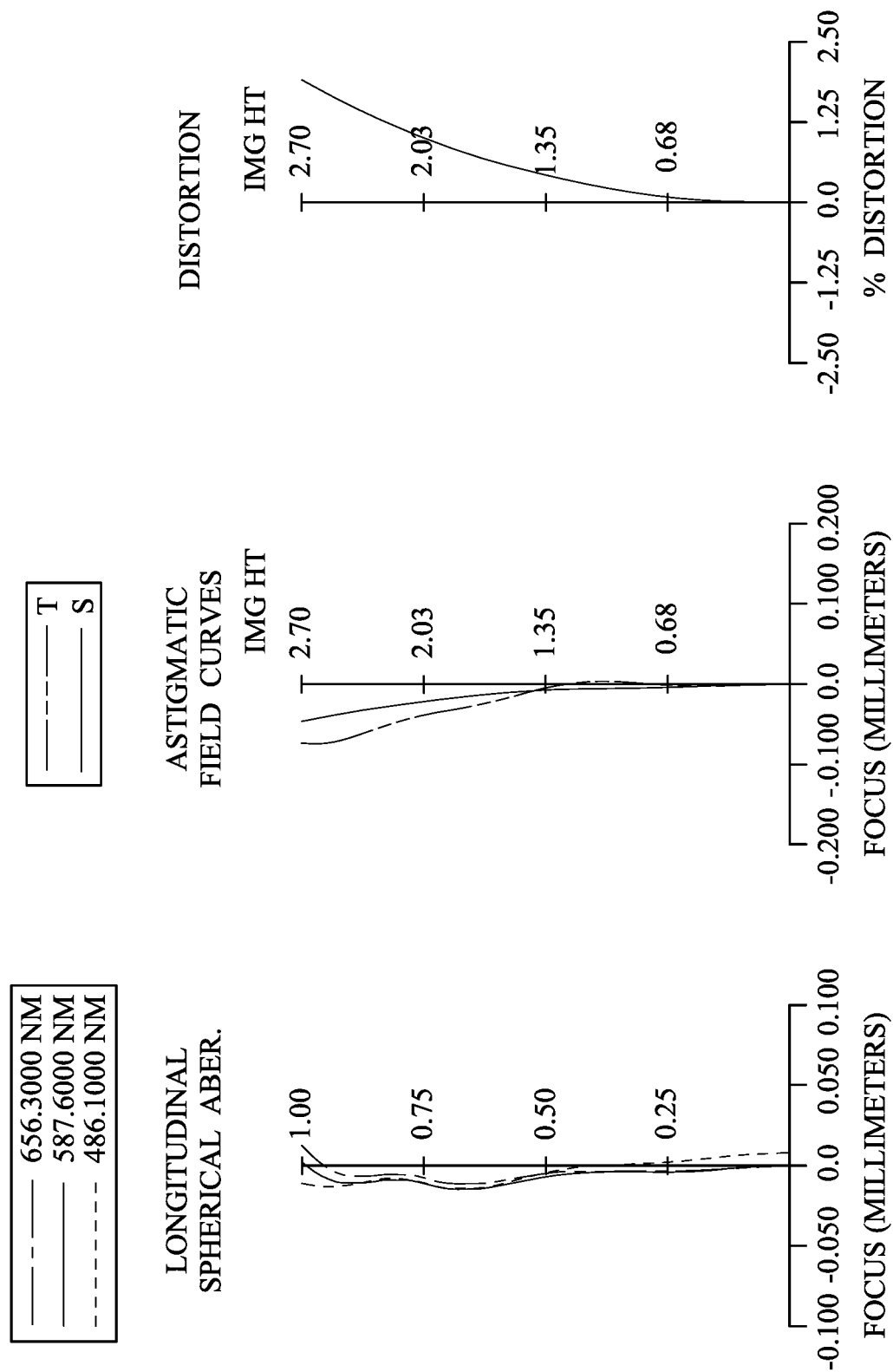
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows spherical aberration curves, astigmatic field curves and a distortion curve of the image capturing apparatus according to the 3rd embodiment. In FIG. 5, the image capturing apparatus includes a photographing optical lens assembly (its reference numeral is omitted) and an image sensor 395. The photographing optical lens assembly includes, in order from an object side to an image side along an optical axis, a first lens element 310, an aperture stop 300, a second lens element 320, a third lens element 330, a fourth lens element 340, a fifth lens element 350, a filter 360 and an image surface 370, wherein the image sensor 395 is disposed on the image surface 370 of the photographing optical lens assembly. The photographing optical lens assembly has a total of five lens elements (310-350), and there is an air space between every two lens elements of the first lens element 310, the second lens element 320, the third lens element 330, the fourth lens element 340 and the fifth lens element 350 that are adjacent to each other.

The first lens element 310 with positive refractive power has an object-side surface 311 being convex in a paraxial region thereof and an image-side surface 312 being convex in a paraxial region thereof. The first lens element 310 is made of a plastic material, and has the object-side surface 311 and the image-side surface 312 being both aspheric. Furthermore, the object-side surface 311 of the first lens element 310 includes at least one inflection point.

The second lens element 320 with negative refractive power has an object-side surface 321 being concave in a paraxial region thereof and an image-side surface 322 being convex in a paraxial region thereof. The second lens element 320 is made of a plastic material, and has the object-side surface 321 and the image-side surface 322 being both aspheric. Furthermore, both of the object-side surface 321 and the image-side surface 322 of the second lens element 320 include at least one inflection point.

The third lens element 330 with positive refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric. Furthermore, both of the object-side surface 331 and the image-side surface 332 of the third lens element 330 include at least one inflection point.

The fourth lens element 340 with negative refractive power has an object-side surface 341 being concave in a paraxial region thereof and an image-side surface 342 being convex in a paraxial region thereof. The fourth lens element 340 is made of a plastic material, and has the object-side surface 341 and the image-side surface 342 being both aspheric. Furthermore, both of the object-side surface 341 and the image-side surface 342 of the fourth lens element 340 include at least one inflection point.

The fifth lens element 350 with negative refractive power has an object-side surface 351 being concave in a paraxial region thereof and an image-side surface 352 being concave in a paraxial region thereof. The fifth lens element 350 is made of a plastic material, and has the object-side surface 351 and the image-side surface 352 being both aspheric. Furthermore, both of the object-side surface 351 and the image-side surface 352 of the fifth lens element 350 include at least one inflection point.

The filter 360 is made of a glass material and located between the fifth lens element 350 and the image surface 370, and will not affect the focal length of the photographing optical lens assembly.

The detailed optical data of the 3rd embodiment are shown in Table 5 and the aspheric surface data are shown in Table 6 below.

TABLE 5

3rd Embodiment
f = 9.71 mm, Fno = 2.85, HFOV = 15.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.221 | ASP | 1.648 | Plastic | 1.545 | 56.0 | 3.38 |
| 2 | | −3.525 | ASP | −0.290 | | | | |
| 3 | Ape. Stop | Plano | | 0.395 | | | | |
| 4 | Lens 2 | −2.422 | ASP | 1.304 | Plastic | 1.582 | 30.2 | −4.74 |
| 5 | | −23.497 | ASP | 0.178 | | | | |
| 6 | Lens 3 | 7.025 | ASP | 1.220 | Plastic | 1.650 | 21.5 | 16.58 |
| 7 | | 18.785 | ASP | 0.272 | | | | |
| 8 | Lens 4 | −5.578 | ASP | 0.601 | Plastic | 1.639 | 23.5 | −16.82 |
| 9 | | −12.090 | ASP | 0.443 | | | | |
| 10 | Lens 5 | −12.634 | ASP | 0.619 | Plastic | 1.559 | 40.4 | −11.58 |
| 11 | | 13.493 | ASP | 1.500 | | | | |
| 12 | Filter | Plano | | 0.300 | Glass | 1.517 | 64.2 | — |
| 13 | | Plano | | 1.682 | | | | |
| 14 | Image | Plano | | — | | | | |

Reference wavelength is 587.6 nm (d-line).

TABLE 6

Aspheric Coefficients

| Surface # | 1 | 2 | 4 | 5 | 6 |
|---|---|---|---|---|---|
| k= | −1.9650E−01 | −1.9743E+00 | −2.0928E+00 | −1.4550E+01 | 7.5337E+00 |
| A4= | −2.9302E−03 | 2.1169E−02 | 5.6333E−02 | 5.8327E−02 | 1.2770E−02 |
| A6= | −1.8110E−03 | −9.3091E−03 | −2.4195E−02 | −5.7175E−02 | −5.7611E−02 |
| A8= | 8.2200E−04 | 2.6509E−03 | 8.2011E−03 | 2.6372E−02 | 3.8114E−02 |
| A10= | −5.2381E−04 | −1.2849E−03 | −2.4106E−03 | −5.0679E−03 | −1.2187E−02 |
| A12= | 1.1515E−04 | 4.5374E−04 | 6.2247E−04 | −3.7894E−04 | 1.5618E−03 |
| A14= | −1.2480E−05 | −6.2452E−05 | −7.9879E−05 | 1.8863E−04 | −2.5143E−05 |

| Surface # | 7 | 8 | 9 | 10 | 11 |
|---|---|---|---|---|---|
| k= | −4.4314E+00 | −3.2468E+00 | 4.9993E+01 | −2.7703E+01 | 4.7913E+01 |
| A4= | −2.2787E−02 | −5.7539E−03 | 5.0354E−03 | −8.5672E−02 | −6.7363E−02 |
| A6= | −1.0370E−01 | −1.5889E−01 | −1.0032E−01 | −6.3909E−02 | 2.2779E−03 |
| A8= | 1.6901E−01 | 3.2453E−01 | 2.4584E−01 | 1.6228E−01 | 2.5165E−02 |
| A10= | −1.0814E−01 | −2.5139E−01 | −2.1782E−01 | −1.3515E−01 | −2.2088E−02 |
| A12= | 3.0253E−02 | 8.3758E−02 | 9.1192E−02 | 5.4840E−02 | 8.7131E−03 |
| A14= | −2.9832E−03 | −9.9949E−03 | −1.8690E−02 | −1.1581E−02 | −1.6725E−03 |
| A16= | | −2.6125E−05 | 1.5911E−03 | 1.1057E−03 | 1.2538E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 9.71 | \|f1/f4\| | 0.20 |
| Fno | 2.85 | ΣAT/BL | 0.29 |
| HFOV [deg.] | 15.3 | \|Y52/Y11\| | 0.97 |
| \|tan(HFOV)\| | 0.27 | \|(2 × Y52)/EPD\| | 1.04 |
| (V2 + V3 + V4 + V5)/4 | 28.9 | SD/TD | 0.79 |
| CT4/CT2 | 0.46 | ImgH/EPD | 0.79 |
| (T23 + T34)/CT2 | 0.35 | (10 × Yc41)/f | 1.43 |
| T34/T45 | 0.61 | (10 × Yc42)/f | 0.74 |
| TD/CT2 | 4.90 | (10 × Yc51)/f | 1.51 |
| (R3 + R4)/(R3 − R4) | −1.23 | (10 × Yc52)/f | 0.33 |
| f1/CT2 | 2.59 | | |

According to the 3rd embodiment of the present disclosure, when a refractive power of the first lens element 310 is P1 (which is f/f1, a ratio value of the focal length of the photographing optical lens assembly f and the focal length of the first lens element f1), a refractive power of the second lens element 320 is P2 (which is f/f2, a ratio value of the focal length of the photographing optical lens assembly f and a focal length of the second lens element f2), a refractive power of the third lens element 330 is P3 (which is f/f3, a ratio value of the focal length of the photographing optical lens assembly f and a focal length of the third lens element f3), a refractive power of the fourth lens element 340 is P4 (which is f/f4, a ratio value of the focal length of the photographing optical lens assembly f and the focal length of the fourth lens element f4), a refractive power of the fifth lens element 350 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

4th Embodiment

Figure 7:
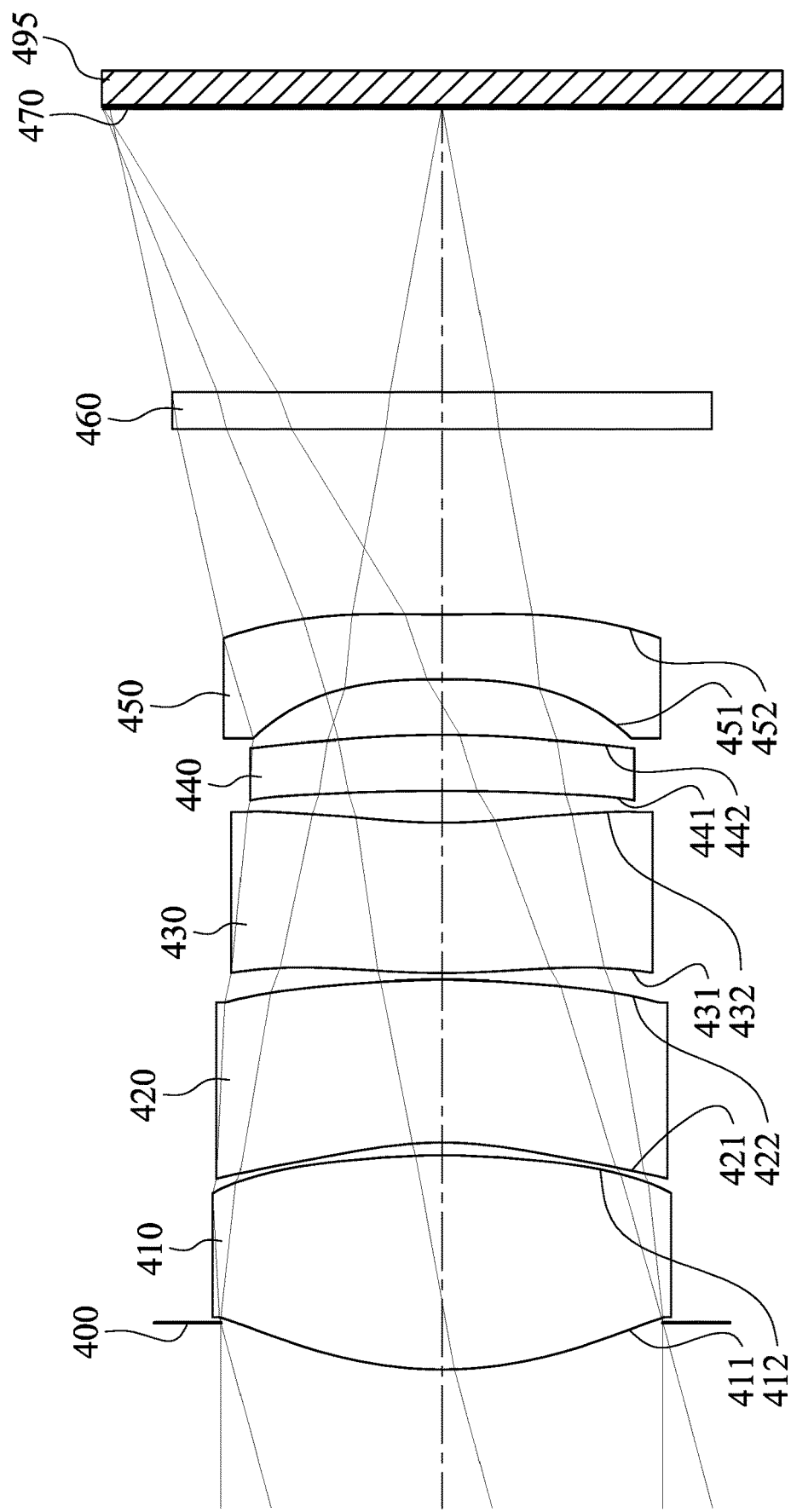
FIG. 7 is a schematic view of an image capturing apparatus according to the 4th embodiment of the present disclosure.
Figure 8:
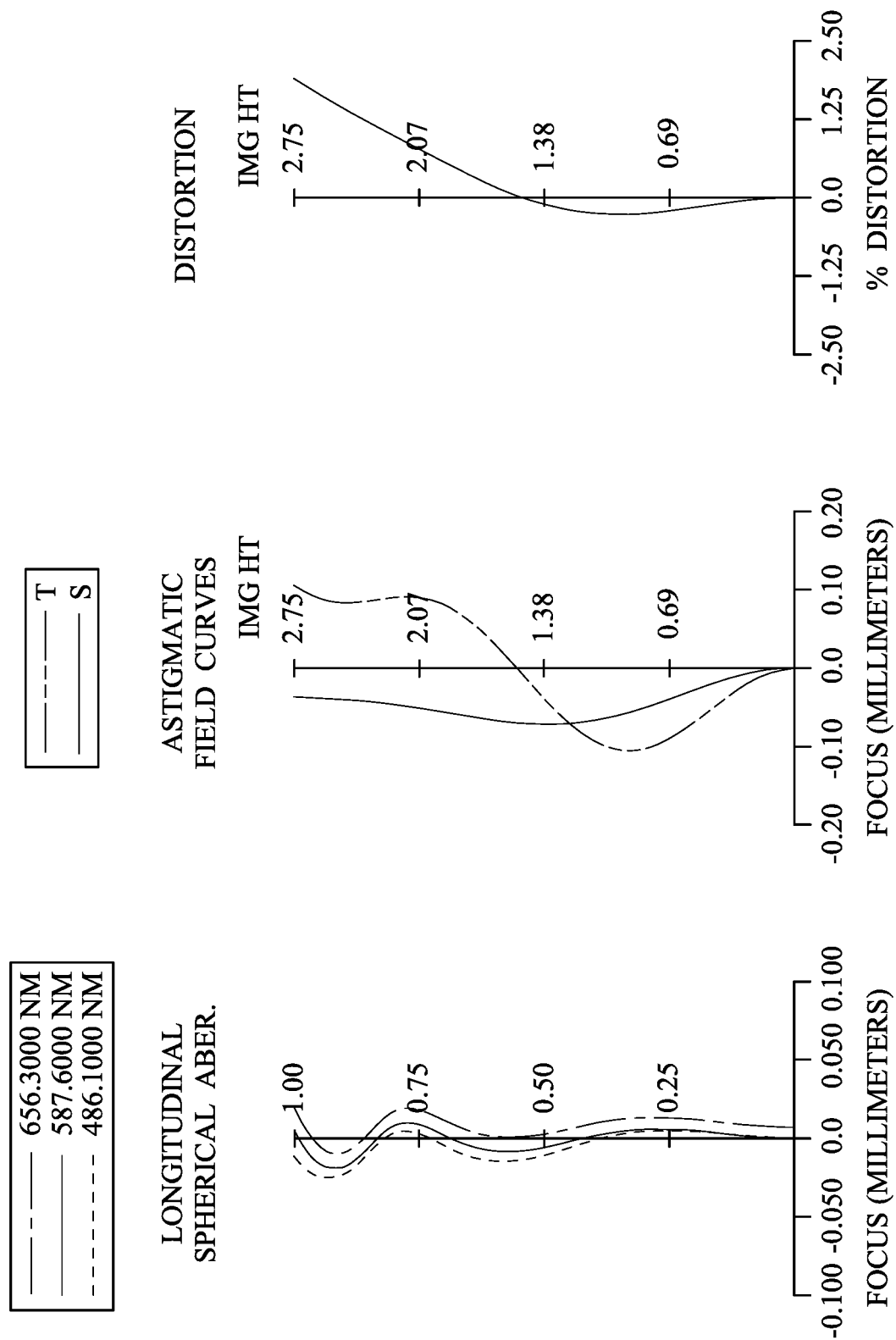
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows spherical aberration curves, astigmatic field curves and a distortion curve of the image capturing apparatus according to the 4th embodiment. In FIG. 7, the image capturing apparatus includes a photographing optical lens assembly (its reference numeral is omitted) and an image sensor 495. The photographing optical lens assembly includes, in order from an object side to an image side along an optical axis, an aperture stop 400, a first lens element 410, a second lens element 420, a third lens element 430, a fourth lens element 440, a fifth lens element 450, a filter 460 and an image surface 470, wherein the image sensor 495 is disposed on the image surface 470 of the photographing optical lens assembly. The photographing optical lens assembly has a total of five lens elements (410-450), and there is an air space between every two lens elements of the first lens element 410, the second lens element 420, the third lens element 430, the fourth lens element 440 and the fifth lens element 450 that are adjacent to each other.

The first lens element 410 with positive refractive power has an object-side surface 411 being convex in a paraxial region thereof and an image-side surface 412 being convex in a paraxial region thereof. The first lens element 410 is made of a plastic material, and has the object-side surface 411 and the image-side surface 412 being both aspheric. Furthermore, the object-side surface 411 of the first lens element 410 includes at least one inflection point.

The second lens element 420 with negative refractive power has an object-side surface 421 being concave in a paraxial region thereof and an image-side surface 422 being convex in a paraxial region thereof. The second lens element 420 is made of a plastic material, and has the object-side surface 421 and the image-side surface 422 being both aspheric. Furthermore, the image-side surface 422 of the second lens element 420 includes at least one inflection point.

The third lens element 430 with negative refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric. Furthermore, both of the object-side surface 431 and the image-side surface 432 of the third lens element 430 include at least one inflection point.

The fourth lens element 440 with positive refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric. Furthermore, the image-side surface 442 of the fourth lens element 440 includes at least one inflection point.

The fifth lens element 450 with negative refractive power has an object-side surface 451 being concave in a paraxial region thereof and an image-side surface 452 being concave in a paraxial region thereof. The fifth lens element 450 is made of a plastic material, and has the object-side surface 451 and the image-side surface 452 being both aspheric. Furthermore, the image-side surface 452 of the fifth lens element 450 includes at least one inflection point.

The filter 460 is made of a glass material and located between the fifth lens element 450 and the image surface 470, and will not affect the focal length of the photographing optical lens assembly.

The detailed optical data of the 4th embodiment are shown in Table 7 and the aspheric surface data are shown in Table 8 below.

TABLE 7

4th Embodiment
f = 10.05 mm, Fno = 2.81, HFOV = 15.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.378 | | | | |
| 2 | Lens 1 | 3.345 | ASP | 1.734 | Plastic | 1.545 | 56.0 | 4.28 |
| 3 | | −6.273 | ASP | 0.103 | | | | |
| 4 | Lens 2 | −2.948 | ASP | 1.321 | Plastic | 1.584 | 28.2 | −11.07 |
| 5 | | −6.314 | ASP | 0.050 | | | | |
| 6 | Lens 3 | 7.214 | ASP | 1.220 | Plastic | 1.614 | 26.0 | −27.54 |
| 7 | | 4.731 | ASP | 0.259 | | | | |
| 8 | Lens 4 | −21.277 | ASP | 0.450 | Plastic | 1.660 | 20.4 | 43.17 |
| 9 | | −12.283 | ASP | 0.449 | | | | |
| 10 | Lens 5 | −10.369 | ASP | 0.528 | Plastic | 1.607 | 26.6 | −9.76 |
| 11 | | 14.090 | ASP | 1.500 | | | | |
| 12 | Filter | Plano | | 0.300 | Glass | 1.517 | 64.2 | — |
| 13 | | Plano | | 2.309 | | | | |
| 14 | Image | Plano | | — | | | | |

Reference wavelength is 587.6 nm (d-line).

TABLE 8

Aspheric Coefficients

| Surface # | 2 | 3 | 4 | 5 | 6 |
|---|---|---|---|---|---|
| k= | −3.0436E−01 | 7.1819E−03 | −2.4292E+00 | 6.3320E+00 | −4.9510E+00 |
| A4= | −3.5871E−03 | 1.8577E−02 | 5.7242E−02 | 5.9857E−02 | −4.3137E−03 |
| A6= | −1.3853E−03 | −9.5940E−03 | −2.5029E−02 | −5.5544E−02 | −2.8306E−02 |
| A8= | 8.2202E−04 | 2.5140E−03 | 8.2219E−03 | 2.7013E−02 | 1.9360E−03 |
| A10= | −5.5094E−04 | −1.3764E−03 | −2.3185E−03 | −4.8301E−03 | 1.1705E−02 |
| A12= | 1.2964E−04 | 4.7692E−04 | 4.8426E−04 | −4.2629E−04 | −5.6042E−03 |
| A14= | −1.2546E−05 | −5.9025E−05 | −4.9141E−05 | 1.6619E−04 | 7.7314E−04 |

| Surface # | 7 | 8 | 9 | 10 | 11 |
|---|---|---|---|---|---|
| k= | 1.8792E+00 | −3.3011E+00 | 5.0000E+01 | −2.7703E+01 | 4.8104E+01 |
| A4= | −4.7801E−02 | −7.1280E−03 | −4.5124E−02 | −1.4936E−01 | −9.9590E−02 |
| A6= | 2.6364E−02 | 2.0676E−03 | 4.9526E−02 | 5.1152E−02 | 6.2825E−02 |
| A8= | −6.0729E−02 | −2.6483E−03 | −1.2156E−02 | 4.2940E−02 | −2.5598E−02 |
| A10= | 5.6870E−02 | 1.0121E−02 | 1.5209E−02 | −5.8107E−02 | 2.2602E−03 |
| A12= | −2.1169E−02 | −8.2585E−03 | −2.3115E−02 | 2.0717E−02 | 2.2008E−03 |
| A14= | 2.7368E−03 | 2.4845E−03 | 1.1039E−02 | −9.8631E−04 | −7.7720E−04 |
| A16= | | −2.6191E−04 | −1.6796E−03 | −4.9837E−04 | 7.5921E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 10.05 | |f1/f4| | 0.10 |
| Fno | 2.81 | ΣAT/BL | 0.21 |
| HFOV [deg.] | 15.0 | |Y52/Y11| | 0.98 |
| |tan(HFOV)| | 0.27 | |(2 × Y52)/EPD| | 0.99 |
| (V2 + V3 + V4 + V5)/4 | 25.3 | SD/TD | 0.94 |
| CT4/CT2 | 0.34 | ImgH/EPD | 0.77 |
| (T23 + T34)/CT2 | 0.23 | (10 × Yc41)/f | — |
| T34/T45 | 0.58 | (10 × Yc42)/f | 0.82 |

-continued

| 4th Embodiment | | | |
|---|---|---|---|
| TD/CT2 | 4.63 | (10 × Yc51)/f | — |
| (R3 + R4)/(R3 − R4) | −2.75 | (10 × Yc52)/f | 0.27 |
| f1/CT2 | 3.24 | | |

According to the 4th embodiment of the present disclosure, when at least three of the first lens element 410, the second lens element 420, the third lens element 430, the fourth lens element 440 and the fifth lens element 450 have an Abbe number smaller than 30.0. In detail, all of the Abbe numbers of the second lens element 420, the third lens element 430, the fourth lens element 440 and the fifth lens element 450 are smaller than 30.0.

5th Embodiment

Figure 9:
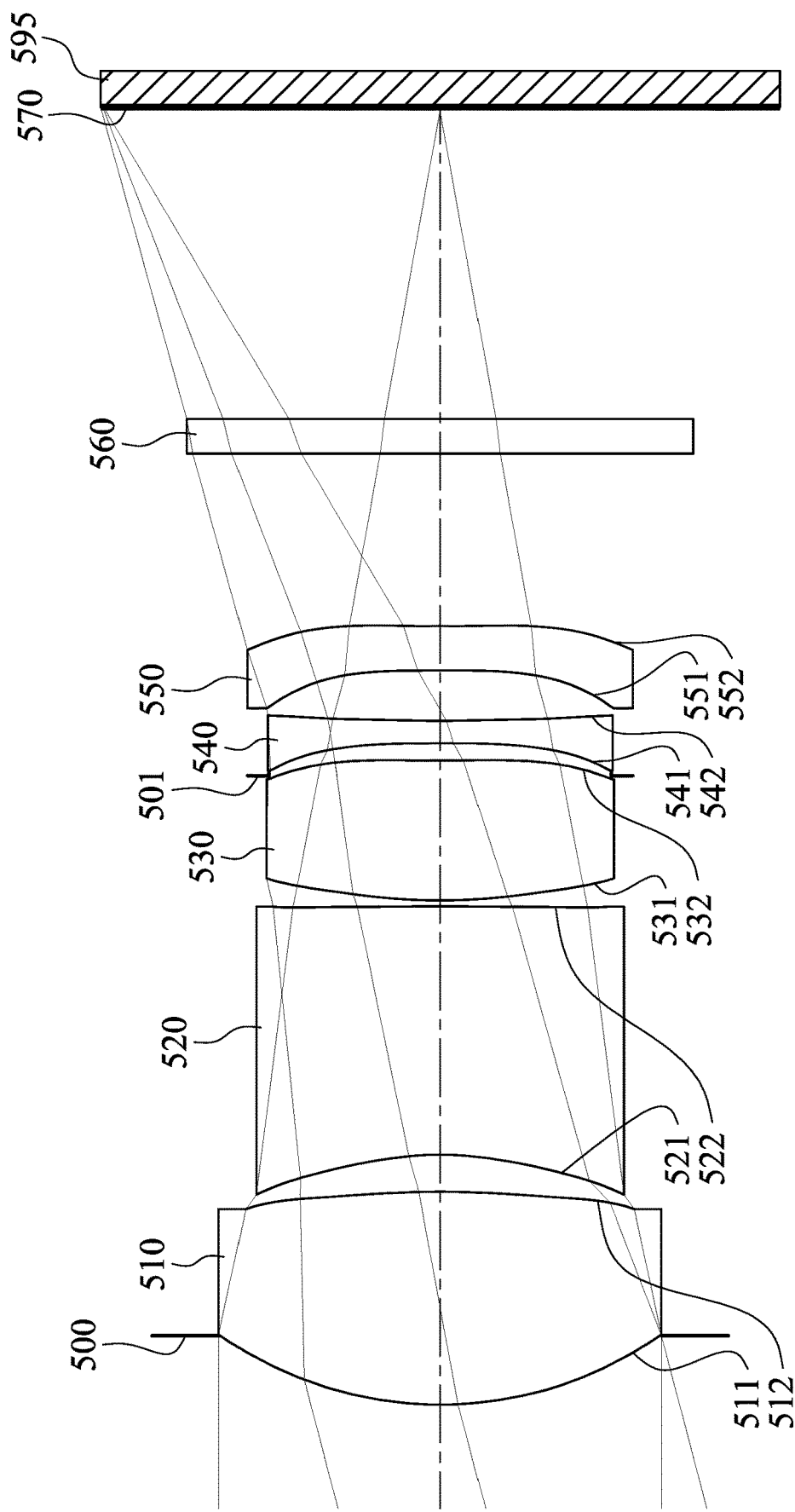
FIG. 9 is a schematic view of an image capturing apparatus according to the 5th embodiment of the present disclosure.
Figure 10:
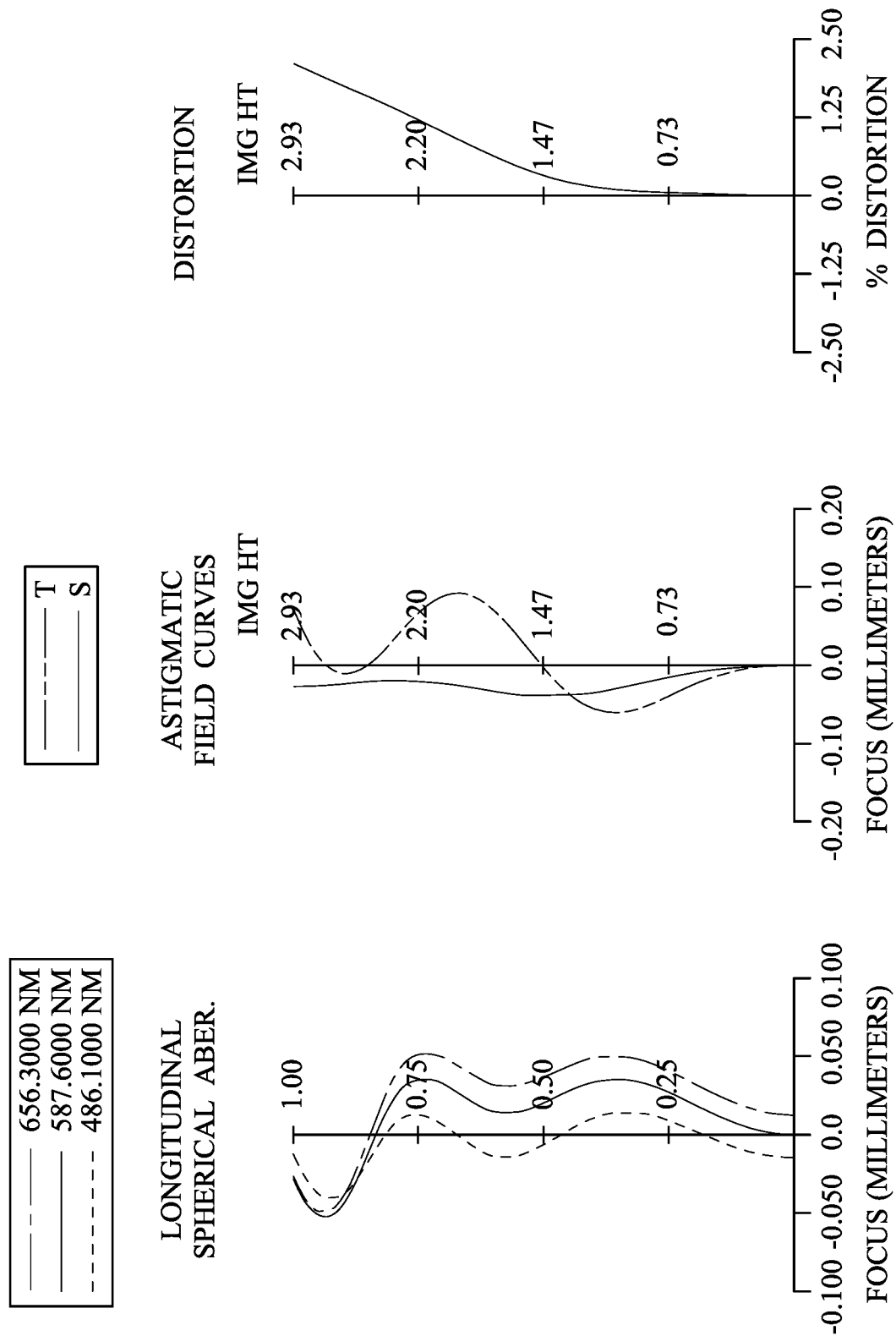
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows spherical aberration curves, astigmatic field curves and a distortion curve of the image capturing apparatus according to the 5th embodiment. In FIG. 9, the image capturing apparatus includes a photographing optical lens assembly (its reference numeral is omitted) and an image sensor 595. The photographing optical lens assembly includes, in order from an object side to an image side along an optical axis, an aperture stop 500, a first lens element 510, a second lens element 520, a third lens element 530, a stop 501, a fourth lens element 540, a fifth lens element 550, a filter 560 and an image surface 570, wherein the image sensor 595 is disposed on the image surface 570 of the photographing optical lens assembly. The photographing optical lens assembly has a total of five lens elements (510-550), and there is an air space between every two lens elements of the first lens element 510, the second lens element 520, the third lens element 530, the fourth lens element 540 and the fifth lens element 550 that are adjacent to each other.

The first lens element 510 with positive refractive power has an object-side surface 511 being convex in a paraxial region thereof and an image-side surface 512 being convex in a paraxial region thereof. The first lens element 510 is made of a plastic material, and has the object-side surface 511 and the image-side surface 512 being both aspheric. Furthermore, the object-side surface 511 of the first lens element 510 includes at least one inflection point.

The second lens element 520 with negative refractive power has an object-side surface 521 being concave in a paraxial region thereof and an image-side surface 522 being convex in a paraxial region thereof. The second lens element 520 is made of a plastic material, and has the object-side surface 521 and the image-side surface 522 being both aspheric. Furthermore, the image-side surface 522 of the second lens element 520 includes at least one inflection point.

The third lens element 530 with positive refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric. Furthermore, the image-side surface 532 of the third lens element 530 includes at least one inflection point.

The fourth lens element 540 with negative refractive power has an object-side surface 541 being concave in a paraxial region thereof and an image-side surface 542 being concave in a paraxial region thereof. The fourth lens element 540 is made of a plastic material, and has the object-side surface 541 and the image-side surface 542 being both aspheric. Furthermore, both of the object-side surface 541 and the image-side surface 542 of the fourth lens element 540 include at least one inflection point.

The fifth lens element 550 with negative refractive power has an object-side surface 551 being concave in a paraxial region thereof and an image-side surface 552 being concave in a paraxial region thereof. The fifth lens element 550 is made of a plastic material, and has the object-side surface 551 and the image-side surface 552 being both aspheric. Furthermore, the image-side surface 552 of the fifth lens element 550 includes at least one inflection point.

The filter 560 is made of a glass material and located between the fifth lens element 550 and the image surface 570, and will not affect the focal length of the photographing optical lens assembly.

The detailed optical data of the 5th embodiment are shown in Table 9 and the aspheric surface data are shown in Table 10 below.

TABLE 9

5th Embodiment
f = 10.90 mm, Fno = 2.83, HFOV = 14.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.599 | | | | |
| 2 | Lens 1 | 3.388 | ASP | 1.852 | Plastic | 1.545 | 56.0 | 4.47 |
| 3 | | −7.010 | ASP | 0.322 | | | | |
| 4 | Lens 2 | −2.729 | ASP | 2.161 | Plastic | 1.584 | 28.2 | −5.68 |
| 5 | | −19.840 | ASP | 0.050 | | | | |
| 6 | Lens 3 | 5.268 | ASP | 1.220 | Plastic | 1.660 | 20.4 | 11.17 |
| 7 | | 16.773 | ASP | −0.132 | | | | |
| 8 | Stop | Plano | | 0.283 | | | | |
| 9 | Lens 4 | −154.059 | ASP | 0.191 | Plastic | 1.660 | 20.4 | −15.85 |
| 10 | | 11.224 | ASP | 0.438 | | | | |
| 11 | Lens 5 | −112.565 | ASP | 0.387 | Plastic | 1.639 | 23.3 | −17.91 |
| 12 | | 12.747 | ASP | 1.500 | | | | |
| 13 | Filter | Plano | | 0.300 | Glass | 1.517 | 64.2 | — |
| 14 | | Plano | | 2.715 | | | | |
| 15 | Image | Plano | | — | | | | |

Reference wavelength is 587.6 nm (d-line).
Effective radius of stop on surface 8 is 1.490 mm.

TABLE 10

Aspheric Coefficients

| Surface # | 2 | 3 | 4 | 5 | 6 |
|---|---|---|---|---|---|
| k= | 1.2992E+00 | −8.1362E+00 | −1.3838E+00 | 4.2495E+01 | 2.6056E−01 |
| A4= | −3.3168E−03 | 2.5958E−02 | 5.4306E−02 | 5.3319E−02 | 1.1826E−02 |

TABLE 10-continued

| Aspheric Coefficients | | | | |
|---|---|---|---|---|
| A6= | −1.0078E−03 | −8.4262E−03 | −2.4645E−02 | −5.1477E−02 | −2.7967E−02 |
| A8= | 1.0915E−03 | 3.4622E−03 | 8.3363E−03 | 1.9297E−02 | 7.8142E−03 |
| A10= | −7.9231E−04 | −2.0720E−03 | −2.9022E−03 | −1.1781E−03 | 2.5552E−03 |
| A12= | 2.1708E−04 | 3.5626E−04 | 4.5991E−04 | −7.5071E−04 | −1.3236E−03 |
| A14= | −2.4453E−05 | −8.1109E−06 | −9.5991E−06 | 1.7726E−04 | 1.7898E−04 |

| Surface # | 7 | 9 | 10 | 11 | 12 |
|---|---|---|---|---|---|
| k= | −3.5523E+01 | −1.0000E+00 | −2.9068E+01 | −1.0000E+00 | 4.8833E+01 |
| A4= | −8.8314E−02 | −1.1828E−01 | −6.4849E−02 | −9.3869E−02 | −7.4399E−02 |
| A6= | 4.5923E−02 | 6.9237E−02 | 5.4471E−02 | 3.2145E−02 | 1.8281E−02 |
| A8= | −1.6601E−02 | −9.0305E−03 | −2.1634E−02 | −7.0581E−02 | −1.0411E−02 |
| A10= | 1.6542E−03 | 1.2023E−02 | 3.5373E−02 | 1.1737E−01 | 1.4314E−02 |
| A12= | −3.9810E−04 | −2.9045E−02 | −3.9457E−02 | −8.7094E−02 | −1.0406E−02 |
| A14= | 2.6580E−04 | 1.5289E−02 | 1.6673E−02 | 2.9220E−02 | 3.2588E−03 |
| A16= |  | −2.4173E−03 | −2.3891E−03 | −3.6438E−03 | −3.6817E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 10.90 | |f1/f4| | 0.28 |
| Fno | 2.83 | ΣAT/BL | 0.21 |
| HFOV [deg.] | 14.8 | |Y52/Y11| | 0.87 |
| |tan(HFOV)| | 0.26 | |(2 × Y52)/EPD| | 0.87 |
| (V2 + V3 + V4 + V5)/4 | 23.1 | SD/TD | 0.91 |
| CT4/CT2 | 0.09 | ImgH/EPD | 0.76 |
| (T23 + T34)/CT2 | 0.09 | (10 × Yc41)/f | 1.32 |
| T34/T45 | 0.34 | (10 × Yc42)/f | 0.37 |
| TD/CT2 | 3.13 | (10 × Yc51)/f | — |
| (R3 + R4)/(R3 − R4) | −1.32 | (10 × Yc52)/f | 0.29 |
| f1/CT2 | 2.07 | | |

According to the 5th embodiment of the present disclosure, when a refractive power of the first lens element 510 is P1 (which is f/f1, a ratio value of the focal length of the photographing optical lens assembly f and the focal length of the first lens element f1), a refractive power of the second lens element 520 is P2 (which is f/f2, a ratio value of the focal length of the photographing optical lens assembly f and a focal length of the second lens element f2), a refractive power of the third lens element 530 is P3 (which is f/f3, a ratio value of the focal length of the photographing optical lens assembly f and a focal length of the third lens element f3), a refractive power of the fourth lens element 540 is P4 (which is f/f4, a ratio value of the focal length of the photographing optical lens assembly f and the focal length of the fourth lens element f4), a refractive power of the fifth lens element 550 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 5th embodiment of the present disclosure, when at least three of the first lens element 510, the second lens element 520, the third lens element 530, the fourth lens element 540 and the fifth lens element 550 have an Abbe number smaller than 30.0. In detail, all of the Abbe numbers of the second lens element 520, the third lens element 530, the fourth lens element 540 and the fifth lens element 550 are smaller than 30.0.

6th Embodiment

Figure 11:
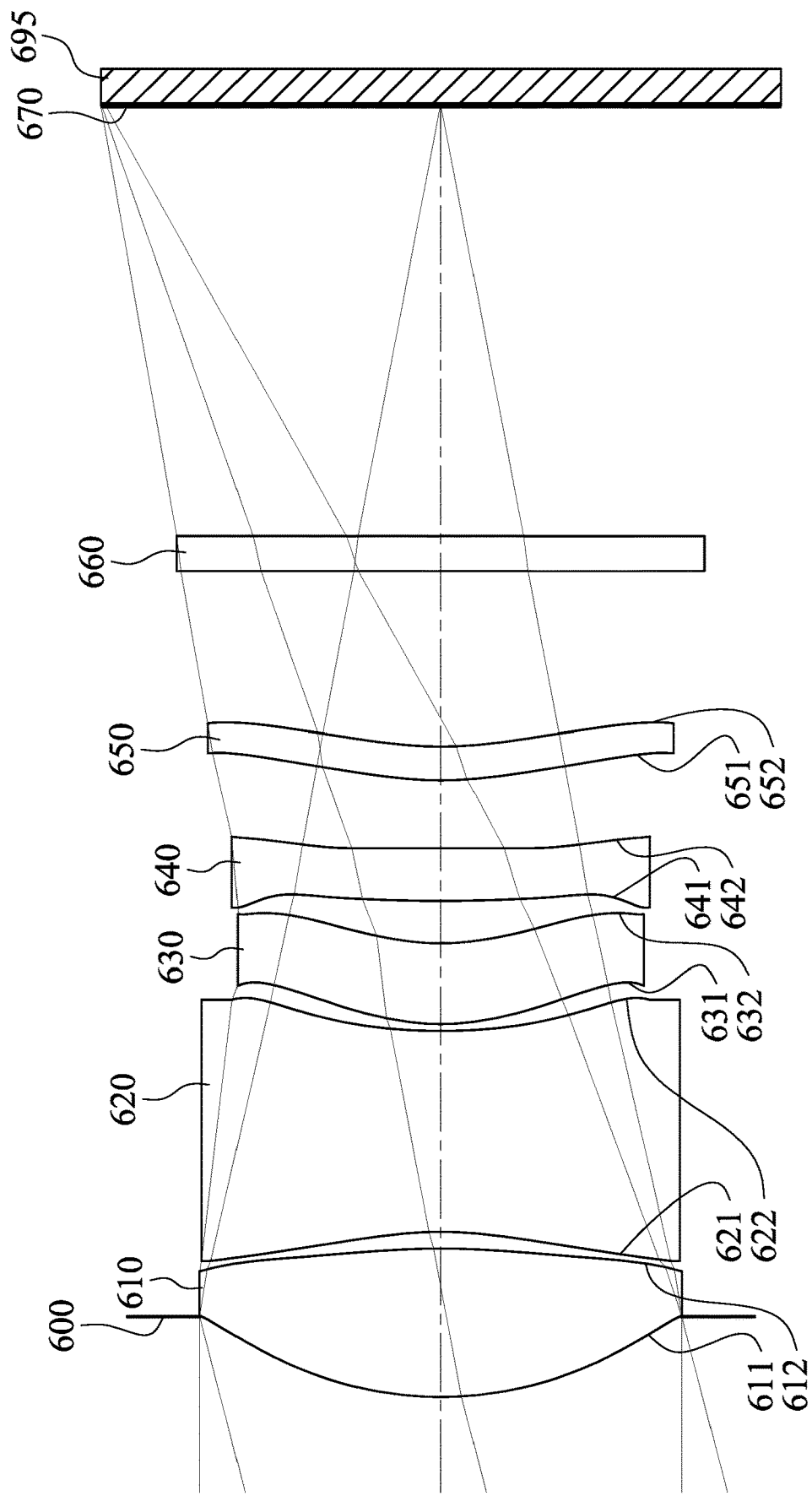
FIG. 11 is a schematic view of an image capturing apparatus according to the 6th embodiment of the present disclosure.
Figure 12:
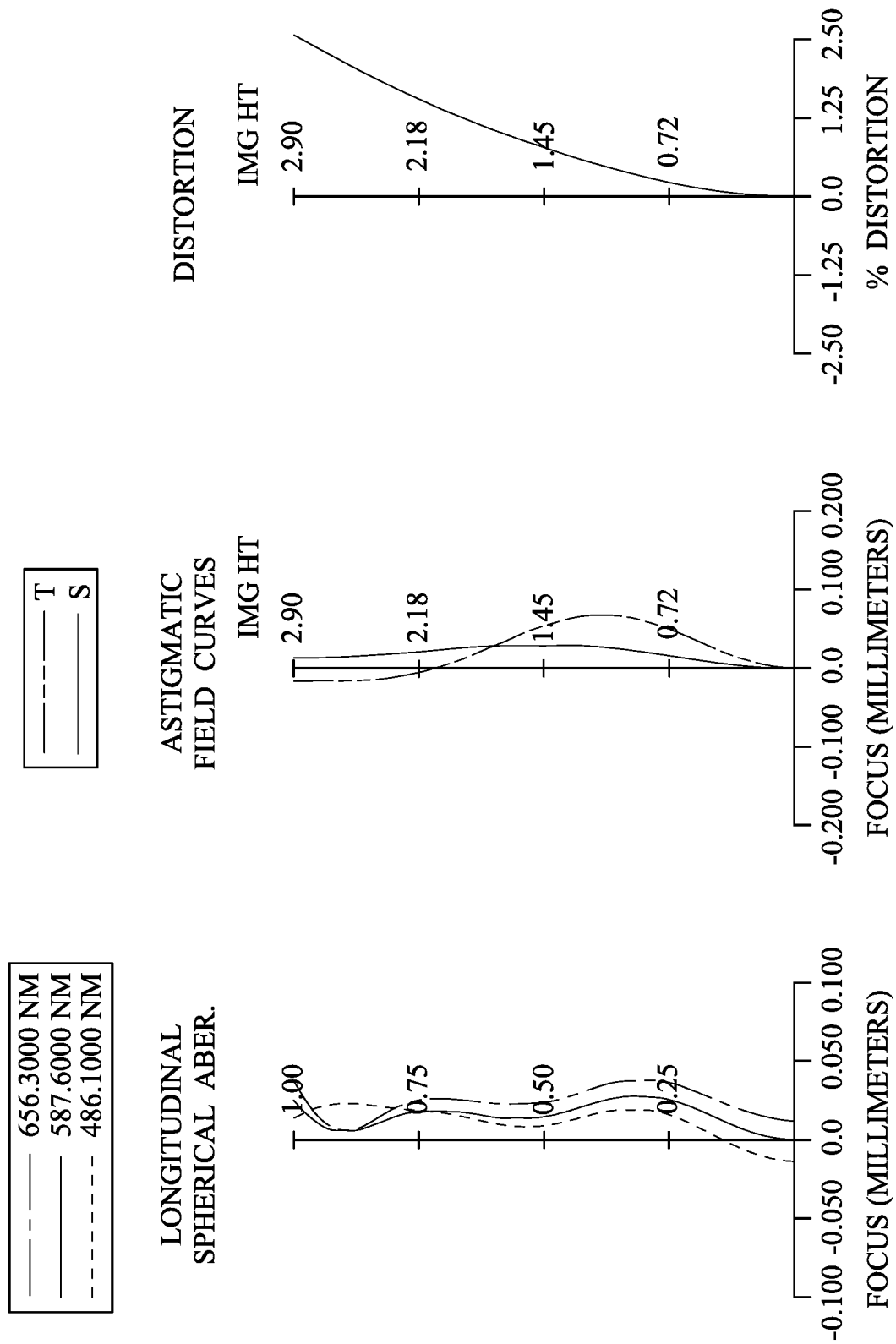
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows spherical aberration curves, astigmatic field curves and a distortion curve of the image capturing apparatus according to the 6th embodiment. In FIG. 11, the image capturing apparatus includes a photographing optical lens assembly (its reference numeral is omitted) and an image sensor 695. The photographing optical lens assembly includes, in order from an object side to an image side along an optical axis, an aperture stop 600, a first lens element 610, a second lens element 620, a third lens element 630, a fourth lens element 640, a fifth lens element 650, a filter 660 and an image surface 670, wherein the image sensor 695 is disposed on the image surface 670 of the photographing optical lens assembly. The photographing optical lens assembly has a total of five lens elements (610-650), and there is an air space between every two lens elements of the first lens element 610, the second lens element 620, the third lens element 630, the fourth lens element 640 and the fifth lens element 650 that are adjacent to each other.

The first lens element 610 with positive refractive power has an object-side surface 611 being convex in a paraxial region thereof and an image-side surface 612 being convex in a paraxial region thereof. The first lens element 610 is made of a plastic material, and has the object-side surface 611 and the image-side surface 612 being both aspheric. Furthermore, both of the object-side surface 611 and the image-side surface 612 of the first lens element 610 include at least one inflection point.

The second lens element 620 with negative refractive power has an object-side surface 621 being concave in a paraxial region thereof and an image-side surface 622 being concave in a paraxial region thereof. The second lens element 620 is made of a plastic material, and has the object-side surface 621 and the image-side surface 622 being both aspheric. Furthermore, both of the object-side surface 621 and the image-side surface 622 of the second lens element 620 include at least one inflection point.

The third lens element 630 with positive refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric. Furthermore, both of the object-side surface 631 and the image-side surface 632 of the third lens element 630 include at least one inflection point.

The fourth lens element 640 with positive refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, both of the object-side surface 641 and the image-side surface 642 of the fourth lens element 640 include at least one inflection point.

The fifth lens element 650 with positive refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric. Furthermore, both of the object-side surface 651 and the image-side surface 652 of the fifth lens element 650 include at least one inflection point.

The filter 660 is made of a glass material and located between the fifth lens element 650 and the image surface 670, and will not affect the focal length of the photographing optical lens assembly.

The detailed optical data of the 6th embodiment are shown in Table 11 and the aspheric surface data are shown in Table 12 below.

TABLE 11

6th Embodiment
f = 10.91 mm, Fno = 2.65, HFOV = 14.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.688 | | | | |
| 2 | Lens 1 | 3.073 | ASP | 1.271 | Plastic | 1.534 | 55.9 | 4.12 |
| 3 | | −6.610 | ASP | 0.145 | | | | |
| 4 | Lens 2 | −3.240 | ASP | 1.716 | Plastic | 1.584 | 28.2 | −3.27 |
| 5 | | 5.574 | ASP | 0.058 | | | | |
| 6 | Lens 3 | 2.123 | ASP | 0.687 | Plastic | 1.671 | 19.5 | 27.21 |
| 7 | | 2.091 | ASP | 0.362 | | | | |
| 8 | Lens 4 | 9.086 | ASP | 0.452 | Plastic | 1.584 | 28.2 | 17.38 |
| 9 | | 84.896 | ASP | 0.583 | | | | |
| 10 | Lens 5 | 3.135 | ASP | 0.287 | Plastic | 1.671 | 19.5 | 93.90 |
| 11 | | 3.178 | ASP | 1.500 | | | | |
| 12 | Filter | Plano | | 0.300 | Glass | 1.517 | 64.2 | — |
| 13 | | Plano | | 3.681 | | | | |
| 14 | Image | Plano | | — | | | | |

Reference wavelength is 587.6 nm (d-line).

TABLE 12

Aspheric Coefficients

| Surface# | 2 | 3 | 4 | 5 | 6 |
|---|---|---|---|---|---|
| k= | 6.9401E−01 | −1.4541E+01 | −1.6068E+00 | −3.6472E+01 | −4.3784E+00 |
| A4= | −3.5228E−03 | 1.9596E−02 | 5.7076E−02 | 7.1259E−02 | 1.5100E−02 |
| A6= | −2.4492E−03 | −7.5150E−03 | −2.3224E−02 | −4.7029E−02 | −2.4599E−02 |
| A8= | 1.5842E−03 | 4.0347E−03 | 9.1250E−03 | 1.8229E−02 | 7.1604E−03 |
| A10= | −7.7019E−04 | −1.7559E−03 | −2.7178E−03 | −1.8488E−03 | 1.8421E−03 |
| A12= | 1.6613E−04 | 3.3109E−04 | 4.2832E−04 | −9.2657E−04 | −1.4839E−03 |
| A14= | −1.6269E−05 | −2.1976E−05 | −2.4358E−05 | 1.7405E−04 | 1.8660E−04 |

| Surface # | 7 | 8 | 9 | 10 | 11 |
|---|---|---|---|---|---|
| k= | −1.6103E+00 | 2.2413E+01 | −2.9094E+01 | −6.9576E+00 | −9.9464E+00 |
| A4= | −8.3161E−02 | −7.2983E−02 | −4.6192E−02 | −6.2879E−02 | −4.0647E−02 |
| A6= | 4.2412E−02 | 8.3743E−02 | 7.8081E−02 | 5.8846E−02 | 3.3515E−02 |
| A8= | −1.6372E−02 | −3.7259E−02 | −2.1494E−02 | −3.8665E−02 | −2.3303E−02 |
| A10= | 2.2954E−03 | 6.9739E−03 | −1.1373E−02 | 1.6441E−02 | 1.0395E−02 |
| A12= | −3.8524E−04 | −3.9900E−03 | 7.7661E−03 | −4.1971E−03 | −2.7002E−03 |
| A14= | 1.1311E−04 | 1.6760E−03 | −1.6357E−03 | 5.7467E−04 | 3.6727E−04 |
| A16= | | −2.0285E−04 | 1.2262E−04 | −3.2686E−05 | −2.0432E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 10.91 | \|f1/f4\| | 0.24 |
| Fno | 2.65 | ΣAT/BL | 0.21 |
| HFOV [deg.] | 14.5 | \|Y52/Y11\| | 0.96 |
| \|tan(HFOV)\| | 0.26 | \|(2 × Y52)/EPD\| | 0.97 |
| (V2 + V3 + V4 + V5)/4 | 23.8 | SD/TD | 0.88 |
| CT4/CT2 | 0.26 | ImgH/EPD | 0.70 |
| (T23 + T34)/CT2 | 0.24 | (10 × Yc41)/f | 0.97 |
| T34/T45 | 0.62 | (10 × Yc42)/f | 0.15 |
| TD/CT2 | 3.24 | (10 × Yc51)/f | 1.08 |
| (R3 + R4)/(R3 − R4) | −0.26 | (10 × Yc52)/f | 0.85 |
| f1/CT2 | 2.40 | | |

According to the 6th embodiment of the present disclosure, when a refractive power of the first lens element 610 is P1 (which is f/f1, a ratio value of the focal length of the photographing optical lens assembly f and the focal length of the first lens element f1), a refractive power of the second lens element 620 is P2 (which is f/f2, a ratio value of the focal length of the photographing optical lens assembly f and a focal length of the second lens element f2), a refractive power of the third lens element 630 is P3 (which is f/f3, a ratio value of the focal length of the photographing optical lens assembly f and a focal length of the third lens element f3), a refractive power of the fourth lens element 640 is P4 (which is f/f4, a ratio value of the focal length of the photographing optical lens assembly f and the focal length of the fourth lens element f4), a refractive power of the fifth lens element 650 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 6th embodiment of the present disclosure, when at least three of the first lens element 610, the second lens element 620, the third lens element 630, the fourth lens element 640 and the fifth lens element 650 have an Abbe number smaller than 30.0. In detail, all of the Abbe numbers of the second lens element 620, the third lens element 630, the fourth lens element 640 and the fifth lens element 650 are smaller than 30.0.

7th Embodiment

Figure 13:
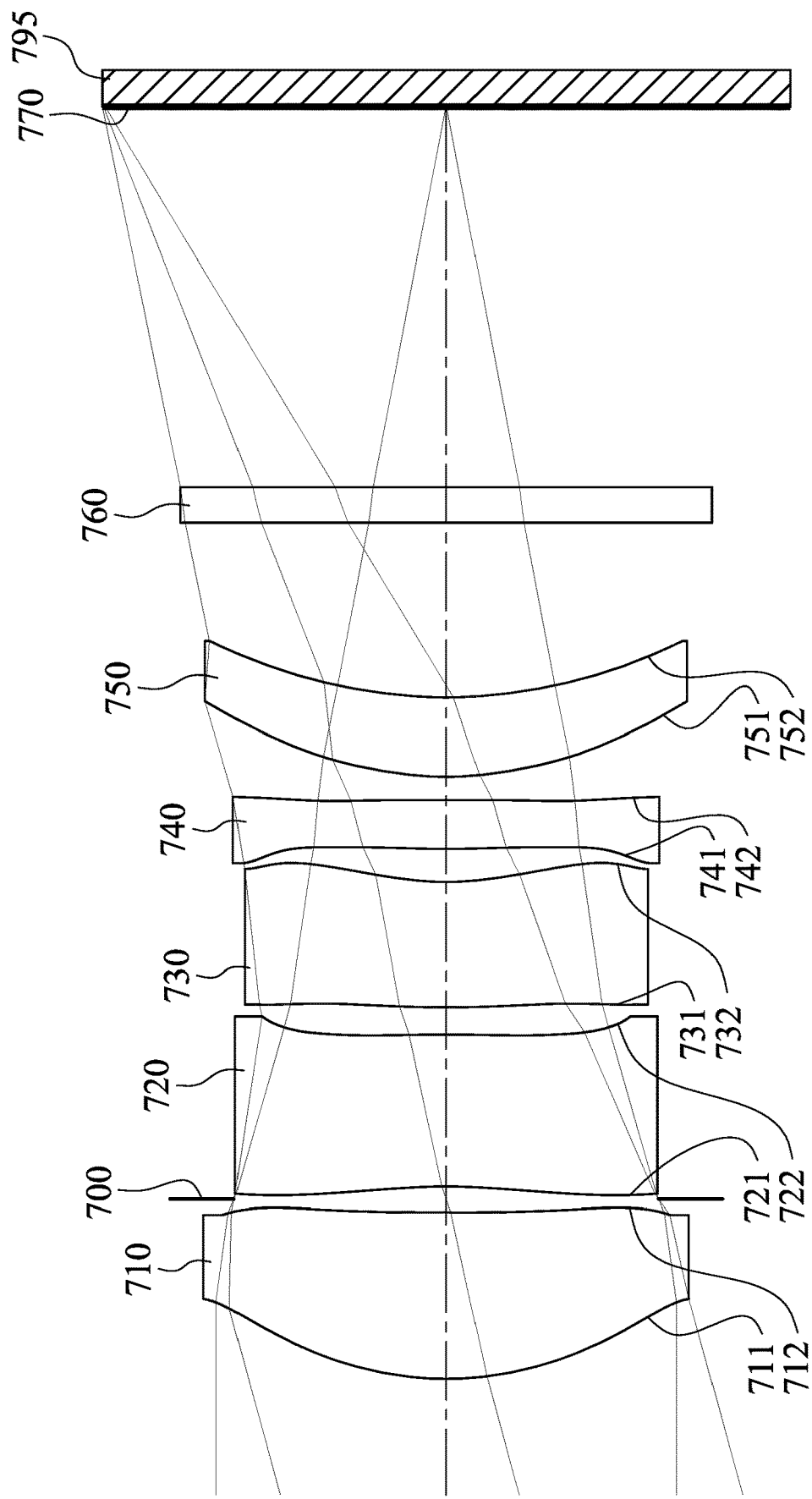
FIG. 13 is a schematic view of an image capturing apparatus according to the 7th embodiment of the present disclosure.
Figure 14:
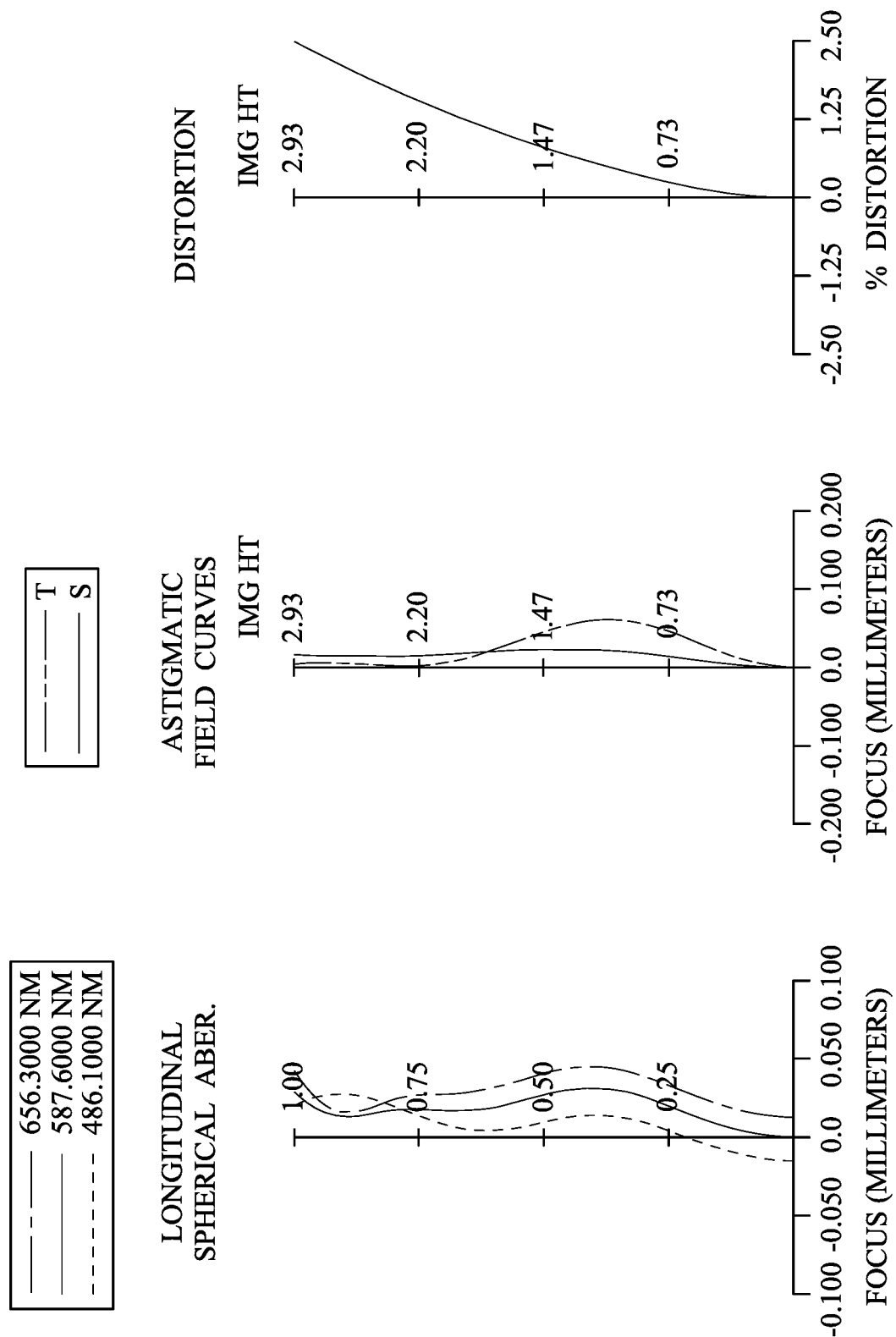
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows spherical aberration curves, astigmatic field curves and a distortion curve of the image capturing apparatus according to the 7th embodiment. In FIG. 13, the image capturing apparatus includes a photographing optical lens assembly (its reference numeral is omitted) and an image sensor 795. The photographing optical lens assembly includes, in order from an object side to an image side along an optical axis, a first lens element 710, an aperture stop 700, a second lens element 720, a third lens element 730, a fourth lens element 740, a fifth lens element 750, a filter 760 and an image surface 770, wherein the image sensor 795 is disposed on the image surface 770 of the photographing optical lens assembly. The photographing optical lens assembly has a total of five lens elements (710-750), and there is an air space between every two lens elements of the first lens element 710, the second lens element 720, the third lens element 730, the fourth lens element 740 and the fifth lens element 750 that are adjacent to each other.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric. Furthermore, both of the object-side surface 711 and the image-side surface 712 of the first lens element 710 include at least one inflection point.

The second lens element 720 with negative refractive power has an object-side surface 721 being concave in a paraxial region thereof and an image-side surface 722 being convex in a paraxial region thereof. The second lens element 720 is made of a plastic material, and has the object-side surface 721 and the image-side surface 722 being both aspheric. Furthermore, both of the object-side surface 721 and the image-side surface 722 of the second lens element 720 include at least one inflection point.

The third lens element 730 with negative refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric. Furthermore, both of the object-side surface 731 and the image-side surface 732 of the third lens element 730 include at least one inflection point.

The fourth lens element 740 with positive refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric. Furthermore, both of the object-side surface 741 and the image-side surface 742 of the fourth lens element 740 include at least one inflection point.

The fifth lens element 750 with positive refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric. Furthermore, the object-side surface 751 of the fifth lens element 750 includes at least one inflection point.

The filter 760 is made of a glass material and located between the fifth lens element 750 and the image surface 770, and will not affect the focal length of the photographing optical lens assembly.

The detailed optical data of the 7th embodiment are shown in Table 13 and the aspheric surface data are shown in Table 14 below.

TABLE 13

7th Embodiment
f = 10.44 mm, Fno = 2.65, HFOV = 15.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.891 | ASP | 1.426 | Plastic | 1.545 | 56.0 | 5.55 |
| 2 | | 54.201 | ASP | 0.113 | | | | |
| 3 | Ape. Stop | Plano | | 0.105 | | | | |
| 4 | Lens 2 | −5.173 | ASP | 1.304 | Plastic | 1.584 | 28.2 | −16.81 |
| 5 | | −11.950 | ASP | 0.232 | | | | |
| 6 | Lens 3 | 10.999 | ASP | 1.072 | Plastic | 1.671 | 19.5 | −5.19 |
| 7 | | 2.541 | ASP | 0.284 | | | | |
| 8 | Lens 4 | 7.690 | ASP | 0.417 | Plastic | 1.671 | 19.5 | 18.96 |
| 9 | | 19.029 | ASP | 0.201 | | | | |
| 10 | Lens 5 | 2.778 | ASP | 0.675 | Plastic | 1.671 | 19.5 | 11.73 |
| 11 | | 3.874 | ASP | 1.500 | | | | |
| 12 | Filter | Plano | | 0.300 | Glass | 1.517 | 64.2 | — |
| 13 | | Plano | | 3.259 | | | | |
| 14 | Image | Plano | | — | | | | |

Reference wavelength is 587.6 nm (d-line).

TABLE 14

Aspheric Coefficients

| Surface # | 1 | 2 | 4 | 5 | 6 |
|---|---|---|---|---|---|
| k= | 5.6050E−01 | −5.0000E+01 | −1.0916E−01 | −4.0947E+01 | −1.4554E+01 |
| A4= | −3.3092E−03 | 1.7725E−02 | 5.4493E−02 | 7.1704E−02 | 4.7464E−03 |
| A6= | −2.7554E−03 | −8.8091E−03 | −2.2919E−02 | −4.6833E−02 | −2.6293E−02 |
| A8= | 1.5147E−03 | 3.6658E−03 | 9.5051E−03 | 1.8748E−02 | 7.7305E−03 |
| A10= | −7.8957E−04 | −1.7775E−03 | −2.6825E−03 | −1.4308E−02 | 2.1325E−03 |
| A12= | 1.6528E−04 | 3.6479E−04 | 3.9679E−04 | −7.4941E−04 | −1.4084E−03 |
| A14= | −1.7197E−05 | −2.5985E−05 | −2.1197E−05 | 2.0002E−04 | 2.1308E−04 |

| Surface # | 7 | 8 | 9 | 10 | 11 |
|---|---|---|---|---|---|
| k= | −2.0941E+00 | 2.0524E+00 | −2.9094E+01 | −8.1502E−01 | −9.1382E−01 |
| A4= | −8.5528E−02 | −1.0911E−01 | −1.0520E−01 | −5.8998E−02 | −6.3969E−03 |
| A6= | 4.2265E−02 | 7.7378E−02 | 9.9634E−02 | 5.1556E−02 | −7.4863E−03 |
| A8= | −1.6526E−02 | −1.0401E−02 | −2.0120E−02 | −2.6835E−02 | 8.5088E−03 |
| A10= | 2.2076E−03 | −1.1588E−02 | −1.3446E−02 | 8.9433E−03 | −3.7056E−03 |
| A12= | −3.8099E−04 | 2.6692E−03 | 7.9346E−03 | −1.8523E−03 | 9.1649E−04 |
| A14= | 1.3227E−04 | 4.8804E−04 | −1.5428E−03 | 2.1285E−04 | −1.3001E−04 |
| A16= | | −1.2006E−04 | 1.0579E−04 | −1.0297E−05 | 8.0708E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 10.44 | \|f1/f4\| | 0.29 |
| Fno | 2.65 | ΣAT/BL | 0.18 |
| HFOV [deg.] | 15.3 | \|Y52/Y11\| | 0.98 |
| \|tan(HFOV)\| | 0.27 | \|(2 × Y52)/EPD\| | 1.03 |
| (V2 + V3 + V4 + V5)/4 | 21.7 | SD/TD | 0.74 |
| CT4/CT2 | 0.32 | ImgH/EPD | 0.74 |
| (T23 + T34)/CT2 | 0.40 | (10 × Yc41)/f | 0.34 |
| T34/T45 | 1.41 | (10 × Yc42)/f | 0.21 |
| TD/CT2 | 4.47 | (10 × Yc51)/f | 1.95 |
| (R3 + R4)/(R3 − R4) | −2.53 | (10 × Yc52)/f | — |
| f1/CT2 | 4.26 | | |

According to the 7th embodiment of the present disclosure, when at least three of the first lens element 710, the second lens element 720, the third lens element 730, the fourth lens element 740 and the fifth lens element 750 have an Abbe number smaller than 30.0. In detail, all of the Abbe numbers of the second lens element 720, the third lens element 730, the fourth lens element 740 and the fifth lens element 750 are smaller than 30.0.

8th Embodiment

Figure 15:
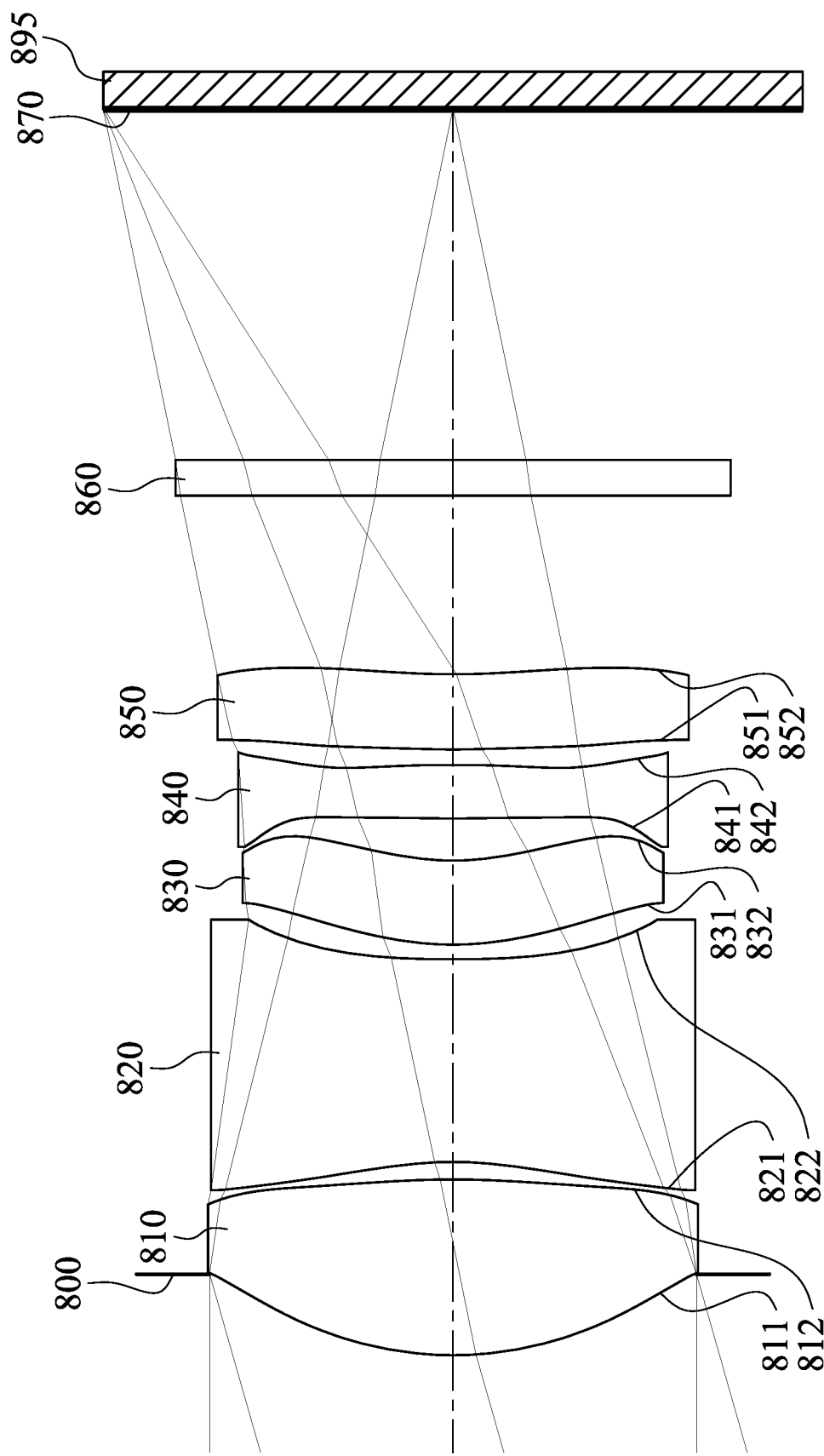
FIG. 15 is a schematic view of an image capturing apparatus according to the 8th embodiment of the present disclosure.
Figure 16:
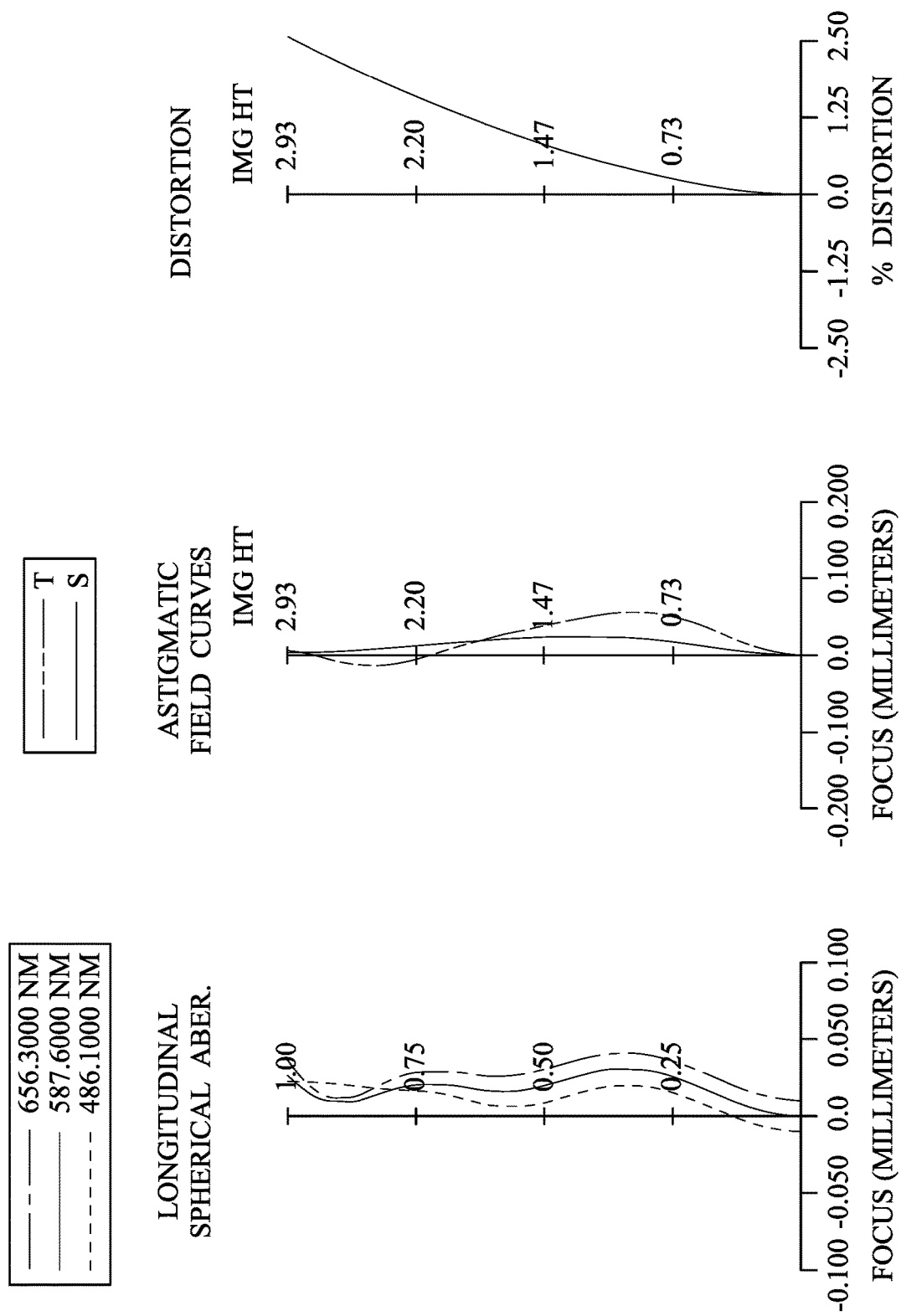
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows spherical aberration curves, astigmatic field curves and a distortion curve of the image capturing apparatus according to the 8th embodiment. In FIG. 15, the image capturing apparatus includes a photographing optical lens assembly (its reference numeral is omitted) and an image sensor 895. The photographing optical lens assembly includes, in order from an object side to an image side along an optical axis, an aperture stop 800, a first lens element 810, a second lens element 820, a third lens element 830, a fourth lens element 840, a fifth lens element 850, a filter 860 and an image surface 870, wherein the image sensor 895 is disposed on the image surface 870 of the photographing optical lens assembly. The photographing optical lens assembly has a total of five lens elements (810-850), and there is an air space between every two lens elements of the first lens element 810, the second lens element 820, the third lens element 830, the fourth lens element 840 and the fifth lens element 850 that are adjacent to each other.

The first lens element 810 with positive refractive power has an object-side surface 811 being convex in a paraxial region thereof and an image-side surface 812 being convex in a paraxial region thereof. The first lens element 810 is made of a plastic material, and has the object-side surface 811 and the image-side surface 812 being both aspheric. Furthermore, both of the object-side surface 811 and the image-side surface 812 of the first lens element 810 include at least one inflection point.

The second lens element 820 with negative refractive power has an object-side surface 821 being concave in a paraxial region thereof and an image-side surface 822 being concave in a paraxial region thereof. The second lens element 820 is made of a plastic material, and has the object-side surface 821 and the image-side surface 822 being both aspheric. Furthermore, the object-side surface 821 of the second lens element 820 includes at least one inflection point.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric. Furthermore, both of the object-side surface 831 and the image-side surface 832 of the third lens element 830 include at least one inflection point.

The fourth lens element 840 with positive refractive power has an object-side surface 841 being convex in a paraxial region thereof and an image-side surface 842 being convex in a paraxial region thereof. The fourth lens element 840 is made of a plastic material, and has the object-side surface 841 and the image-side surface 842 being both aspheric. Furthermore, both of the object-side surface 841 and the image-side surface 842 of the fourth lens element 840 include at least one inflection point.

The fifth lens element 850 with negative refractive power has an object-side surface 851 being convex in a paraxial region thereof and an image-side surface 852 being concave in a paraxial region thereof. The fifth lens element 850 is made of a plastic material, and has the object-side surface 851 and the image-side surface 852 being both aspheric. Furthermore, both of the object-side surface 851 and the image-side surface 852 of the fifth lens element 850 include at least one inflection point.

The filter 860 is made of a glass material and located between the fifth lens element 850 and the image surface 870, and will not affect the focal length of the photographing optical lens assembly.

The detailed optical data of the 8th embodiment are shown in Table 15 and the aspheric surface data are shown in Table 16 below.

TABLE 15

8th Embodiment
f = 10.01 mm, Fno = 2.45, HFOV = 15.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.680 | | | | |
| 2 | Lens 1 | 3.003 | ASP | 1.476 | Plastic | 1.545 | 56.0 | 4.16 |
| 3 | | −7.603 | ASP | 0.147 | | | | |
| 4 | Lens 2 | −3.237 | ASP | 1.703 | Plastic | 1.584 | 28.2 | −4.40 |
| 5 | | 14.958 | ASP | 0.123 | | | | |
| 6 | Lens 3 | 2.753 | ASP | 0.706 | Plastic | 1.671 | 19.5 | −37.61 |
| 7 | | 2.227 | ASP | 0.354 | | | | |
| 8 | Lens 4 | 12.645 | ASP | 0.448 | Plastic | 1.671 | 19.5 | 14.67 |
| 9 | | −43.752 | ASP | 0.131 | | | | |
| 10 | Lens 5 | 7.121 | ASP | 0.632 | Plastic | 1.671 | 19.5 | −143.17 |
| 11 | | 6.393 | ASP | 1.500 | | | | |
| 12 | Filter | Plano | | 0.300 | Glass | 1.517 | 64.2 | — |
| 13 | | Plano | | 2.947 | | | | |
| 14 | Image | Plano | | — | | | | |

Reference wavelength is 587.6 nm (d-line).

TABLE 16

Aspheric Coefficients

| Surface # | 2 | 3 | 4 | 5 | 6 |
|---|---|---|---|---|---|
| k= | 6.2993E−01 | −1.8192E+01 | −1.5616E+00 | −5.0000E+01 | −4.6491E+00 |
| A4= | −3.6101E−03 | 1.9519E−02 | 5.7067E−02 | 7.1156E−02 | 1.5087E−02 |
| A6= | −2.3788E−03 | −7.7529E−03 | −2.3009E−02 | −4.6556E−02 | −2.4217E−02 |

TABLE 16-continued

| Aspheric Coefficients | | | | | |
|---|---|---|---|---|---|
| A8= | 1.5090E−03 | 3.9707E−03 | 9.2015E−03 | 1.8718E−02 | 7.4230E−03 |
| A10= | −7.7558E−04 | −1.7613E−03 | −2.7153E−03 | −1.6572E−03 | 1.9430E−03 |
| A12= | 1.6837E−04 | 3.3308E−04 | 4.2388E−04 | −8.6530E−04 | −1.4581E−03 |
| A14= | −1.6745E−05 | −2.2409E−05 | −2.4486E−05 | 1.7838E−04 | 1.9710E−04 |

| Surface # | 7 | 8 | 9 | 10 | 11 |
|---|---|---|---|---|---|
| k= | −1.8353E+00 | 1.4743E+00 | −2.9094E+01 | −5.6760E+00 | −1.5355E+01 |
| A4= | −8.4992E−02 | −9.3096E−02 | −1.5304E−01 | −1.4959E−01 | −3.9130E−02 |
| A6= | 4.1756E−02 | 1.0806E−01 | 2.8507E−01 | 2.4051E−01 | 2.8829E−02 |
| A8= | −1.6656E−02 | −5.1471E−02 | −2.1324E−01 | −2.2141E−01 | −2.4762E−02 |
| A10= | 2.1842E−03 | 9.4105E−03 | 9.3207E−02 | 1.2215E−01 | 1.3504E−02 |
| A12= | −4.1664E−04 | −3.3863E−03 | −2.5175E−02 | −3.8923E−02 | −4.1306E−03 |
| A14= | 1.0871E−04 | 1.3992E−03 | 3.8173E−03 | 6.5170E−03 | 6.5013E−04 |
| A16= | | −1.7318E−04 | −2.3969E−04 | −4.4128E−04 | −4.1226E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 10.01 | \|f1/f4\| | 0.28 |
| Fno | 2.45 | ΣAT/BL | 0.16 |
| HFOV [deg.] | 15.9 | \|Y52/Y11\| | 0.97 |
| \|tan(HFOV)\| | 0.29 | \|(2 × Y52)/EPD\| | 0.97 |
| (V2 + V3 + V4 + V5)/4 | 21.7 | SD/TD | 0.88 |
| CT4/CT2 | 0.26 | ImgH/EPD | 0.72 |
| (T23 + T34)/CT2 | 0.28 | (10 × Yc41)/f | 0.31 |
| T34/T45 | 2.70 | (10 × Yc42)/f | 0.61 |
| TD/CT2 | 3.36 | (10 × Yc51)/f | 0.37 |
| (R3 + R4)/(R3 − R4) | −0.64 | (10 × Yc52)/f | 0.69 |
| f1/CT2 | 2.44 | | |

According to the 8th embodiment of the present disclosure, when a refractive power of the first lens element 810 is P1 (which is f/f1, a ratio value of the focal length of the photographing optical lens assembly f and the focal length of the first lens element f1), a refractive power of the second lens element 820 is P2 (which is f/f2, a ratio value of the focal length of the photographing optical lens assembly f and a focal length of the second lens element f2), a refractive power of the third lens element 830 is P3 (which is f/f3, a ratio value of the focal length of the photographing optical lens assembly f and a focal length of the third lens element f3), a refractive power of the fourth lens element 840 is P4 (which is f/f4, a ratio value of the focal length of the photographing optical lens assembly f and the focal length of the fourth lens element f4), a refractive power of the fifth lens element 850 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 8th embodiment of the present disclosure, when at least three of the first lens element 810, the second lens element 820, the third lens element 830, the fourth lens element 840 and the fifth lens element 850 have an Abbe number smaller than 30.0. In detail, all of the Abbe numbers of the second lens element 820, the third lens element 830, the fourth lens element 840 and the fifth lens element 850 are smaller than 30.0.

9th Embodiment

Figure 17:
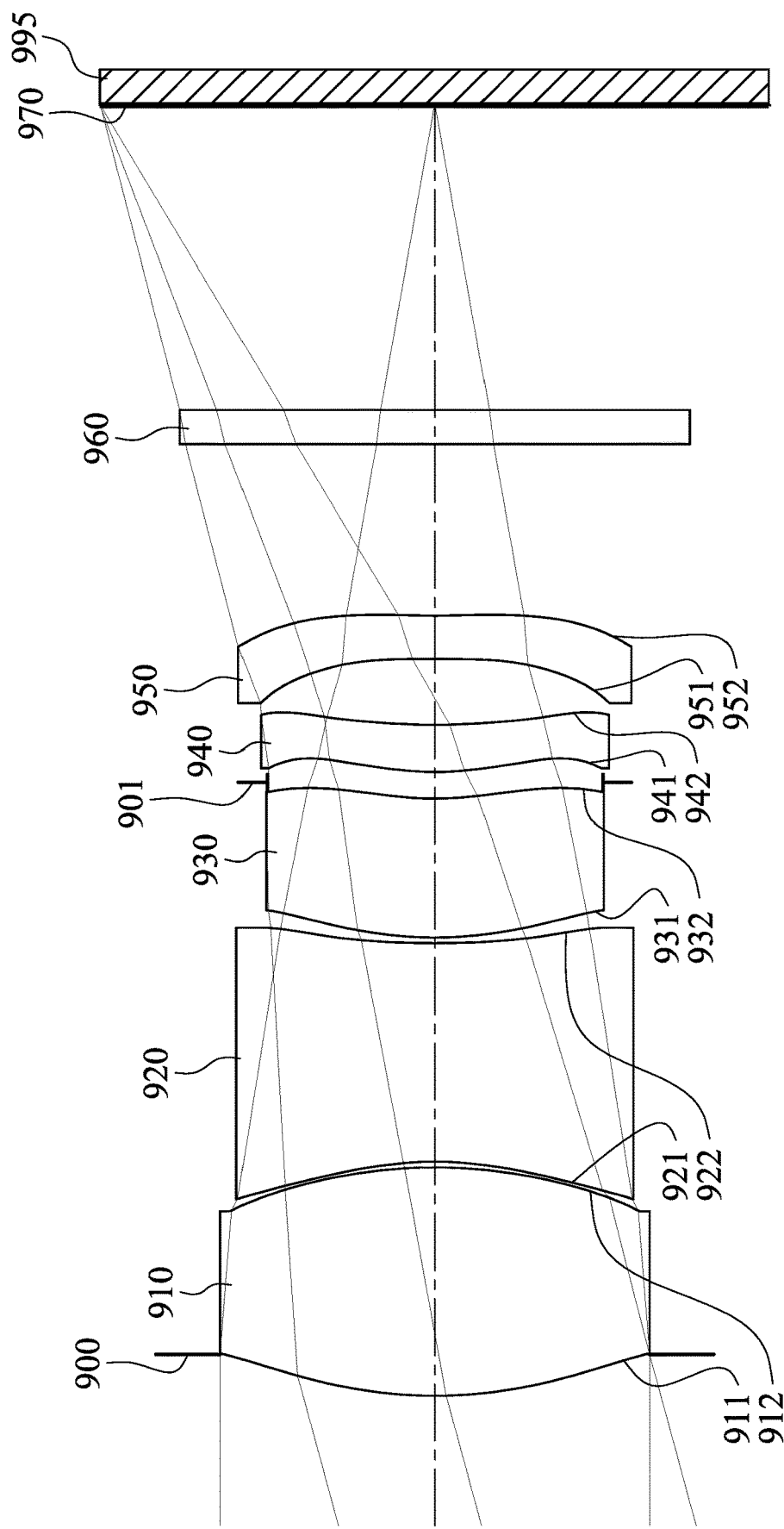
FIG. 17 is a schematic view of an image capturing apparatus according to the 9th embodiment of the present disclosure.
Figure 18:
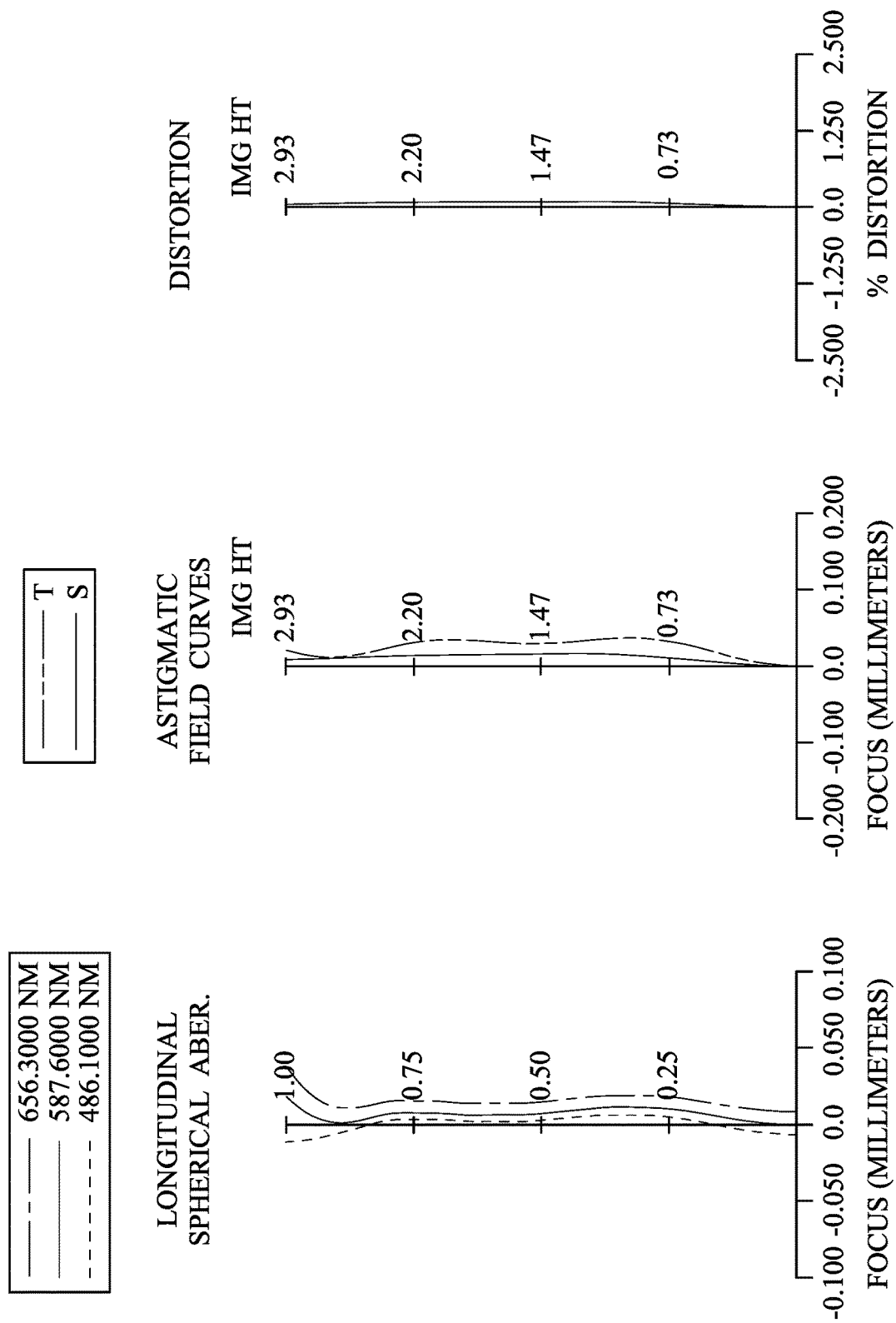
FIG. 18 shows spherical aberration curves, astigmatic field curves and a distortion curve of the image capturing apparatus according to the 9th embodiment.

FIG. 17 is a schematic view of an image capturing apparatus according to the 9th embodiment of the present disclosure. FIG. 18 shows spherical aberration curves, astigmatic field curves and a distortion curve of the image capturing apparatus according to the 9th embodiment. In FIG. 17, the image capturing apparatus includes a photographing optical lens assembly (its reference numeral is omitted) and an image sensor 995. The photographing optical lens assembly includes, in order from an object side to an image side along an optical axis, an aperture stop 900, a first lens element 910, a second lens element 920, a third lens element 930, a stop 901, a fourth lens element 940, a fifth lens element 950, a filter 960 and an image surface 970, wherein the image sensor 995 is disposed on the image surface 970 of the photographing optical lens assembly. The photographing optical lens assembly has a total of five lens elements (910-950), and there is an air space between every two lens elements of the first lens element 910, the second lens element 920, the third lens element 930, the fourth lens element 940 and the fifth lens element 950 that are adjacent to each other.

The first lens element 910 with positive refractive power has an object-side surface 911 being convex in a paraxial region thereof and an image-side surface 912 being convex in a paraxial region thereof. The first lens element 910 is made of a plastic material, and has the object-side surface 911 and the image-side surface 912 being both aspheric. Furthermore, the object-side surface 911 of the first lens element 910 includes at least one inflection point.

The second lens element 920 with negative refractive power has an object-side surface 921 being concave in a paraxial region thereof and an image-side surface 922 being concave in a paraxial region thereof. The second lens element 920 is made of a plastic material, and has the object-side surface 921 and the image-side surface 922 being both aspheric. Furthermore, the image-side surface 922 of the second lens element 920 includes at least one inflection point.

The third lens element 930 with negative refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric. Furthermore, both of the object-side surface 931 and the image-side surface 932 of the third lens element 930 include at least one inflection point.

The fourth lens element 940 with positive refractive power has an object-side surface 941 being convex in a paraxial region thereof and an image-side surface 942 being concave in a paraxial region thereof. The fourth lens element 940 is made of a plastic material, and has the object-side surface 941 and the image-side surface 942 being both aspheric. Furthermore, both of the object-side surface 941 and the image-side surface 942 of the fourth lens element 940 include at least one inflection point.

The fifth lens element 950 with negative refractive power has an object-side surface 951 being concave in a paraxial region thereof and an image-side surface 952 being concave in a paraxial region thereof. The fifth lens element 950 is made of a plastic material, and has the object-side surface 951 and the image-side surface 952 being both aspheric. Furthermore, the image-side surface 952 of the fifth lens element 950 includes at least one inflection point.

The filter 960 is made of a glass material and located between the fifth lens element 950 and the image surface 970, and will not affect the focal length of the photographing optical lens assembly.

The detailed optical data of the 9th embodiment are shown in Table 17 and the aspheric surface data are shown in Table 18 below.

TABLE 17

9th Embodiment
f = 10.71 mm, Fno = 2.85, HFOV = 15.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.363 | | | | |
| 2 | Lens 1 | 3.977 | ASP | 2.000 | Plastic | 1.545 | 56.0 | 4.12 |
| 3 | | −4.228 | ASP | 0.050 | | | | |
| 4 | Lens 2 | −3.091 | ASP | 1.913 | Plastic | 1.584 | 28.2 | −3.87 |
| 5 | | 10.366 | ASP | 0.050 | | | | |
| 6 | Lens 3 | 3.572 | ASP | 1.220 | Plastic | 1.660 | 20.4 | −104.11 |
| 7 | | 2.935 | ASP | 0.141 | | | | |
| 8 | Stop | Plano | | 0.092 | | | | |
| 9 | Lens 4 | 2.684 | ASP | 0.408 | Plastic | 1.660 | 20.4 | 7.53 |
| 10 | | 5.485 | ASP | 0.578 | | | | |
| 11 | Lens 5 | −152.168 | ASP | 0.380 | Plastic | 1.639 | 23.5 | −12.14 |
| 12 | | 8.175 | ASP | 1.500 | | | | |
| 13 | Filter | Plano | | 0.300 | Glass | 1.517 | 64.2 | — |
| 14 | | Plano | | 2.670 | | | | |
| 15 | Image | Plano | | — | | | | |

Reference wavelength is 587.6 nm (d-line).
Effective radius of stop on surface 8 is 1.470 mm.

TABLE 18

Aspheric Coefficients

| Surface # | 2 | 3 | 4 | 5 | 6 |
|---|---|---|---|---|---|
| k= | −2.4839E−02 | −4.5226E−01 | −9.8661E−01 | 2.7253E+01 | −4.4472E−01 |
| A4= | −3.7860E−03 | 5.7137E−03 | 3.1672E−02 | 4.3964E−02 | 5.2288E−03 |
| A6= | −9.7007E−04 | 1.0445E−03 | −6.1193E−03 | −4.2217E−02 | −2.2181E−02 |
| A8= | 2.5022E−04 | −1.5795E−03 | 9.8788E−04 | 2.5440E−02 | 1.2060E−02 |
| A10= | −1.7385E−04 | 2.2459E−04 | −3.7753E−04 | −1.0347E−02 | −2.5486E−03 |
| A12= | 4.1418E−05 | 1.3202E−05 | 8.6217E−05 | 1.7632E−03 | −6.2854E−04 |
| A14= | −4.7402E−06 | −3.5526E−06 | −6.1503E−06 | −6.8946E−05 | 2.2908E−04 |

| Surface # | 7 | 9 | 10 | 11 | 12 |
|---|---|---|---|---|---|
| k= | −6.4949E−01 | 2.6521E−01 | −6.7430E−01 | −5.0000E+01 | 9.9275E+00 |
| A4= | −1.1342E−01 | −1.2205E−01 | −6.3040E−02 | −1.6111E−01 | −1.3241E−01 |
| A6= | 7.2812E−02 | 9.2386E−02 | 8.0380E−02 | 8.6236E−02 | 7.5458E−02 |
| A8= | −6.7609E−02 | −6.3601E−02 | −2.3786E−02 | −1.5494E−02 | −3.6254E−02 |
| A10= | 3.6503E−02 | 1.2531E−02 | −2.3815E−02 | −1.4094E−02 | 1.1947E−02 |
| A12= | −1.0203E−02 | −1.9817E−03 | 1.8411E−02 | 1.2530E−02 | −2.6478E−03 |
| A14= | 1.2122E−03 | 1.9366E−03 | −4.8330E−03 | −4.7171E−03 | 3.1793E−04 |
| A16= | | −4.5136E−04 | 4.5042E−04 | 6.7133E−04 | −1.0841E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 10.71 | |f1/f4| | 0.55 |
| Fno | 2.85 | ΣAT/BL | 0.20 |
| HFOV [deg.] | 15.3 | |Y52/Y11| | 0.92 |
| |tan(HFOV)| | 0.27 | |(2 × Y52)/EPD| | 0.92 |
| (V2 + V3 + V4 + V5)/4 | 23.1 | SD/TD | 0.95 |
| CT4/CT2 | 0.21 | ImgH/EPD | 0.78 |
| (T23 + T34)/CT2 | 0.15 | (10 × Yc41)/f | 0.67 |
| T34/T45 | 0.40 | (10 × Yc42)/f | 0.95 |
| TD/CT2 | 3.57 | (10 × Yc51)/f | — |
| (R3 + R4)/(R3 − R4) | −0.54 | (10 × Yc52)/f | 0.28 |
| f1/CT2 | 2.15 | | |

According to the 9th embodiment of the present disclosure, when a refractive power of the first lens element 910 is P1 (which is f/f1, a ratio value of the focal length of the photographing optical lens assembly f and the focal length of the first lens element f1), a refractive power of the second lens element 920 is P2 (which is f/f2, a ratio value of the focal length of the photographing optical lens assembly f and a focal length of the second lens element f2), a refractive power of the third lens element 930 is P3 (which is f/f3, a ratio value of the focal length of the photographing optical lens assembly f and a focal length of the third lens element f3), a refractive power of the fourth lens element 940 is P4 (which is f/f4, a ratio value of the focal length of the photographing optical lens assembly f and the focal length of the fourth lens element f4), a refractive power of the fifth lens element 950 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 9th embodiment of the present disclosure, when at least three of the first lens element 910, the second lens element 920, the third lens element 930, the fourth lens element 940 and the fifth lens element 950 have an Abbe number smaller than 30.0. In detail, all of the Abbe numbers of the second lens element 920, the third lens element 930, the fourth lens element 940 and the fifth lens element 950 are smaller than 30.0.

10th Embodiment

Figure 19:
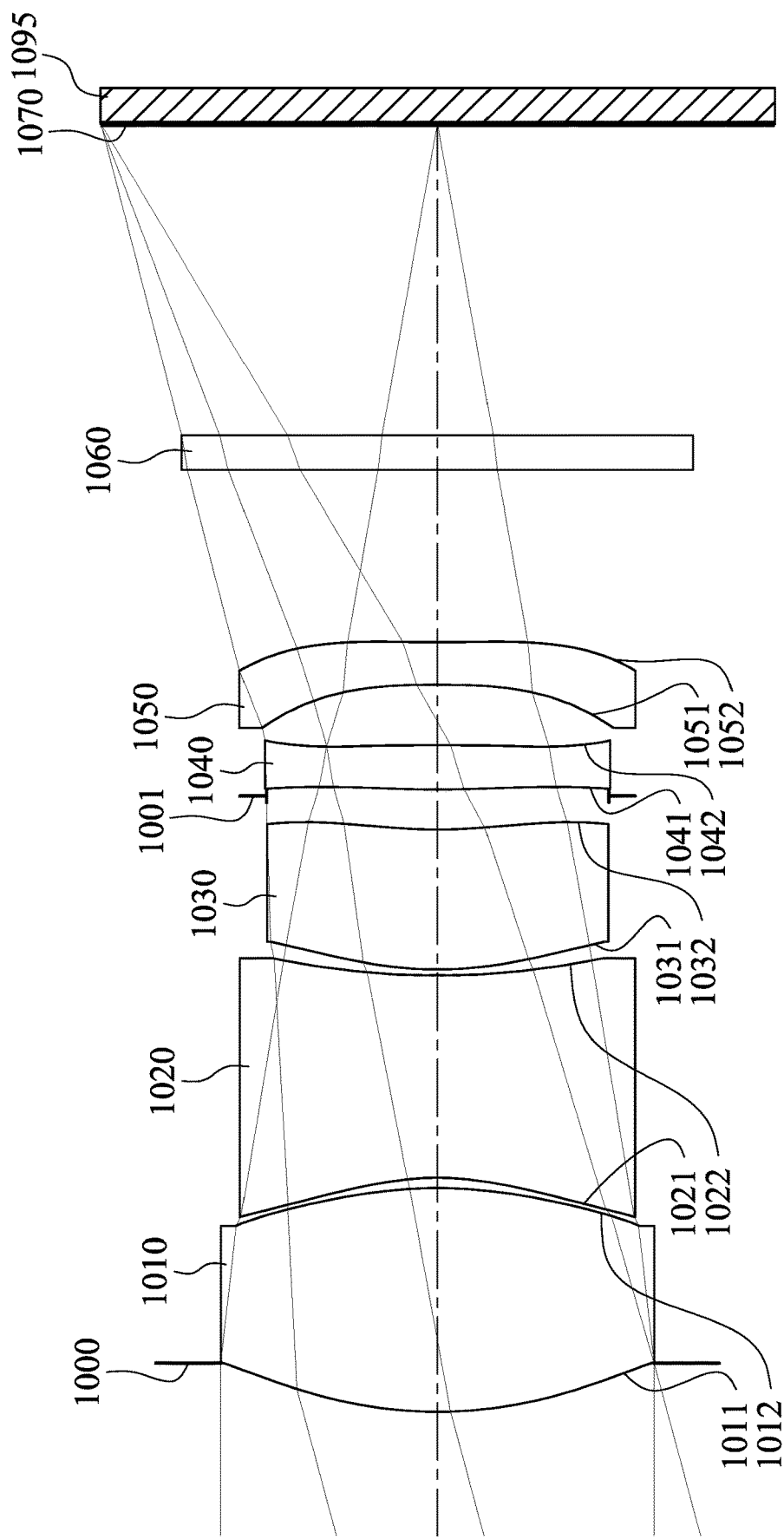
FIG. 19 is a schematic view of an image capturing apparatus according to the 10th embodiment of the present disclosure.
Figure 20:
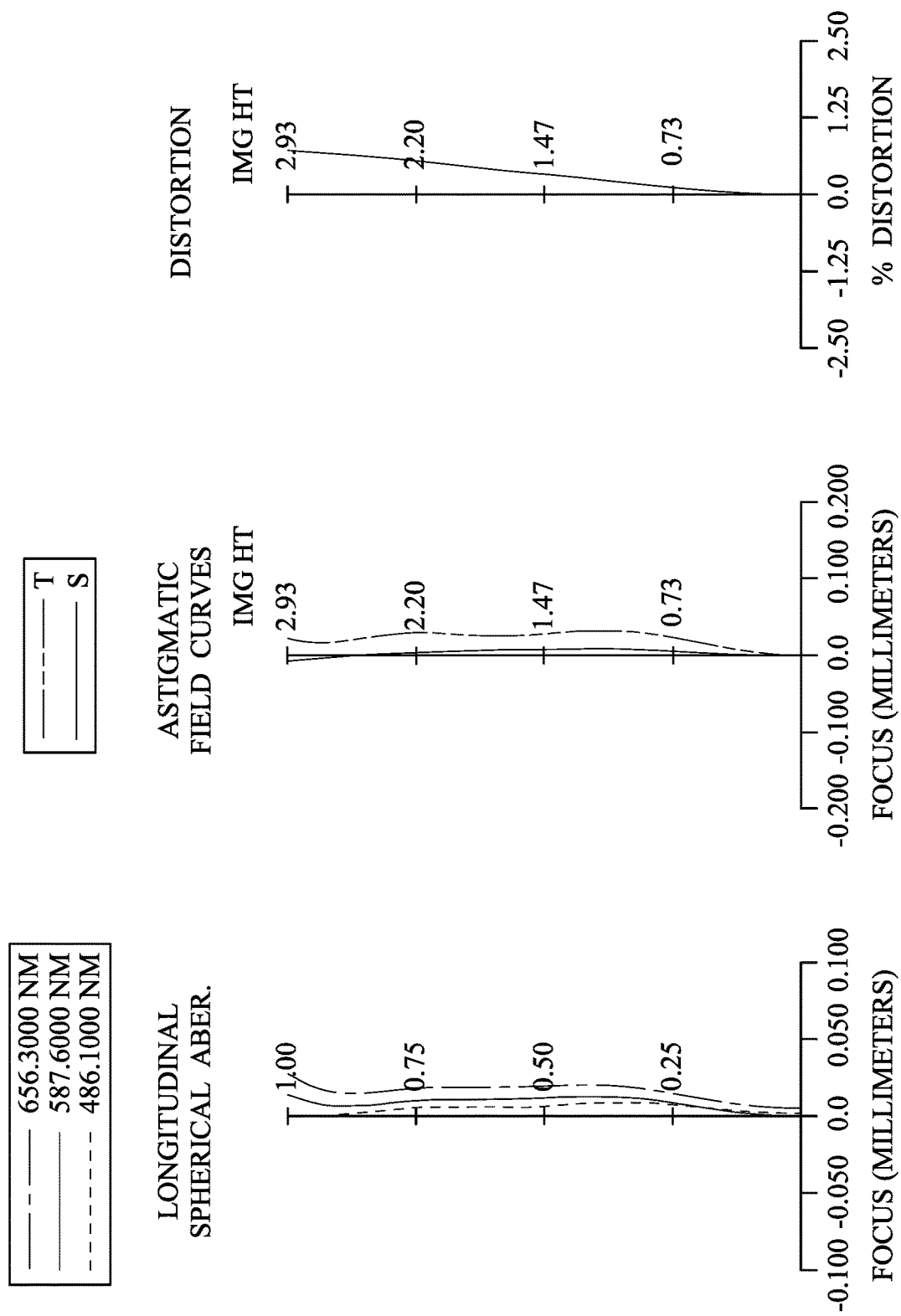
FIG. 20 shows spherical aberration curves, astigmatic field curves and a distortion curve of the image capturing apparatus according to the 10th embodiment.

FIG. 19 is a schematic view of an image capturing apparatus according to the 10th embodiment of the present disclosure. FIG. 20 shows spherical aberration curves, astigmatic field curves and a distortion curve of the image capturing apparatus according to the 10th embodiment. In FIG. 19, the image capturing apparatus includes a photographing optical lens assembly (its reference numeral is omitted) and an image sensor 1095. The photographing optical lens assembly includes, in order from an object side to an image side along an optical axis, an aperture stop 1000, a first lens element 1010, a second lens element 1020, a third lens element 1030, a stop 1001, a fourth lens element 1040, a fifth lens element 1050, a filter 1060 and an image surface 1070, wherein the image sensor 1095 is disposed on the image surface 1070 of the photographing optical lens assembly. The photographing optical lens assembly has a total of five lens elements (1010-1050), and there is an air space between every two lens elements of the first lens element 1010, the second lens element 1020, the third lens element 1030, the fourth lens element 1040 and the fifth lens element 1050 that are adjacent to each other.

The first lens element 1010 with positive refractive power has an object-side surface 1011 being convex in a paraxial region thereof and an image-side surface 1012 being convex in a paraxial region thereof. The first lens element 1010 is made of a plastic material, and has the object-side surface 1011 and the image-side surface 1012 being both aspheric. Furthermore, the object-side surface 1011 of the first lens element 1010 includes at least one inflection point.

The second lens element 1020 with negative refractive power has an object-side surface 1021 being concave in a paraxial region thereof and an image-side surface 1022 being concave in a paraxial region thereof. The second lens element 1020 is made of a plastic material, and has the object-side surface 1021 and the image-side surface 1022 being both aspheric. Furthermore, the object-side surface 1021 of the second lens element 1020 includes at least one inflection point.

The third lens element 1030 with positive refractive power has an object-side surface 1031 being convex in a paraxial region thereof and an image-side surface 1032 being concave in a paraxial region thereof. The third lens element 1030 is made of a plastic material, and has the object-side surface 1031 and the image-side surface 1032 being both aspheric. Furthermore, both of the object-side surface 1031 and the image-side surface 1032 of the third lens element 1030 include at least one inflection point.

The fourth lens element 1040 with positive refractive power has an object-side surface 1041 being convex in a paraxial region thereof and an image-side surface 1042 being concave in a paraxial region thereof. The fourth lens element 1040 is made of a plastic material, and has the object-side surface 1041 and the image-side surface 1042 being both aspheric. Furthermore, both of the object-side surface 1041 and the image-side surface 1042 of the fourth lens element 1040 include at least one inflection point.

The fifth lens element 1050 with negative refractive power has an object-side surface 1051 being concave in a paraxial region thereof and an image-side surface 1052 being concave in a paraxial region thereof. The fifth lens element 1050 is made of a plastic material, and has the object-side surface 1051 and the image-side surface 1052 being both aspheric. Furthermore, the image-side surface 1052 of the fifth lens element 1050 includes at least one inflection point.

The filter 1060 is made of a glass material and located between the fifth lens element 1050 and the image surface 1070, and will not affect the focal length of the photographing optical lens assembly.

The detailed optical data of the 10th embodiment are shown in Table 19 and the aspheric surface data are shown in Table 20 below.

TABLE 19

10th Embodiment
f = 10.74 mm, Fno = 2.85, HFOV = 15.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.423 | | | | |
| 2 | Lens 1 | 3.712 | ASP | 1.948 | Plastic | 1.545 | 56.0 | 3.78 |
| 3 | | −3.771 | ASP | 0.089 | | | | |
| 4 | Lens 2 | −2.498 | ASP | 1.763 | Plastic | 1.584 | 28.2 | −3.32 |
| 5 | | 10.961 | ASP | 0.050 | | | | |
| 6 | Lens 3 | 3.428 | ASP | 1.220 | Plastic | 1.660 | 20.4 | 17.60 |
| 7 | | 4.174 | ASP | 0.294 | | | | |
| 8 | Stop | Plano | | 0.056 | | | | |
| 9 | Lens 4 | 6.576 | ASP | 0.381 | Plastic | 1.660 | 20.4 | 10.36 |
| 10 | | 166.731 | ASP | 0.529 | | | | |
| 11 | Lens 5 | −10.869 | ASP | 0.370 | Plastic | 1.639 | 23.3 | −9.22 |
| 12 | | 13.031 | ASP | 1.500 | | | | |
| 13 | Filter | Plano | | 0.300 | Glass | 1.517 | 64.2 | — |
| 14 | | Plano | | 2.713 | | | | |
| 15 | Image | Plano | | — | | | | |

Reference wavelength is 587.6 nm (d-line).
Effective radius of stop on surface 8 is 1.490 mm.

TABLE 20

Aspheric Coefficients

| Surface # | 2 | 3 | 4 | 5 | 6 |
|---|---|---|---|---|---|
| k= | 4.2907E−02 | −1.4484E+00 | −1.5623E+00 | 3.5457E+01 | −5.6789E−01 |
| A4= | −2.9374E−03 | 2.1642E−02 | 5.3617E−02 | 5.9338E−02 | 1.3054E−02 |
| A6= | −1.0943E−03 | −8.2460E−03 | −2.1278E−02 | −5.8496E−02 | −3.5524E−02 |
| A8= | 5.4994E−04 | 3.1710E−03 | 8.1210E−03 | 2.4612E−02 | 1.3506E−02 |
| A10= | −3.1288E−04 | −1.0604E−03 | −2.2024E−03 | −3.9447E−03 | −3.2156E−04 |
| A12= | 7.0967E−05 | 1.6020E−04 | 3.1675E−04 | −3.4415E−04 | −1.0088E−03 |
| A14= | −7.0316E−06 | −9.1423E−06 | −1.9580E−05 | 1.2091E−04 | 2.0002E−04 |

| Surface # | 7 | 9 | 10 | 11 | 12 |
|---|---|---|---|---|---|
| k= | −1.1548E−01 | 4.1157E+00 | 5.0000E+01 | −1.2505E+01 | 4.9872E+01 |
| A4= | −8.2356E−02 | −1.0484E−01 | −6.3501E−02 | −1.0362E−01 | −8.3831E−02 |
| A6= | 3.8729E−02 | 4.4012E−02 | 4.6716E−02 | 4.2869E−02 | 3.2320E−02 |
| A8= | −1.7347E−02 | 2.6824E−02 | 9.2003E−03 | −4.6013E−03 | −7.6157E−03 |
| A10= | 3.6542E−03 | −1.8925E−02 | 9.5917E−03 | 5.3370E−04 | −1.9718E−03 |
| A12= | −4.1451E−04 | −9.4697E−03 | −2.8973E−02 | −6.3604E−03 | 1.3300E−03 |
| A14= | 1.1915E−04 | 8.4772E−03 | 1.4675E−02 | 3.6312E−03 | −1.8575E−04 |
| A16= | | −1.5065E−03 | −2.2653E−03 | −5.6470E−04 | −2.3841E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 10.74 | |f1/f4| | 0.36 |
| Fno | 2.85 | ΣAT/BL | 0.23 |
| HFOV [deg.] | 15.1 | |Y52/Y11| | 0.91 |
| |tan(HFOV)| | 0.27 | |(2 × Y52)/EPD| | 0.91 |
| (V2 + V3 + V4 + V5)/4 | 23.1 | SD/TD | 0.94 |
| CT4/CT2 | 0.22 | ImgH/EPD | 0.78 |
| (T23 + T34)/CT2 | 0.23 | (10 × Yc41)/f | 0.36 |

-continued

| 10th Embodiment | | | |
|---|---|---|---|
| T34/T45 | 0.66 | (10 × Yc42)/f | 0.08 |
| TD/CT2 | 3.80 | (10 × Yc51)/f | — |
| (R3 + R4)/(R3 − R4) | −0.63 | (10 × Yc52)/f | 0.28 |
| f1/CT2 | 2.15 | | |

According to the 10th embodiment of the present disclosure, when a refractive power of the first lens element 1010 is P1 (which is f/f1, a ratio value of the focal length of the photographing optical lens assembly f and the focal length of the first lens element f1), a refractive power of the second lens element 1020 is P2 (which is f/f2, a ratio value of the focal length of the photographing optical lens assembly f and a focal length of the second lens element f2), a refractive power of the third lens element 1030 is P3 (which is f/f3, a ratio value of the focal length of the photographing optical lens assembly f and a focal length of the third lens element f3), a refractive power of the fourth lens element 1040 is P4

(which is f/f4, a ratio value of the focal length of the photographing optical lens assembly f and the focal length of the fourth lens element f4), a refractive power of the fifth lens element 1050 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 10th embodiment of the present disclosure, when at least three of the first lens element 1010, the second lens element 1020, the third lens element 1030, the fourth lens element 1040 and the fifth lens element 1050 have an Abbe number smaller than 30.0. In detail, all of the Abbe numbers of the second lens element 1020, the third lens element 1030, the fourth lens element 1040 and the fifth lens element 1050 are smaller than 30.0.

11th Embodiment

Figure 21:
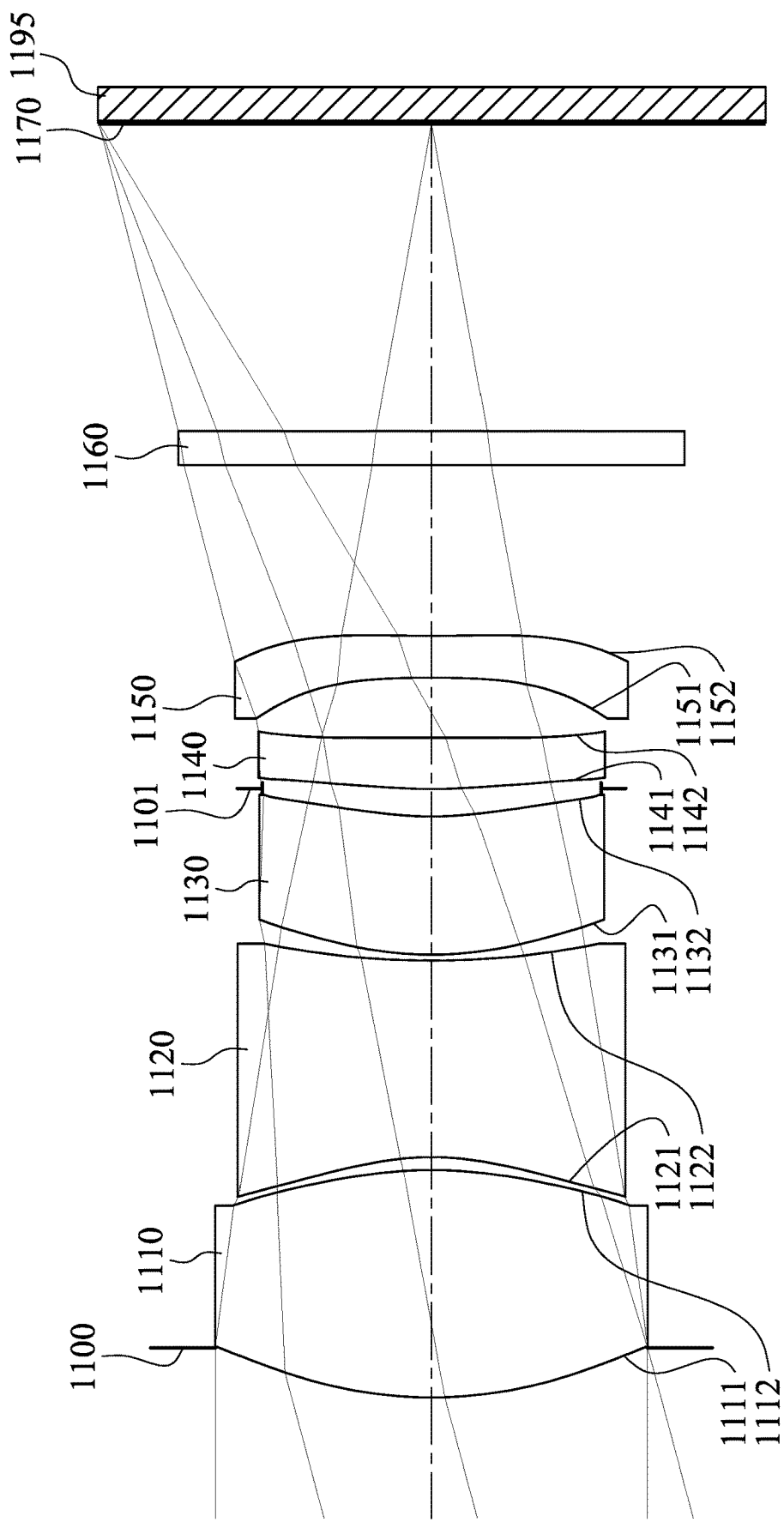
FIG. 21 is a schematic view of an image capturing apparatus according to the 11th embodiment of the present disclosure.
Figure 22:
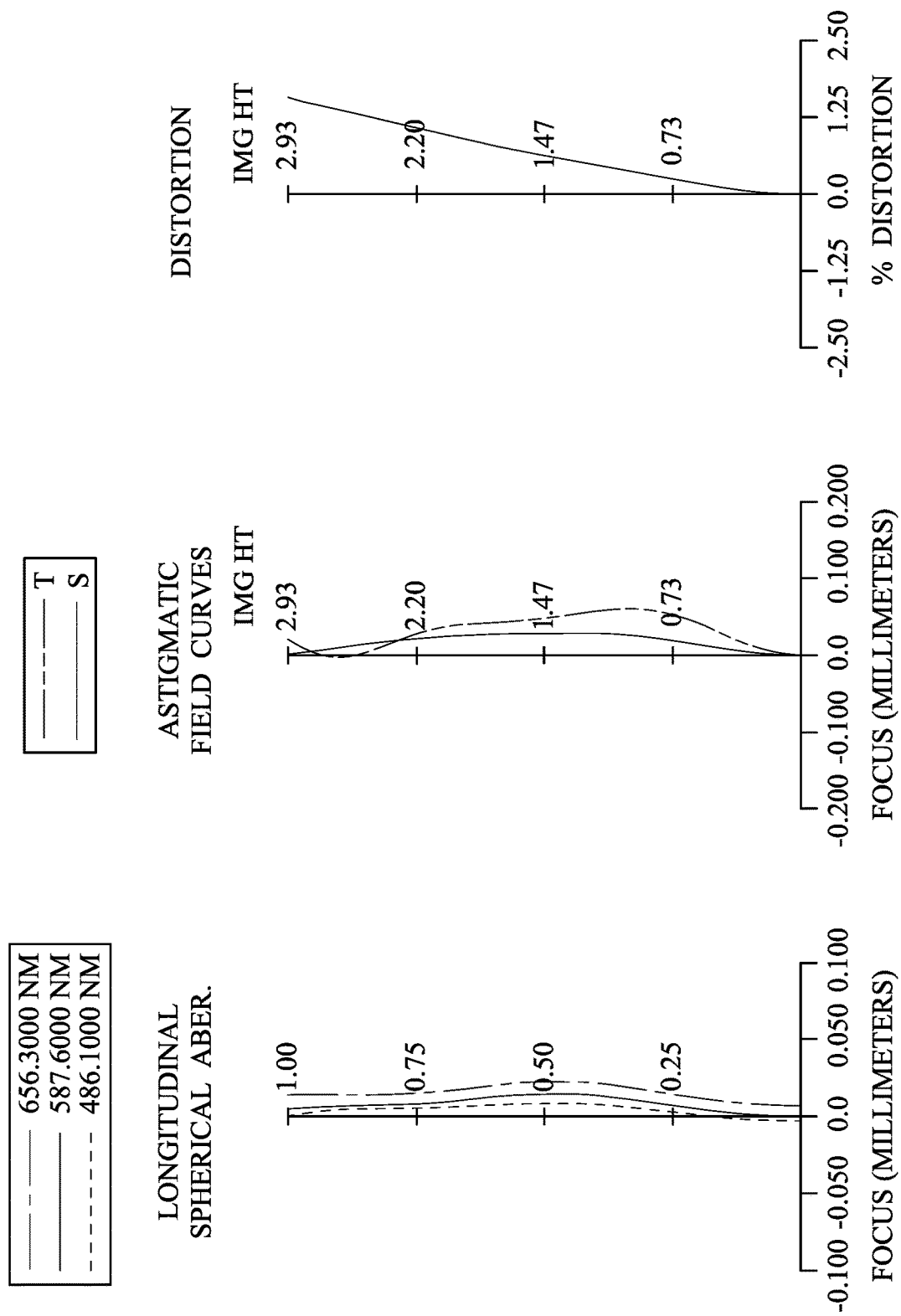
FIG. 22 shows spherical aberration curves, astigmatic field curves and a distortion curve of the image capturing apparatus according to the 11th embodiment.

FIG. 21 is a schematic view of an image capturing apparatus according to the 11th embodiment of the present disclosure. FIG. 22 shows spherical aberration curves, astigmatic field curves and a distortion curve of the image capturing apparatus according to the 11th embodiment. In FIG. 21, the image capturing apparatus includes a photographing optical lens assembly (its reference numeral is omitted) and an image sensor 1195. The photographing optical lens assembly includes, in order from an object side to an image side along an optical axis, an aperture stop 1100, a first lens element 1110, a second lens element 1120, a third lens element 1130, a stop 1101, a fourth lens element 1140, a fifth lens element 1150, a filter 1160 and an image surface 1170, wherein the image sensor 1195 is disposed on the image surface 1170 of the photographing optical lens assembly. The photographing optical lens assembly has a total of five lens elements (1110-1150), and there is an air space between every two lens elements of the first lens element 1110, the second lens element 1120, the third lens element 1130, the fourth lens element 1140 and the fifth lens element 1150 that are adjacent to each other.

The first lens element 1110 with positive refractive power has an object-side surface 1111 being convex in a paraxial region thereof and an image-side surface 1112 being convex in a paraxial region thereof. The first lens element 1110 is made of a plastic material, and has the object-side surface 1111 and the image-side surface 1112 being both aspheric. Furthermore, the object-side surface 1111 of the first lens element 1110 includes at least one inflection point.

The second lens element 1120 with negative refractive power has an object-side surface 1121 being concave in a paraxial region thereof and an image-side surface 1122 being concave in a paraxial region thereof. The second lens element 1120 is made of a plastic material, and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of a plastic material, and has the object-side surface 1131 and the image-side surface 1132 being both aspheric. Furthermore, the image-side surface 1132 of the third lens element 1130 includes at least one inflection point.

The fourth lens element 1140 with positive refractive power has an object-side surface 1141 being convex in a paraxial region thereof and an image-side surface 1142 being concave in a paraxial region thereof. The fourth lens element 1140 is made of a plastic material, and has the object-side surface 1141 and the image-side surface 1142 being both aspheric. Furthermore, both of the object-side surface 1141 and the image-side surface 1142 of the fourth lens element 1140 include at least one inflection point.

The fifth lens element 1150 with negative refractive power has an object-side surface 1151 being concave in a paraxial region thereof and an image-side surface 1152 being concave in a paraxial region thereof. The fifth lens element 1150 is made of a plastic material, and has the object-side surface 1151 and the image-side surface 1152 being both aspheric. Furthermore, the image-side surface 1152 of the fifth lens element 1150 includes at least one inflection point.

The filter 1160 is made of a glass material and located between the fifth lens element 1150 and the image surface 1170, and will not affect the focal length of the photographing optical lens assembly.

The detailed optical data of the 11th embodiment are shown in Table 21 and the aspheric surface data are shown in Table 22 below.

TABLE 21

11th Embodiment
f = 10.69 mm, Fno = 2.82, HFOV = 15.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.438 | | | | |
| 2 | Lens 1 | 3.746 | ASP | 2.000 | Plastic | 1.545 | 56.0 | 3.82 |
| 3 | | −3.795 | ASP | 0.114 | | | | |
| 4 | Lens 2 | −2.459 | ASP | 1.730 | Plastic | 1.584 | 28.2 | −3.32 |
| 5 | | 11.587 | ASP | 0.050 | | | | |
| 6 | Lens 3 | 3.231 | ASP | 1.220 | Plastic | 1.660 | 20.4 | 34.47 |
| 7 | | 3.200 | ASP | 0.246 | | | | |
| 8 | Stop | Plano | | −0.004 | | | | |
| 9 | Lens 4 | 4.741 | ASP | 0.446 | Plastic | 1.660 | 20.4 | 8.48 |
| 10 | | 29.839 | ASP | 0.529 | | | | |
| 11 | Lens 5 | −15.493 | ASP | 0.370 | Plastic | 1.639 | 23.3 | −10.94 |
| 12 | | 12.856 | ASP | 1.500 | | | | |

TABLE 21-continued

11th Embodiment
f = 10.69 mm, Fno = 2.82, HFOV = 15.1 deg.

| Surface # | | Curvature Radius | Thickness | Material | Index | Abbe # | Focal Length |
|---|---|---|---|---|---|---|---|
| 13 | Filter | Plano | 0.300 | Glass | 1.517 | 64.2 | — |
| 14 | | Plano | 2.715 | | | | |
| 15 | Image | Plano | — | | | | |

Reference wavelength is 587.6 nm (d-line).
Effective radius of stop on surface 8 is 1.490 mm.

TABLE 22

Aspheric Coefficients

| Surface # | 2 | 3 | 4 | 5 | 6 |
|---|---|---|---|---|---|
| k= | 1.7159E−01 | −1.7781E+00 | −1.5310E+00 | 3.5488E+01 | −1.6212E−01 |
| A4= | −2.2497E−03 | 2.1936E−02 | 5.4734E−02 | 5.3705E−02 | 1.0029E−02 |
| A6= | −1.5827E−03 | −9.1768E−03 | −2.3411E−02 | −5.1566E−02 | −2.8115E−02 |
| A8= | 9.0659E−04 | 3.8455E−03 | 9.7603E−03 | 1.9234E−02 | 7.7125E−03 |
| A10= | −4.1116E−04 | −1.2510E−03 | −2.9355E−03 | −1.2649E−03 | 2.4667E−03 |
| A12= | 8.5440E−05 | 1.9832E−04 | 5.0219E−04 | −8.3305E−04 | −1.3739E−03 |
| A14= | −7.5997E−06 | −1.4080E−05 | −4.0004E−05 | 1.2586E−04 | 1.5980E−04 |

| Surface # | 7 | 9 | 10 | 11 | 12 |
|---|---|---|---|---|---|
| k= | 7.8454E−01 | 4.2381E+00 | −8.4098E+01 | −6.6161E+00 | 4.9612E+01 |
| A4= | −8.8203E−02 | −1.0592E−01 | −5.4045E−02 | −9.5940E−02 | −7.4957E−02 |
| A6= | 4.5889E−02 | 6.5911E−02 | 5.7905E−02 | 4.6098E−02 | 2.0969E−02 |
| A8= | −1.6583E−02 | −2.4699E−02 | −4.0434E−02 | −3.6503E−02 | 5.0128E−04 |
| A10= | 1.7680E−03 | 3.5019E−02 | 6.4630E−02 | 4.5441E−02 | −4.6583E−03 |
| A12= | −3.1245E−04 | −3.9596E−02 | −5.9715E−02 | −3.5591E−02 | 1.3600E−03 |
| A14= | 3.1290E−04 | 1.6949E−02 | 2.3317E−02 | 1.2779E−02 | 1.4087E−05 |
| A16= | | −2.4273E−03 | −3.2277E−03 | −1.6687E−03 | −3.6095E−05 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 10.69 | |f1/f4| | 0.45 |
| Fno | 2.82 | ΣAT/BL | 0.21 |
| HFOV [deg.] | 15.1 | |Y52/Y11| | 0.91 |
| |tan(HFOV)| | 0.27 | |(2 × Y52)/EPD| | 0.91 |
| (V2 + V3 + V4 + V5)/4 | 23.1 | SD/TD | 0.93 |
| CT4/CT2 | 0.26 | ImgH/EPD | 0.77 |
| (T23 + T34)/CT2 | 0.17 | (10 × Yc41)/f | 0.99 |
| T34/T45 | 0.46 | (10 × Yc42)/f | 0.23 |
| TD/CT2 | 3.87 | (10 × Yc51)/f | — |
| (R3 + R4)/(R3 − R4) | −0.65 | (10 × Yc52)/f | 0.30 |
| f1/CT2 | 2.21 | | |

According to the 11th embodiment of the present disclosure, when a refractive power of the first lens element 1110 is P1 (which is f/f1, a ratio value of the focal length of the photographing optical lens assembly f and the focal length of the first lens element f1), a refractive power of the second lens element 1120 is P2 (which is f/f2, a ratio value of the focal length of the photographing optical lens assembly f and a focal length of the second lens element f2), a refractive power of the third lens element 1130 is P3 (which is f/f3, a ratio value of the focal length of the photographing optical lens assembly f and a focal length of the third lens element f3), a refractive power of the fourth lens element 1140 is P4 (which is f/f4, a ratio value of the focal length of the photographing optical lens assembly f and the focal length of the fourth lens element f4), a refractive power of the fifth lens element 1150 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 11th embodiment of the present disclosure, when at least three of the first lens element 1110, the second lens element 1120, the third lens element 1130, the fourth lens element 1140 and the fifth lens element 1150 have an Abbe number smaller than 30.0. In detail, all of the Abbe numbers of the second lens element 1120, the third lens element 1130, the fourth lens element 1140 and the fifth lens element 1150 are smaller than 30.0.

12th Embodiment

Figure 23:
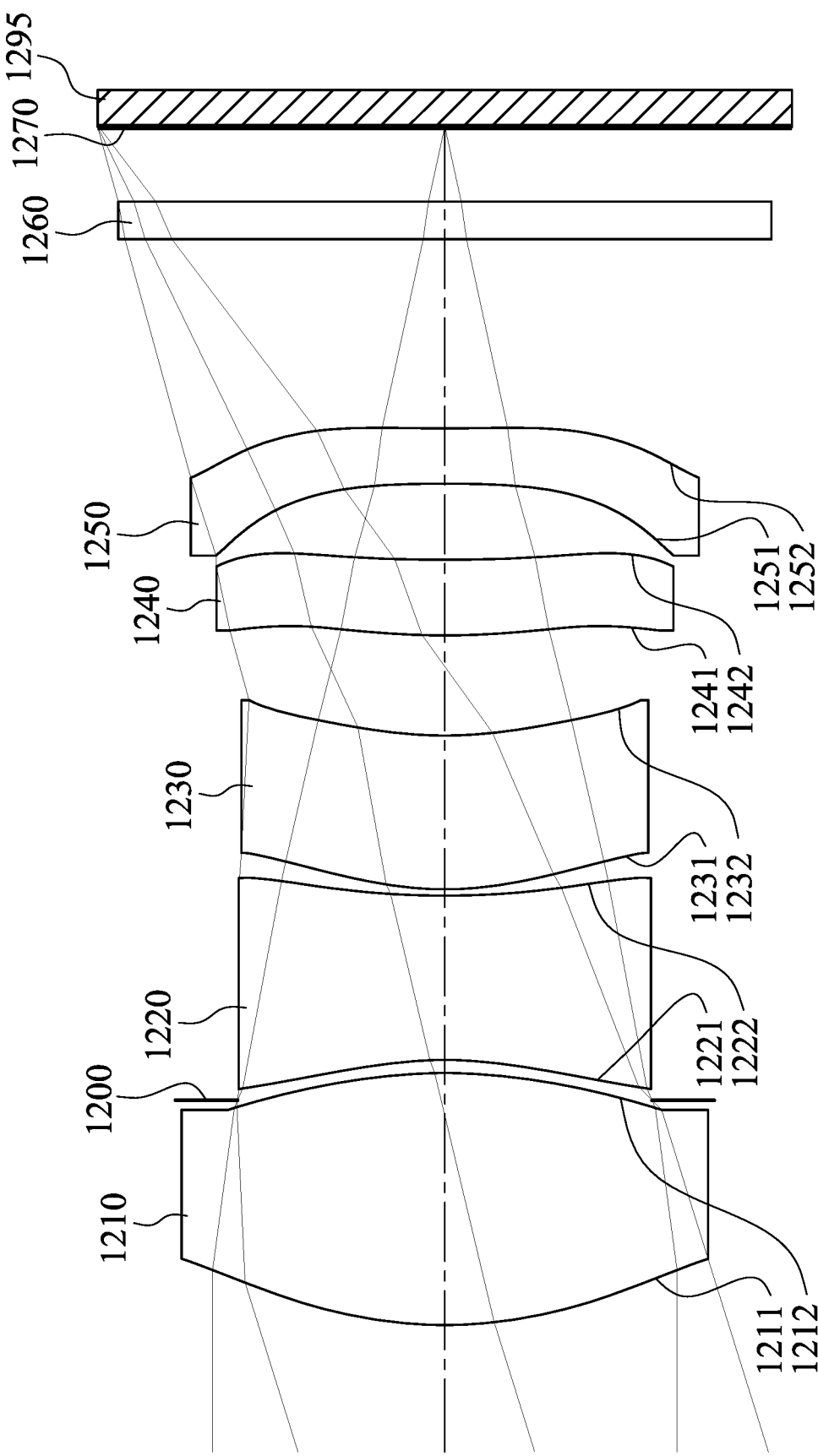
FIG. 23 is a schematic view of an image capturing apparatus according to the 12th embodiment of the present disclosure.
Figure 24:
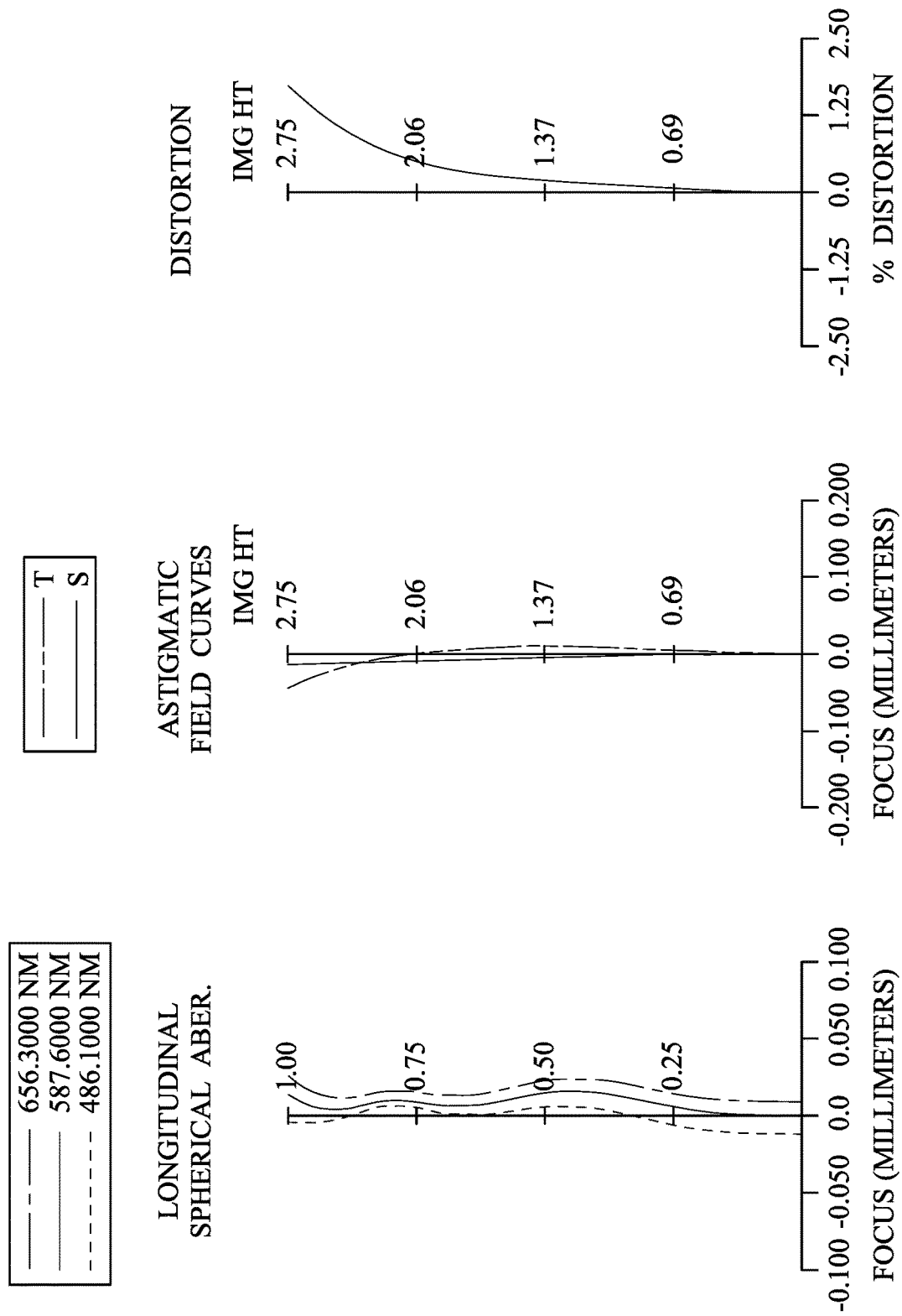
FIG. 24 shows spherical aberration curves, astigmatic field curves and a distortion curve of the image capturing apparatus according to the 12th embodiment.

FIG. 23 is a schematic view of an image capturing apparatus according to the 12th embodiment of the present disclosure. FIG. 24 shows spherical aberration curves, astigmatic field curves and a distortion curve of the image capturing apparatus according to the 12th embodiment. In FIG. 23, the image capturing apparatus includes a photographing optical lens assembly (its reference numeral is omitted) and an image sensor 1295. The photographing optical lens assembly includes, in order from an object side to an image side along an optical axis, a first lens element 1210, an aperture stop 1200, a second lens element 1220, a third lens element 1230, a fourth lens element 1240, a fifth lens element 1250, a filter 1260 and an image surface 1270, wherein the image sensor 1295 is disposed on the image surface 1270 of the photographing optical lens assembly. The photographing optical lens assembly has a total of five lens elements (1210-1250), and there is an air space between every two lens elements of the first lens element 1210, the second lens element 1220, the third lens element 1230, the fourth lens element 1240 and the fifth lens element 1250 that are adjacent to each other.

The first lens element 1210 with positive refractive power has an object-side surface 1211 being convex in a paraxial region thereof and an image-side surface 1212 being convex in a paraxial region thereof. The first lens element 1210 is made of a plastic material, and has the object-side surface 1211 and the image-side surface 1212 being both aspheric. Furthermore, the object-side surface 1211 of the first lens element 1210 includes at least one inflection point.

The second lens element 1220 with negative refractive power has an object-side surface 1221 being concave in a paraxial region thereof and an image-side surface 1222 being concave in a paraxial region thereof. The second lens element 1220 is made of a plastic material, and has the object-side surface 1221 and the image-side surface 1222 being both aspheric. Furthermore, both of the object-side surface 1221 and the image-side surface 1222 of the second lens element 1220 include at least one inflection point.

The third lens element 1230 with positive refractive power has an object-side surface 1231 being convex in a paraxial region thereof and an image-side surface 1232 being concave in a paraxial region thereof. The third lens element 1230 is made of a plastic material, and has the object-side surface 1231 and the image-side surface 1232 being both aspheric. Furthermore, the object-side surface 1231 of the third lens element 1230 includes at least one inflection point.

The fourth lens element 1240 with positive refractive power has an object-side surface 1241 being convex in a paraxial region thereof and an image-side surface 1242 being concave in a paraxial region thereof. The fourth lens element 1240 is made of a plastic material, and has the object-side surface 1241 and the image-side surface 1242 being both aspheric. Furthermore, both of the object-side surface 1241 and the image-side surface 1242 of the fourth lens element 1240 include at least one inflection point.

The fifth lens element 1250 with negative refractive power has an object-side surface 1251 being concave in a paraxial region thereof and an image-side surface 1252 being concave in a paraxial region thereof. The fifth lens element 1250 is made of a plastic material, and has the object-side surface 1251 and the image-side surface 1252 being both aspheric. Furthermore, both of the object-side surface 1251 and the image-side surface 1252 of the fifth lens element 1250 include at least one inflection point.

The filter 1260 is made of a glass material and located between the fifth lens element 1250 and the image surface 1270, and will not affect the focal length of the photographing optical lens assembly.

The detailed optical data of the 12th embodiment are shown in Table 23 and the aspheric surface data are shown in Table 24 below.

TABLE 23

12th Embodiment
f = 8.65 mm, Fno = 2.35, HFOV = 17.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.546 | ASP | 2.000 | Plastic | 1.545 | 56.0 | 3.85 |
| 2 | | −4.119 | ASP | −0.217 | | | | |
| 3 | Ape. Stop | Plano | | 0.321 | | | | |
| 4 | Lens 2 | −3.078 | ASP | 1.304 | Plastic | 1.614 | 26.0 | −3.50 |
| 5 | | 8.274 | ASP | 0.050 | | | | |
| 6 | Lens 3 | 2.831 | ASP | 1.220 | Plastic | 1.671 | 19.5 | 13.80 |
| 7 | | 3.373 | ASP | 0.795 | | | | |
| 8 | Lens 4 | 6.595 | ASP | 0.600 | Plastic | 1.660 | 20.4 | 15.35 |
| 9 | | 18.218 | ASP | 0.604 | | | | |
| 10 | Lens 5 | −12.691 | ASP | 0.439 | Plastic | 1.634 | 23.8 | −10.75 |
| 11 | | 14.927 | ASP | 1.500 | | | | |
| 12 | Filter | Plano | | 0.300 | Glass | 1.517 | 64.2 | — |
| 13 | | Plano | | 0.590 | | | | |
| 14 | Image | Plano | | — | | | | |

Reference wavelength is 587.6 nm (d-line).

TABLE 24

Aspheric Coefficients

| Surface # | 1 | 2 | 4 | 5 | 6 |
|---|---|---|---|---|---|
| k= | −2.1435E−01 | −9.9258E−01 | −1.8512E+00 | −3.3208E+00 | −1.3741E+00 |
| A4= | −3.1620E−03 | 2.0330E−02 | 5.5993E−02 | 4.6990E−02 | −4.0028E−04 |
| A6= | −1.6711E−03 | −8.0036E−03 | −2.3826E−02 | −5.6126E−02 | −3.7453E−02 |
| A8= | 1.2859E−03 | 2.6706E−03 | 8.0186E−03 | 2.6919E−02 | 2.0918E−02 |

TABLE 24-continued

| Aspheric Coefficients | | | | | |
|---|---|---|---|---|---|
| A10= | −6.3397E−04 | −1.4268E−03 | −2.4872E−03 | −4.4362E−03 | −3.7374E−03 |
| A12= | 1.2955E−04 | 5.2589E−04 | 6.9936E−04 | −5.2903E−04 | −1.2608E−05 |
| A14= | −9.8548E−06 | −6.9911E−05 | −9.2935E−05 | 1.4308E−04 | −3.5911E−06 |

| Surface # | 7 | 8 | 9 | 10 | 11 |
|---|---|---|---|---|---|
| k= | 1.7819E+00 | −4.5257E+00 | 4.9584E+01 | −2.8068E+01 | 4.8207E+01 |
| A4= | −3.7499E−02 | 8.4649E−03 | 2.9945E−02 | −5.4627E−02 | −6.5940E−02 |
| A6= | −1.3682E−03 | −2.4388E−02 | −2.5098E−02 | 8.8744E−03 | 1.6331E−02 |
| A8= | −1.0954E−03 | 1.0248E−02 | 9.0214E−03 | −6.2000E−03 | −6.6149E−03 |
| A10= | 3.5321E−03 | −7.6217E−03 | −5.1686E−03 | 6.9647E−03 | 3.2397E−03 |
| A12= | −1.0495E−03 | 4.2102E−03 | 2.2952E−03 | −4.0585E−03 | −1.2014E−03 |
| A14= | 8.0461E−05 | −1.0016E−03 | −5.4276E−04 | 9.8782E−04 | 2.3756E−04 |
| A16= | | 8.3161E−05 | 5.0826E−05 | −8.1093E−05 | −1.7884E−05 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 8.65 | |f1/f4| | 0.25 |
| Fno | 2.35 | ΣAT/BL | 0.65 |
| HFOV [deg.] | 17.3 | |Y52/Y11| | 0.96 |
| |tan(HFOV)| | 0.31 | |(2 × Y52)/EPD| | 1.09 |
| (V2 + V3 + V4 + V5)/4 | 22.4 | SD/TD | 0.75 |
| CT4/CT2 | 0.46 | ImgH/EPD | 0.75 |
| (T23 + T34)/CT2 | 0.65 | (10 × Yc41)/f | 0.91 |
| T34/T45 | 1.32 | (10 × Yc42)/f | 1.06 |
| TD/CT2 | 5.46 | (10 × Yc51)/f | 2.00 |
| (R3 + R4)/(R3 − R4) | −0.46 | (10 × Yc52)/f | 0.36 |
| f1/CT2 | 2.96 | | |

According to the 12th embodiment of the present disclosure, when a refractive power of the first lens element 1210 is P1 (which is f/f1, a ratio value of the focal length of the photographing optical lens assembly f and the focal length of the first lens element f1), a refractive power of the second lens element 1220 is P2 (which is f/f2, a ratio value of the focal length of the photographing optical lens assembly f and a focal length of the second lens element f2), a refractive power of the third lens element 1230 is P3 (which is f/f3, a ratio value of the focal length of the photographing optical lens assembly f and a focal length of the third lens element f3), a refractive power of the fourth lens element 1240 is P4 (which is f/f4, a ratio value of the focal length of the photographing optical lens assembly f and the focal length of the fourth lens element f4), a refractive power of the fifth lens element 1250 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 12th embodiment of the present disclosure, when at least three of the first lens element 1210, the second lens element 1220, the third lens element 1230, the fourth lens element 1240 and the fifth lens element 1250 have an Abbe number smaller than 30.0. In detail, all of the Abbe numbers of the second lens element 1220, the third lens element 1230, the fourth lens element 1240 and the fifth lens element 1250 are smaller than 30.0.

13th Embodiment

Figure 25A:
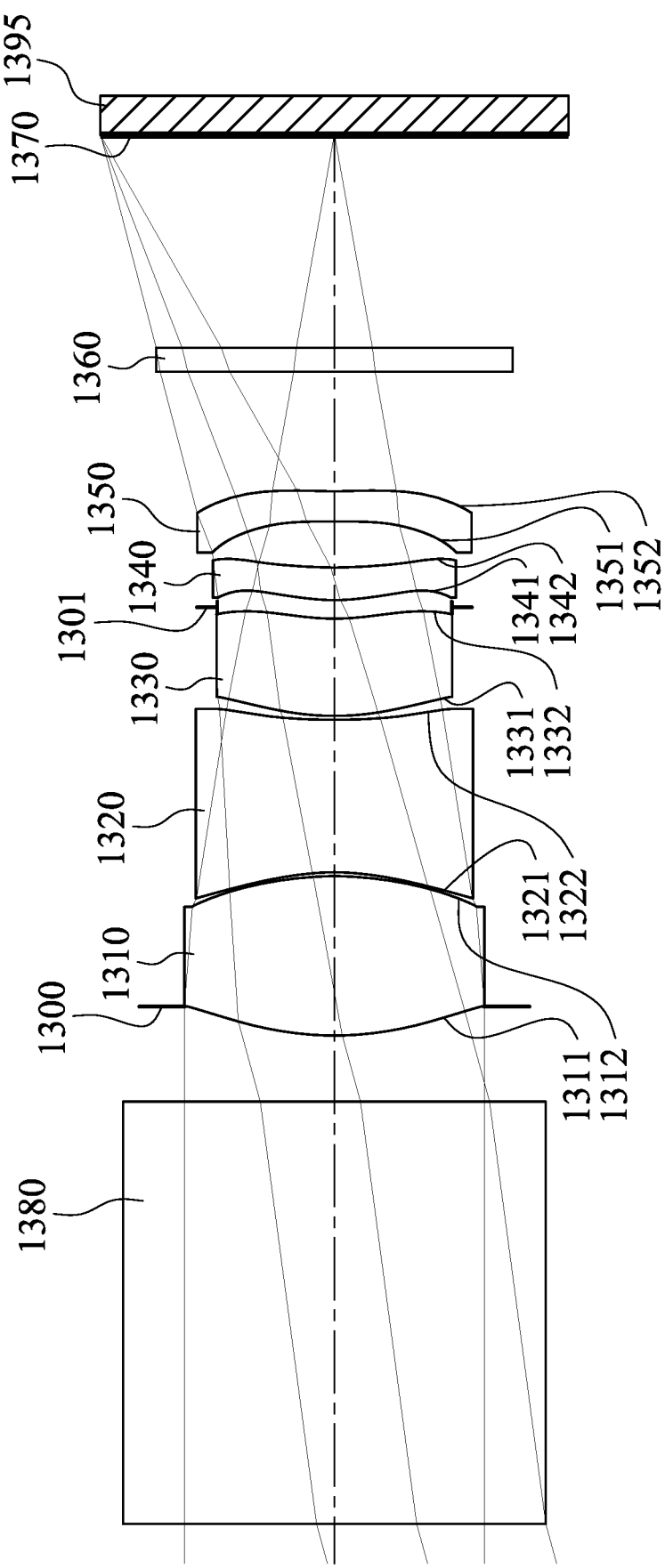
FIG. 25A is a schematic view of an image capturing apparatus according to the 13th embodiment of the present disclosure.
Figure 26:
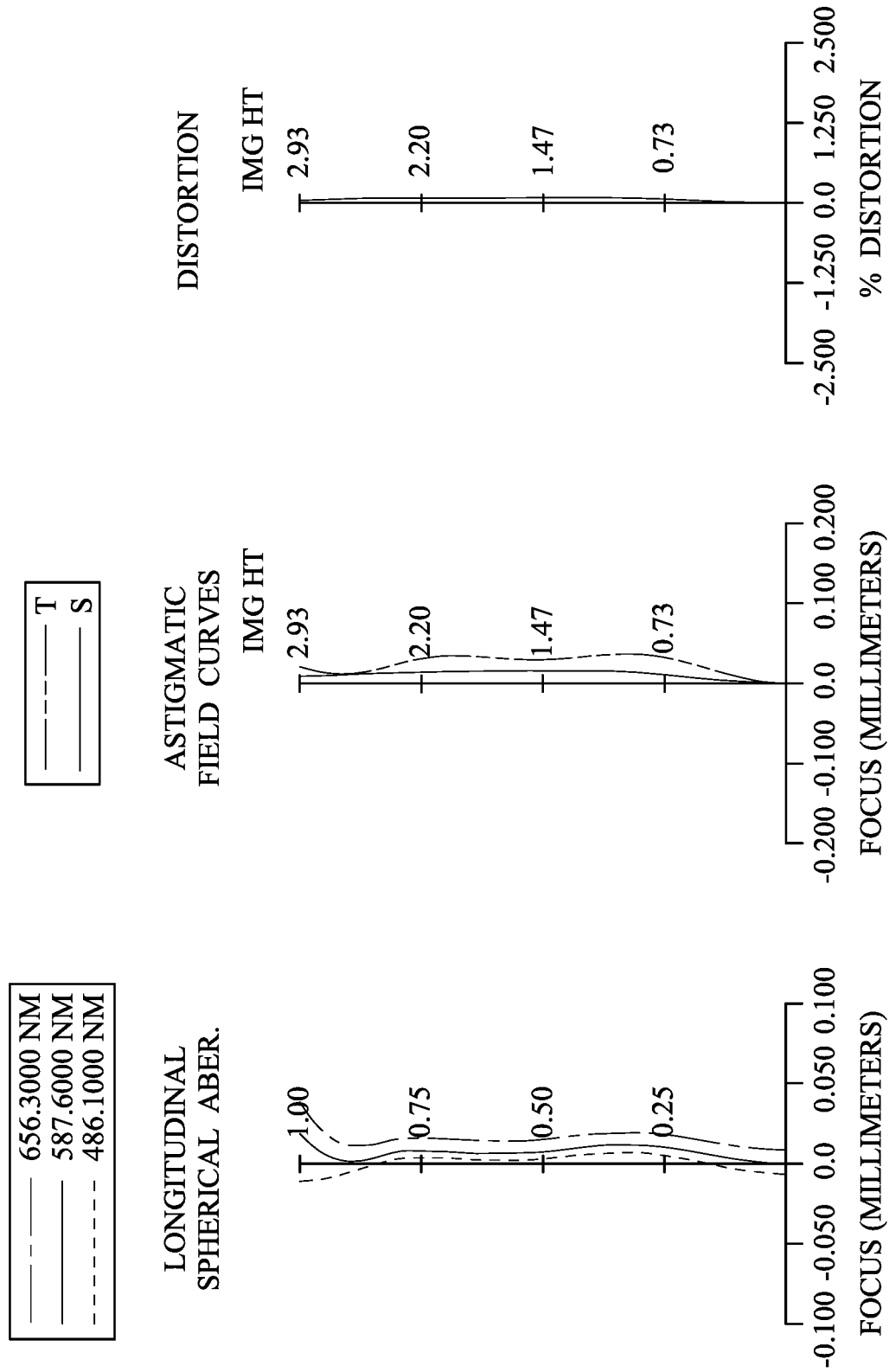
FIG. 26 shows spherical aberration curves, astigmatic field curves and a distortion curve of the image capturing apparatus according to the 13th embodiment.

FIG. 25A is a schematic view of an image capturing apparatus according to the 13th embodiment of the present disclosure. FIG. 26 shows spherical aberration curves, astigmatic field curves and a distortion curve of the image capturing apparatus according to the 13th embodiment. In FIG. 25A, the image capturing apparatus includes a photographing optical lens assembly (its reference numeral is omitted) and an image sensor 1395. The photographing optical lens assembly includes, in order from an object side to an image side along an optical axis, a prism 1380, an aperture stop 1300, a first lens element 1310, a second lens element 1320, a third lens element 1330, a stop 1301, a fourth lens element 1340, a fifth lens element 1350, a filter 1360 and an image surface 1370, wherein the image sensor 1395 is disposed on the image surface 1370 of the photographing optical lens assembly. The photographing optical lens assembly has a total of five lens elements (1310-1350), and there is an air space between every two lens elements of the first lens element 1310, the second lens element 1320, the third lens element 1330, the fourth lens element 1340 and the fifth lens element 1350 that are adjacent to each other.

The first lens element 1310 with positive refractive power has an object-side surface 1311 being convex in a paraxial region thereof and an image-side surface 1312 being convex in a paraxial region thereof. The first lens element 1310 is made of a plastic material, and has the object-side surface 1311 and the image-side surface 1312 being both aspheric. Furthermore, the object-side surface 1311 of the first lens element 1310 includes at least one inflection point.

The second lens element 1320 with negative refractive power has an object-side surface 1321 being concave in a paraxial region thereof and an image-side surface 1322 being concave in a paraxial region thereof. The second lens element 1320 is made of a plastic material, and has the object-side surface 1321 and the image-side surface 1322 being both aspheric. Furthermore, the image-side surface 1322 of the second lens element 1320 includes at least one inflection point.

The third lens element 1330 with negative refractive power has an object-side surface 1331 being convex in a paraxial region thereof and an image-side surface 1332 being concave in a paraxial region thereof. The third lens element 1330 is made of a plastic material, and has the object-side surface 1331 and the image-side surface 1332 being both aspheric. Furthermore, both of the object-side surface 1331 and the image-side surface 1332 of the third lens element 1330 include at least one inflection point.

The fourth lens element 1340 with positive refractive power has an object-side surface 1341 being convex in a paraxial region thereof and an image-side surface 1342 being concave in a paraxial region thereof. The fourth lens element 1340 is made of a plastic material, and has the object-side surface 1341 and the image-side surface 1342 being both aspheric. Furthermore, both of the object-side surface 1341 and the image-side surface 1342 of the fourth lens element 1340 include at least one inflection point.

The fifth lens element 1350 with negative refractive power has an object-side surface 1351 being concave in a paraxial region thereof and an image-side surface 1352 being concave in a paraxial region thereof. The fifth lens element 1350 is made of a plastic material, and has the object-side surface 1351 and the image-side surface 1352 being both aspheric. Furthermore, the image-side surface 1352 of the fifth lens element 1350 includes at least one inflection point.

The filter 1360 is made of a glass material and located between the fifth lens element 1350 and the image surface 1370, and will not affect the focal length of the photographing optical lens assembly.

According to the 13th embodiment of the present disclosure, the photographing optical lens assembly includes the prism 1380 made of a glass material. The prism 1380 is an object-side reflective element located between an imaged object (its reference numeral is omitted) and the aperture stop 1300 on an optical path (which is located on an optical axis of the photographing optical lens assembly according to the 13th embodiment).

The detailed optical data of the 13th embodiment are shown in Table 25 and the aspheric surface data are shown in Table 26 below.

TABLE 25

13th Embodiment
f = 10.71 mm, Fno = 2.85, HFOV = 15.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Prism | Plano | | 5.300 | Glass | 2.000 | 25.5 | — |
| 2 | | Plano | | 1.193 | | | | |
| 3 | Ape. Stop | Plano | | −0.363 | | | | |
| 4 | Lens 1 | 3.977 | ASP | 2.000 | Plastic | 1.545 | 56.0 | 4.12 |
| 5 | | −4.228 | ASP | 0.050 | | | | |
| 6 | Lens 2 | −3.091 | ASP | 1.913 | Plastic | 1.584 | 28.2 | −3.87 |
| 7 | | 10.366 | ASP | 0.050 | | | | |
| 8 | Lens 3 | 3.572 | ASP | 1.220 | Plastic | 1.660 | 20.4 | −104.11 |
| 9 | | 2.935 | ASP | 0.141 | | | | |
| 10 | Stop | Plano | | 0.092 | | | | |
| 11 | Lens 4 | 2.684 | ASP | 0.408 | Plastic | 1.660 | 20.4 | 7.53 |
| 12 | | 5.485 | ASP | 0.578 | | | | |
| 13 | Lens 5 | −152.168 | ASP | 0.380 | Plastic | 1.639 | 23.5 | −12.14 |
| 14 | | 8.175 | ASP | 1.500 | | | | |
| 15 | Filter | Plano | | 0.300 | Glass | 1.517 | 64.2 | — |
| 16 | | Plano | | 2.670 | | | | |
| 17 | Image | Plano | | — | | | | |

Reference wavelength is 587.6 nm (d-line).
Effective radius of stop on surface 10 is 1.470 mm.
Prism (1380) has reflective surface.

TABLE 26

Aspheric Coefficients

| Surface # | 4 | 5 | 6 | 7 | 8 |
|---|---|---|---|---|---|
| k= | −2.4839E−02 | −4.5226E−01 | −9.8661E−01 | 2.7253E+01 | −4.4472E−01 |
| A4= | −3.7860E−03 | 5.7137E−03 | 3.1672E−02 | 4.3964E−02 | 5.2288E−03 |
| A6= | −9.7007E−04 | 1.0445E−03 | −6.1193E−03 | −4.2217E−02 | −2.2181E−02 |
| A8= | 2.5022E−04 | −1.5795E−03 | 9.8788E−04 | 2.5440E−02 | 1.2060E−02 |
| A10= | −1.7385E−04 | 2.2459E−04 | −3.7753E−04 | −1.0347E−02 | −2.5486E−03 |
| A12= | 4.1418E−05 | 1.3202E−05 | 8.6217E−05 | 1.7632E−03 | −6.2854E−04 |
| A14= | −4.7402E−06 | −3.5526E−06 | −6.1503E−06 | −6.8946E−05 | 2.2908E−04 |

| Surface # | 9 | 11 | 12 | 13 | 14 |
|---|---|---|---|---|---|
| k= | −6.4949E−01 | 2.6521E−01 | −6.7430E−01 | −5.0000E+01 | 9.9275E+00 |
| A4= | −1.1342E−01 | −1.2205E−01 | −6.3040E−02 | −1.6111E−01 | −1.3241E−01 |
| A6= | 7.2812E−02 | 9.2386E−02 | 8.0380E−02 | 8.6236E−02 | 7.5458E−02 |
| A8= | −6.7609E−02 | −6.3601E−02 | −2.3786E−02 | −1.5494E−02 | −3.6254E−02 |
| A10= | 3.6503E−02 | 1.2531E−02 | −2.3815E−02 | −1.4094E−02 | 1.1947E−02 |
| A12= | −1.0203E−02 | −1.9817E−03 | 1.8411E−02 | 1.2530E−02 | −2.6478E−03 |
| A14= | 1.2122E−03 | 1.9366E−03 | −4.8330E−03 | −4.7171E−03 | 3.1793E−04 |
| A16= | | −4.5136E−04 | 4.5042E−04 | 6.7133E−04 | −1.0841E−05 |

Figure 25B:
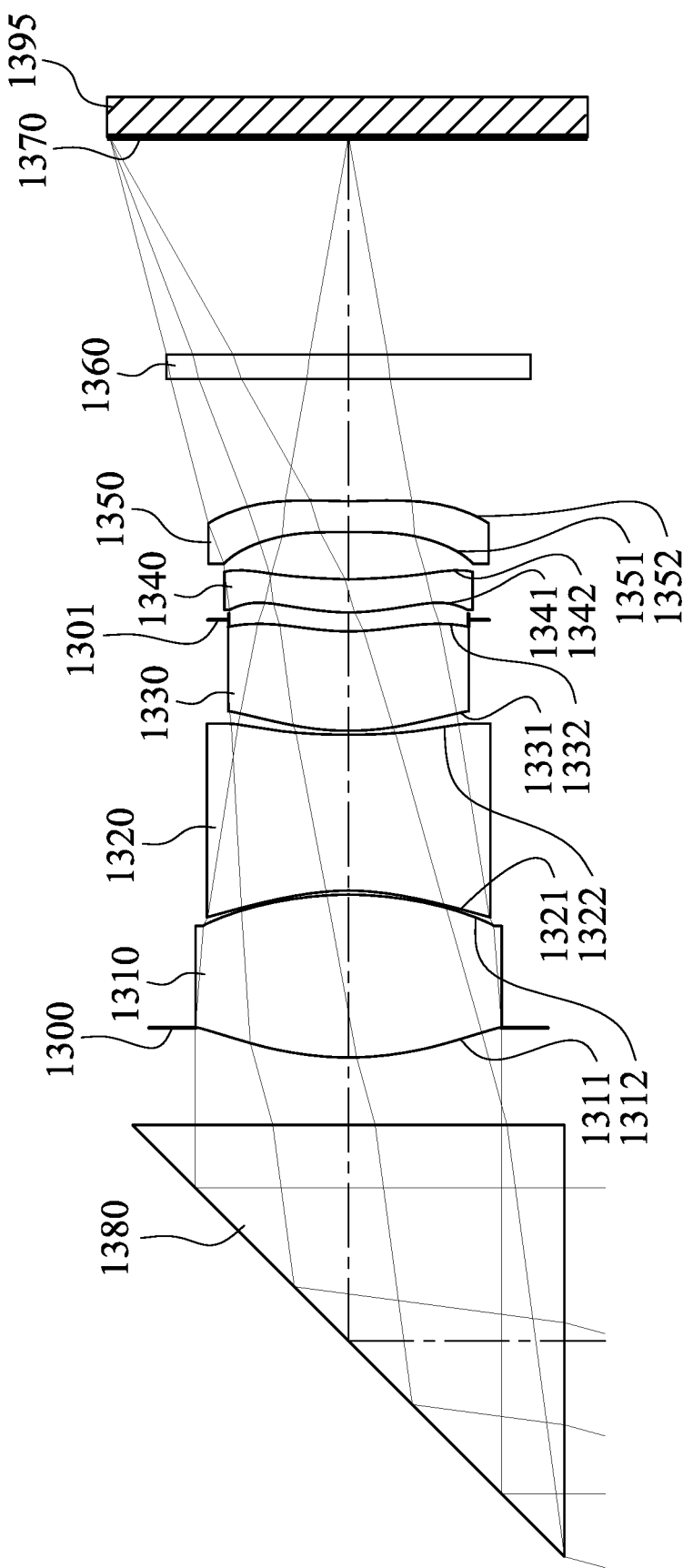
FIG. 25B is a schematic view of the image capturing apparatus according to the 13th embodiment of FIG. 25A in which the optical axis is folded by the prism.

Furthermore, FIG. 25B is a schematic view of the image capturing apparatus according to the 13th embodiment of FIG. 25A in which the optical axis is folded by the prism 1380. In FIG. 25B, the optical data of the prism 1380 is the same as the optical data in Table 25, wherein the difference between FIG. 25A and FIG. 25B is that FIG. 25A indicates the unfolded prism path of FIG. 25B. The unfolded prism path is called a tunnel diagram which can be used to determine the angular field of the prism and the size of the beam which will pass through the prism. The use of the prism 1380 therefore can change the directions of the incident light of the photographing optical lens assembly and the emerging light which is for imaging on the image surface 1370. Therefore, it is favorable for applying to various image capturing apparatus or electronic devices.

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Figure 38:
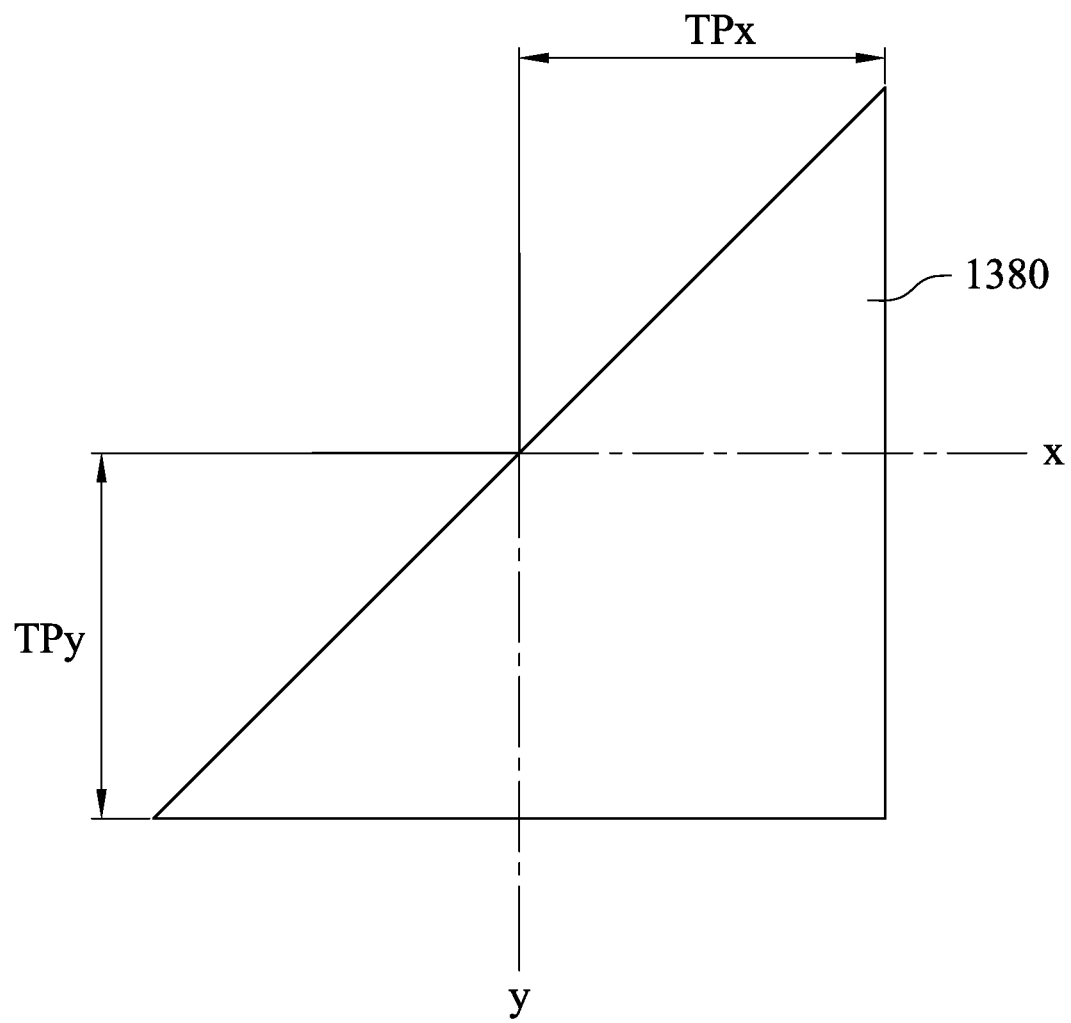
FIG. 38 is a schematic view of the parameter TP of the optical photographing assembly according to the 13th embodiment of FIG. 25B.

Moreover, FIG. 38 is a schematic view of the parameter TP of the optical photographing assembly according to the 13th embodiment of FIG. 25B. In FIG. 38, the prism 1380 has a first optical axis path X which with a light path length TPx (that is, an optical length from an incident surface of the prism to a reflective surface of the prism) and a second optical axis path Y which with a light path length TPy (that is, an optical length from the reflective surface of the prism to an exit surface of the prism), when a sum of light path lengths on the optical axis in the prism 1380 is TP, TP is defined as a sum of TPx and TPy, such as TP=TPx+TPy.

Moreover, these parameters can be calculated from Table 25 and Table 26 as the following values and satisfy the following conditions:

| 13th Embodiment | | | |
|---|---|---|---|
| f [mm] | 10.71 | \|f1/f4\| | 0.55 |
| Fno | 2.85 | ΣAT/BL | 0.20 |
| HFOV [deg.] | 15.3 | \|Y52/Y11\| | 0.92 |
| \|tan(HFOV)\| | 0.27 | \|(2 × Y52)/EPD\| | 0.92 |
| (V2 + V3 + V4 + V5)/4 | 23.1 | SD/TD | 0.95 |
| CT4/CT2 | 0.21 | ImgH/EPD | 0.78 |
| (T23 + T34)/CT2 | 0.15 | (10 × Yc41)/f | 0.67 |
| T34/T45 | 0.40 | (10 × Yc42)/f | 0.95 |
| TD/CT2 | 3.57 | (10 × Yc51)/f | — |
| (R3 + R4)/(R3 − R4) | −0.54 | (10 × Yc52)/f | 0.28 |
| f1/CT2 | 2.15 | TD/TP | 1.29 |

According to the 13th embodiment of the present disclosure, when a refractive power of the first lens element 1310 is P1 (which is f/f1, a ratio value of the focal length of the photographing optical lens assembly f and the focal length of the first lens element f1), a refractive power of the second lens element 1320 is P2 (which is f/f2, a ratio value of the focal length of the photographing optical lens assembly f and a focal length of the second lens element f2), a refractive power of the third lens element 1330 is P3 (which is f/f3, a ratio value of the focal length of the photographing optical lens assembly f and a focal length of the third lens element f3), a refractive power of the fourth lens element 1340 is P4 (which is f/f4, a ratio value of the focal length of the photographing optical lens assembly f and the focal length of the fourth lens element f4), a refractive power of the fifth lens element 1350 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 13th embodiment of the present disclosure, when at least three of the first lens element 1310, the second lens element 1320, the third lens element 1330, the fourth lens element 1340 and the fifth lens element 1350 have an Abbe number smaller than 30.0. In detail, all of the Abbe numbers of the second lens element 1320, the third lens element 1330, the fourth lens element 1340 and the fifth lens element 1350 are smaller than 30.0.

14th Embodiment

Figure 27A:
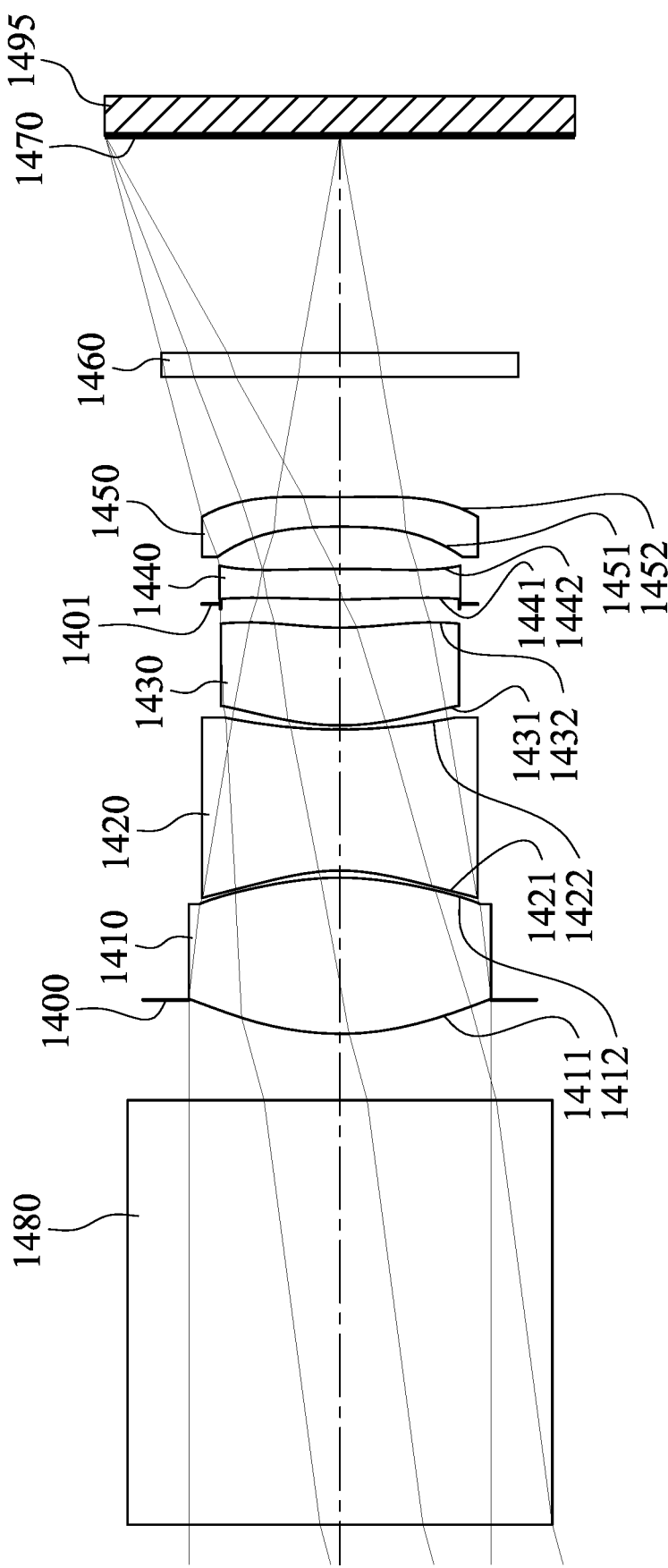
FIG. 27A is a schematic view of an image capturing apparatus according to the 14th embodiment of the present disclosure.
Figure 28:
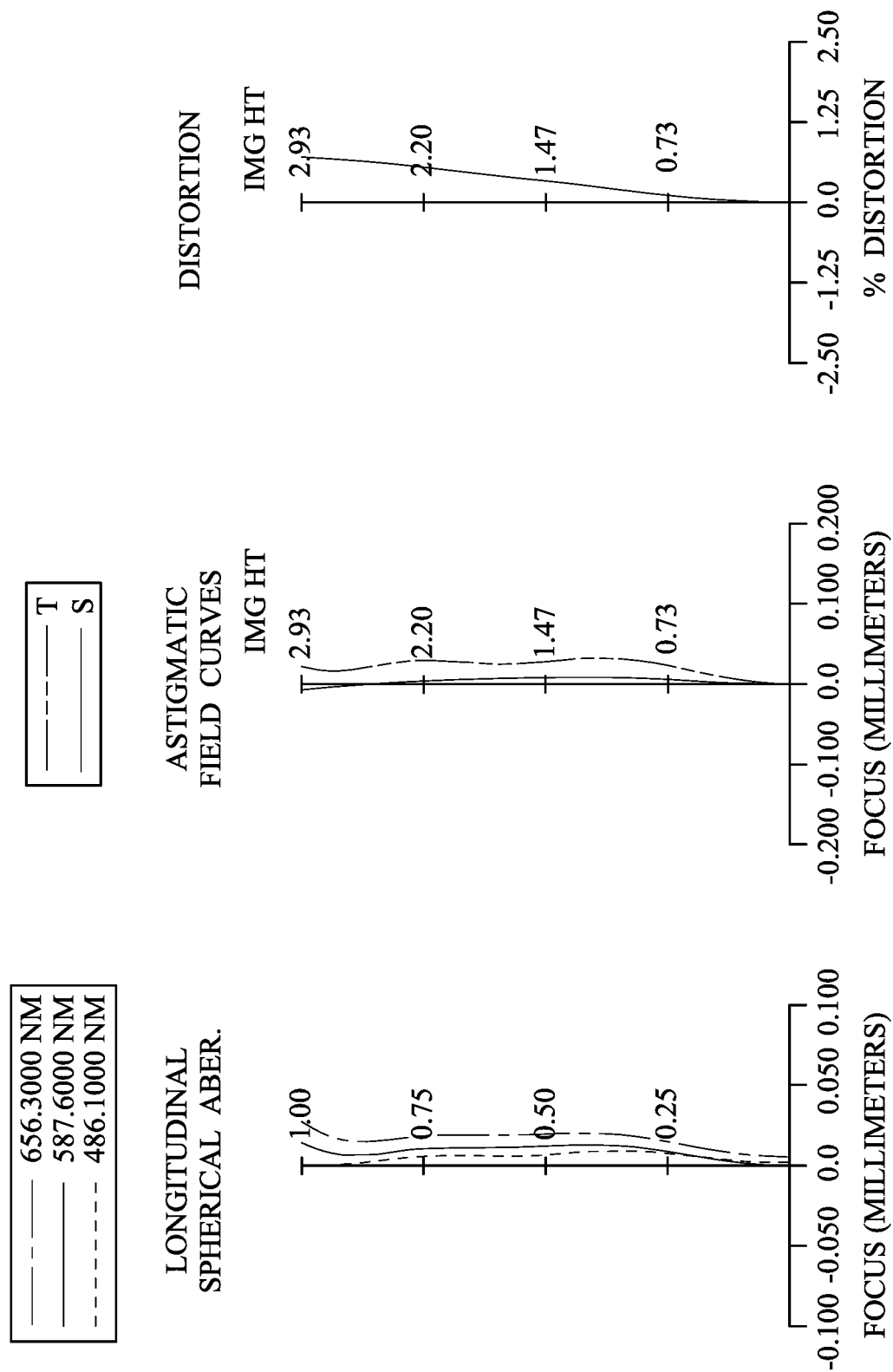
FIG. 28 shows spherical aberration curves, astigmatic field curves and a distortion curve of the image capturing apparatus according to the 14th embodiment.

FIG. 27A is a schematic view of an image capturing apparatus according to the 14th embodiment of the present disclosure. FIG. 28 shows spherical aberration curves, astigmatic field curves and a distortion curve of the image capturing apparatus according to the 14th embodiment. In FIG. 27A, the image capturing apparatus includes a photographing optical lens assembly (its reference numeral is omitted) and an image sensor 1495. The photographing optical lens assembly includes, in order from an object side to an image side along an optical axis, a prism 1480, an aperture stop 1400, a first lens element 1410, a second lens element 1420, a third lens element 1430, a stop 1401, a fourth lens element 1440, a fifth lens element 1450, a filter 1460 and an image surface 1470, wherein the image sensor 1495 is disposed on the image surface 1470 of the photographing optical lens assembly. The photographing optical lens assembly has a total of five lens elements (1410-1450), and there is an air space between every two lens elements of the first lens element 1410, the second lens element 1420, the third lens element 1430, the fourth lens element 1440 and the fifth lens element 1450 that are adjacent to each other.

The first lens element 1410 with positive refractive power has an object-side surface 1411 being convex in a paraxial region thereof and an image-side surface 1412 being convex in a paraxial region thereof. The first lens element 1410 is made of a plastic material, and has the object-side surface 1411 and the image-side surface 1412 being both aspheric. Furthermore, the object-side surface 1411 of the first lens element 1410 includes at least one inflection point.

The second lens element 1420 with negative refractive power has an object-side surface 1421 being concave in a paraxial region thereof and an image-side surface 1422 being concave in a paraxial region thereof. The second lens element 1420 is made of a plastic material, and has the object-side surface 1421 and the image-side surface 1422 being both aspheric. Furthermore, the object-side surface 1421 of the second lens element 1420 includes at least one inflection point.

The third lens element 1430 with positive refractive power has an object-side surface 1431 being convex in a paraxial region thereof and an image-side surface 1432 being concave in a paraxial region thereof. The third lens element 1430 is made of a plastic material, and has the object-side surface 1431 and the image-side surface 1432 being both aspheric. Furthermore, both of the object-side surface 1431 and the image-side surface 1432 of the third lens element 1430 include at least one inflection point.

The fourth lens element 1440 with positive refractive power has an object-side surface 1441 being convex in a paraxial region thereof and an image-side surface 1442 being concave in a paraxial region thereof. The fourth lens element 1440 is made of a plastic material, and has the object-side surface 1441 and the image-side surface 1442 being both aspheric. Furthermore, both of the object-side surface 1441 and the image-side surface 1442 of the fourth lens element 1440 include at least one inflection point.

The fifth lens element 1450 with negative refractive power has an object-side surface 1451 being concave in a paraxial region thereof and an image-side surface 1452 being concave in a paraxial region thereof. The fifth lens element 1450 is made of a plastic material, and has the object-side surface 1451 and the image-side surface 1452 being both aspheric. Furthermore, the image-side surface 1452 of the fifth lens element 1450 includes at least one inflection point.

The filter 1460 is made of a glass material and located between the fifth lens element 1450 and the image surface 1470, and will not affect the focal length of the photographing optical lens assembly.

According to the 14th embodiment of the present disclosure, the photographing optical lens assembly includes the prism 1480 made of a glass material. The prism 1480 is an object-side reflective element located between an imaged object (its reference numeral is omitted) and the aperture stop 1400 on an optical path (which is located on an optical axis of the photographing optical lens assembly according to the 14th embodiment).

The detailed optical data of the 14th embodiment are shown in Table 27 and the aspheric surface data are shown in Table 28 below.

TABLE 27

14th Embodiment
f = 10.74 mm, Fno = 2.85, HFOV = 15.1 deg.

| Surface # |           | Curvature Radius |     | Thickness | Material | Index | Abbe # | Focal Length |
|-----------|-----------|------------------|-----|-----------|----------|-------|--------|--------------|
| 0         | Object    | Plano            |     | Infinity  |          |       |        |              |
| 1         | Prism     | Plano            |     | 5.300     | Glass    | 2.000 | 25.5   | —            |
| 2         |           | Plano            |     | 1.253     |          |       |        |              |
| 3         | Ape. Stop | Plano            |     | −0.423    |          |       |        |              |
| 4         | Lens 1    | 3.712            | ASP | 1.948     | Plastic  | 1.545 | 56.0   | 3.78         |
| 5         |           | −3.771           | ASP | 0.089     |          |       |        |              |
| 6         | Lens 2    | −2.498           | ASP | 1.763     | Plastic  | 1.584 | 28.2   | −3.32        |
| 7         |           | 10.961           | ASP | 0.050     |          |       |        |              |
| 8         | Lens 3    | 3.428            | ASP | 1.220     | Plastic  | 1.660 | 20.4   | 17.60        |
| 9         |           | 4.174            | ASP | 0.294     |          |       |        |              |
| 10        | Stop      | Plano            |     | 0.056     |          |       |        |              |
| 11        | Lens 4    | 6.576            | ASP | 0.381     | Plastic  | 1.660 | 20.4   | 10.36        |
| 12        |           | 166.731          | ASP | 0.529     |          |       |        |              |
| 13        | Lens 5    | −10.869          | ASP | 0.370     | Plastic  | 1.639 | 23.3   | −9.22        |
| 14        |           | 13.031           | ASP | 1.500     |          |       |        |              |
| 15        | Filter    | Plano            |     | 0.300     | Glass    | 1.517 | 64.2   | —            |
| 16        |           | Plano            |     | 2.713     |          |       |        |              |
| 17        | Image     | Plano            |     | —         |          |       |        |              |

Reference wavelength is 587.6 nm (d-line).
Effective radius of stop on surface 10 is 1.490 mm.
Prism (1480) has reflective surface.

TABLE 28

Aspheric Coefficients

| Surface # | 4 | 5 | 6 | 7 | 8 |
|---|---|---|---|---|---|
| k= | 4.2907E−02 | −1.4484E+00 | −1.5623E+00 | 3.5457E+01 | −5.6789E−01 |
| A4= | −2.9374E−03 | 2.1642E−02 | 5.3617E−02 | 5.9338E−02 | 1.3054E−02 |
| A6= | −1.0943E−03 | −8.2460E−03 | −2.1278E−02 | −5.8496E−02 | −3.5524E−02 |
| A8= | 5.4994E−04 | 3.1710E−03 | 8.1210E−03 | 2.4612E−02 | 1.3506E−02 |
| A10= | −3.1288E−04 | −1.0604E−03 | −2.2024E−03 | −3.9447E−03 | −3.2156E−04 |
| A12= | 7.0967E−05 | 1.6020E−04 | 3.1675E−04 | −3.4415E−04 | −1.0088E−03 |
| A14= | −7.0316E−06 | −9.1423E−06 | −1.9580E−05 | 1.2091E−04 | 2.0002E−04 |

| Surface # | 9 | 11 | 12 | 13 | 14 |
|---|---|---|---|---|---|
| k= | −1.1548E−01 | 4.1157E+00 | 5.0000E+01 | −1.2505E+01 | 4.9872E+01 |
| A4= | −8.2356E−02 | −1.0484E−01 | −6.3501E−02 | −1.0362E−01 | −8.3831E−02 |
| A6= | 3.8729E−02 | 4.4012E−02 | 4.6716E−02 | 4.2869E−02 | 3.2320E−02 |
| A8= | −1.7347E−02 | 2.6824E−02 | 9.2003E−03 | −4.6013E−03 | −7.6157E−03 |
| A10= | 3.6542E−03 | −1.8925E−02 | 9.5917E−03 | 5.3370E−04 | −1.9718E−03 |
| A12= | −4.1451E−04 | −9.4697E−03 | −2.8973E−02 | −6.3604E−03 | 1.3300E−03 |
| A14= | 1.1915E−04 | 8.4772E−03 | 1.4675E−02 | 3.6312E−03 | −1.8575E−04 |
| A16= |  | −1.5065E−03 | −2.2653E−03 | −5.6470E−04 | −2.3841E−06 |

Figure 27B:
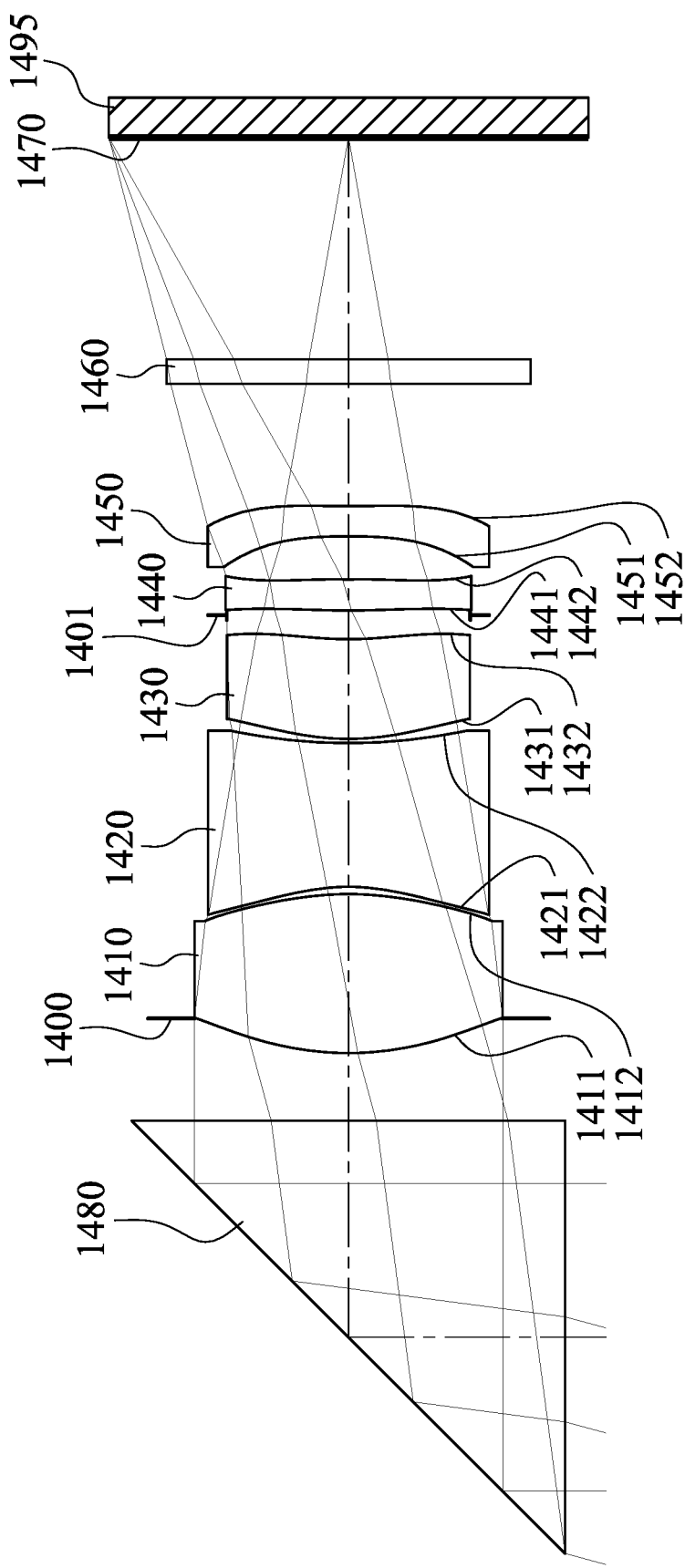
FIG. 27B is a schematic view of the image capturing apparatus according to the 14th embodiment of FIG. 27A in which the optical axis is folded by the prism.

Furthermore, FIG. 27B is a schematic view of the image capturing apparatus according to the 14th embodiment of FIG. 27A in which the optical axis is folded by the prism 1480. In FIG. 27B, the optical data of the prism 1480 is the same as the optical data in Table 27, wherein the difference between FIG. 27A and FIG. 27B is that FIG. 27A indicates the unfolded prism path of FIG. 27B. The unfolded prism path is called a tunnel diagram which can be used to determine the angular field of the prism and the size of the beam which will pass through the prism. The use of the prism 1480 therefore can change the directions of the incident light of the photographing optical lens assembly and the emerging light which is for imaging on the image surface 1470. Therefore, it is favorable for applying to various image capturing apparatus or electronic devices.

In the 14th embodiment, the equation of the aspheric surface profiles of the aforementioned lens elements is the same as the equation of the 1st embodiment. Also, the definitions of these parameters shown in the following table are the same as those stated in the 1st and 13th embodiments with corresponding values for the 14th embodiment, so an explanation in this regard will not be provided again.

Moreover, these parameters can be calculated from Table 27 and Table 28 as the following values and satisfy the following conditions:

| 14th Embodiment | | | |
|---|---|---|---|
| f [mm] | 10.74 | |f1/f4| | 0.36 |
| Fno | 2.85 | ΣAT/BL | 0.23 |
| HFOV [deg.] | 15.1 | |Y52/Y11| | 0.91 |
| |tan(HFOV)| | 0.27 | |(2 × Y52)/EPD| | 0.91 |
| (V2 + V3 + V4 + V5)/4 | 23.1 | SD/TD | 0.94 |
| CT4/CT2 | 0.22 | ImgH/EPD | 0.78 |
| (T23 + T34)/CT2 | 0.23 | (10 × Yc41)/f | 0.36 |
| T34/T45 | 0.66 | (10 × Yc42)/f | 0.08 |
| TD/CT2 | 3.80 | (10 × Yc51)/f | — |
| (R3 + R4)/(R3 − R4) | −0.63 | (10 × Yc52)/f | 0.28 |
| f1/CT2 | 2.15 | TD/TP | 1.26 |

According to the 14th embodiment of the present disclosure, when a refractive power of the first lens element 1410 is P1 (which is f/f1, a ratio value of the focal length of the photographing optical lens assembly f and the focal length of the first lens element f1), a refractive power of the second lens element 1420 is P2 (which is f/f2, a ratio value of the focal length of the photographing optical lens assembly f and a focal length of the second lens element f2), a refractive power of the third lens element 1430 is P3 (which is f/f3, a ratio value of the focal length of the photographing optical lens assembly f and a focal length of the third lens element f3), a refractive power of the fourth lens element 1440 is P4 (which is f/f4, a ratio value of the focal length of the photographing optical lens assembly f and the focal length of the fourth lens element f4), a refractive power of the fifth lens element 1450 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 14th embodiment of the present disclosure, when at least three of the first lens element 1410, the second lens element 1420, the third lens element 1430, the fourth lens element 1440 and the fifth lens element 1450 have an Abbe number smaller than 30.0. In detail, all of the Abbe numbers of the second lens element 1420, the third lens element 1430, the fourth lens element 1440 and the fifth lens element 1450 are smaller than 30.0.

15th Embodiment

Figure 29A:
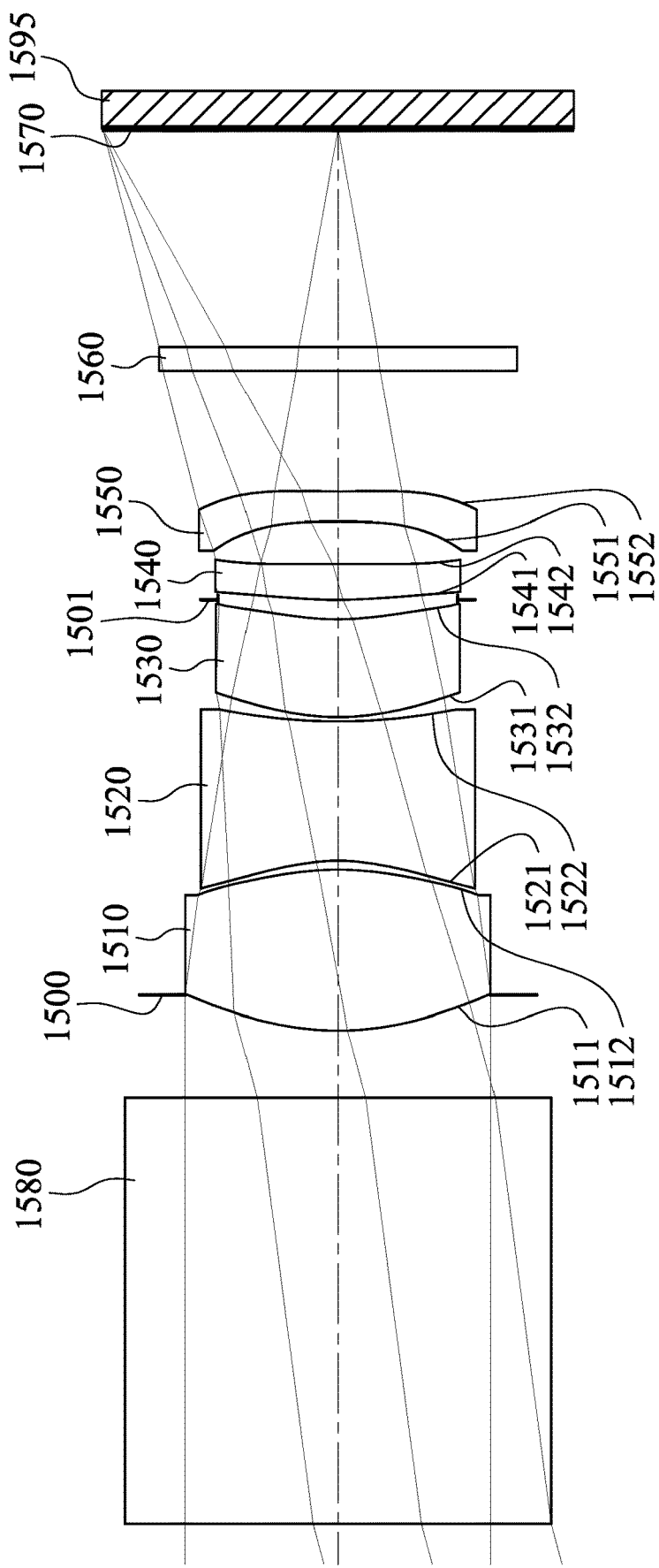
FIG. 29A is a schematic view of an image capturing apparatus according to the 15th embodiment of the present disclosure.
Figure 30:
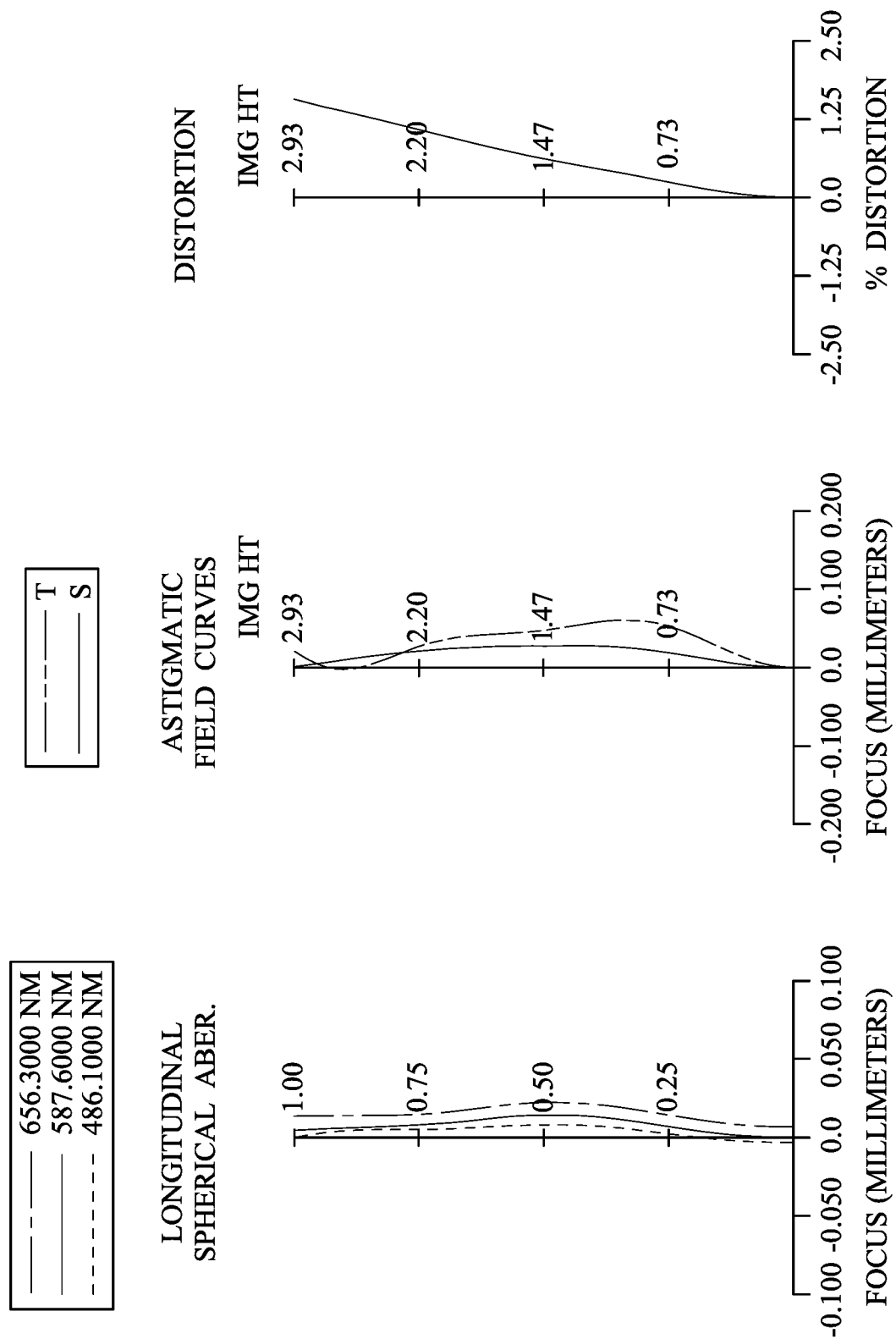
FIG. 30 shows spherical aberration curves, astigmatic field curves and a distortion curve of the image capturing apparatus according to the 15th embodiment.

FIG. 29A is a schematic view of an image capturing apparatus according to the 15th embodiment of the present disclosure. FIG. 30 shows spherical aberration curves, astigmatic field curves and a distortion curve of the image capturing apparatus according to the 15th embodiment. In FIG. 29A, the image capturing apparatus includes a photographing optical lens assembly (its reference numeral is omitted) and an image sensor 1595. The photographing optical lens assembly includes, in order from an object side to an image side along an optical axis, a prism 1580, an aperture stop 1500, a first lens element 1510, a second lens element 1520, a third lens element 1530, a stop 1501, a fourth lens element 1540, a fifth lens element 1550, a filter 1560 and an image surface 1570, wherein the image sensor 1595 is disposed on the image surface 1570 of the photographing optical lens assembly. The photographing optical lens assembly has a total of five lens elements (1510-1550), and there is an air space between every two lens elements of the first lens element 1510, the second lens element 1520, the third lens element 1530, the fourth lens element 1540 and the fifth lens element 1550 that are adjacent to each other.

The first lens element 1510 with positive refractive power has an object-side surface 1511 being convex in a paraxial region thereof and an image-side surface 1512 being convex in a paraxial region thereof. The first lens element 1510 is made of a plastic material, and has the object-side surface 1511 and the image-side surface 1512 being both aspheric. Furthermore, the object-side surface 1511 of the first lens element 1510 includes at least one inflection point.

The second lens element 1520 with negative refractive power has an object-side surface 1521 being concave in a paraxial region thereof and an image-side surface 1522 being concave in a paraxial region thereof. The second lens element 1520 is made of a plastic material, and has the object-side surface 1521 and the image-side surface 1522 being both aspheric.

The third lens element 1530 with positive refractive power has an object-side surface 1531 being convex in a paraxial region thereof and an image-side surface 1532 being concave in a paraxial region thereof. The third lens element 1530 is made of a plastic material, and has the object-side surface 1531 and the image-side surface 1532 being both aspheric. Furthermore, the image-side surface 1532 of the third lens element 1530 includes at least one inflection point.

The fourth lens element 1540 with positive refractive power has an object-side surface 1541 being convex in a paraxial region thereof and an image-side surface 1542 being concave in a paraxial region thereof. The fourth lens element 1540 is made of a plastic material, and has the object-side surface 1541 and the image-side surface 1542 being both aspheric. Furthermore, both of the object-side surface 1541 and the image-side surface 1542 of the fourth lens element 1540 include at least one inflection point.

The fifth lens element 1550 with negative refractive power has an object-side surface 1551 being concave in a paraxial region thereof and an image-side surface 1552 being concave in a paraxial region thereof. The fifth lens element 1550 is made of a plastic material, and has the object-side surface 1551 and the image-side surface 1552 being both aspheric. Furthermore, the image-side surface 1552 of the fifth lens element 1550 includes at least one inflection point.

The filter 1560 is made of a glass material and located between the fifth lens element 1550 and the image surface 1570, and will not affect the focal length of the photographing optical lens assembly.

According to the 15th embodiment of the present disclosure, the photographing optical lens assembly includes the prism 1580 made of a glass material. The prism 1580 is an object-side reflective element located between an imaged object (its reference numeral is omitted) and the aperture stop 1500 on an optical path (which is located on an optical axis of the photographing optical lens assembly according to the 15th embodiment).

The detailed optical data of the 15th embodiment are shown in Table 29 and the aspheric surface data are shown in Table 30 below.

TABLE 29

15th Embodiment
f = 10.69 mm, Fno = 2.82, HFOV = 15.1 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Prism | Plano |  | 5.300 | Glass | 2.000 | 25.5 | — |
| 2 |  | Plano |  | 1.270 |  |  |  |  |
| 3 | Ape. Stop | Plano |  | −0.438 |  |  |  |  |
| 4 | Lens 1 | 3.746 | ASP | 2.000 | Plastic | 1.545 | 56.0 | 3.82 |
| 5 |  | −3.795 | ASP | 0.114 |  |  |  |  |
| 6 | Lens 2 | −2.459 | ASP | 1.730 | Plastic | 1.584 | 28.2 | −3.32 |
| 7 |  | 11.587 | ASP | 0.050 |  |  |  |  |
| 8 | Lens 3 | 3.231 | ASP | 1.220 | Plastic | 1.660 | 20.4 | 34.47 |
| 9 |  | 3.200 | ASP | 0.246 |  |  |  |  |
| 10 | Stop | Plano |  | −0.004 |  |  |  |  |
| 11 | Lens 4 | 4.741 | ASP | 0.446 | Plastic | 1.660 | 20.4 | 8.48 |
| 12 |  | 29.839 | ASP | 0.529 |  |  |  |  |
| 13 | Lens 5 | −15.493 | ASP | 0.370 | Plastic | 1.639 | 23.3 | −10.94 |
| 14 |  | 12.856 | ASP | 1.500 |  |  |  |  |
| 15 | Filter | Plano |  | 0.300 | Glass | 1.517 | 64.2 | — |
| 16 |  | Plano |  | 2.714 |  |  |  |  |
| 17 | Image | Plano |  | — |  |  |  |  |

Reference wavelength is 587.6 nm (d-line).
Effective radius of stop on surface 10 is 1.490 mm.
Prism (1580) has reflective surface.

TABLE 30

Aspheric Coefficients

| Surface # | 4 | 5 | 6 | 7 | 8 |
|---|---|---|---|---|---|
| k= | 1.7159E−01 | −1.7781E+00 | −1.5310E+00 | 3.5488E+01 | −1.6212E−01 |
| A4= | −2.2497E−03 | 2.1936E−02 | 5.4734E−02 | 5.3705E−02 | 1.0029E−02 |
| A6= | −1.5827E−03 | −9.1768E−03 | −2.3411E−02 | −5.1566E−02 | −2.8115E−02 |
| A8= | 9.0659E−04 | 3.8455E−03 | 9.7603E−03 | 1.9234E−02 | 7.7125E−03 |
| A10= | −4.1116E−04 | −1.2510E−03 | −2.9355E−03 | −1.2649E−03 | 2.4667E−03 |
| A12= | 8.5440E−05 | 1.9832E−04 | 5.0219E−04 | −8.3305E−04 | −1.3739E−03 |
| A14= | −7.5997E−06 | −1.4080E−05 | −4.0004E−05 | 1.2586E−04 | 1.5980E−04 |

| Surface # | 9 | 11 | 12 | 13 | 14 |
|---|---|---|---|---|---|
| k= | 7.8454E−01 | 4.2381E+00 | −8.4098E+01 | −6.6161E+00 | 4.9612E+01 |
| A4= | −8.8203E−02 | −1.0592E−01 | −5.4045E−02 | −9.5940E−02 | −7.4957E−02 |
| A6= | 4.5889E−02 | 6.5911E−02 | 5.7905E−02 | 4.6098E−02 | 2.0969E−02 |
| A8= | −1.6583E−02 | −2.4699E−02 | −4.0434E−02 | −3.6503E−02 | 5.0128E−04 |
| A10= | 1.7680E−03 | 3.5019E−02 | 6.4630E−02 | 4.5441E−02 | −4.6583E−03 |
| A12= | −3.1245E−04 | −3.9596E−02 | −5.9715E−02 | −3.5591E−02 | 1.3600E−03 |
| A14= | 3.1290E−04 | 1.6949E−02 | 2.3317E−02 | 1.2779E−02 | 1.4087E−05 |
| A16= |  | −2.4273E−03 | −3.2277E−03 | −1.6687E−03 | −3.6095E−05 |

Figure 29B:
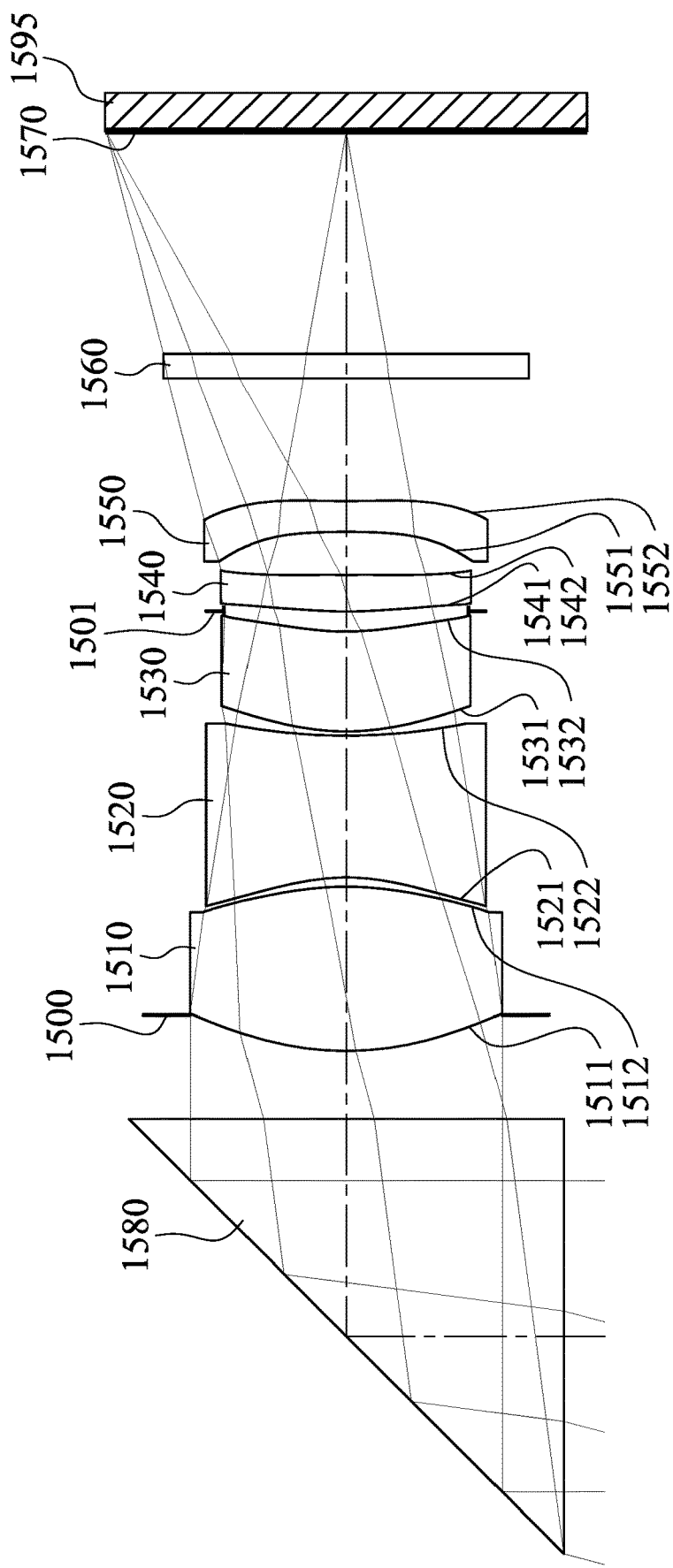
FIG. 29B is a schematic view of the image capturing apparatus according to the 15th embodiment of FIG. 29A in which the optical axis is folded by the prism.

Furthermore, FIG. 29B is a schematic view of the image capturing apparatus according to the 15th embodiment of FIG. 29A in which the optical axis is folded by the prism 1580. In FIG. 29B, the optical data of the prism 1580 is the same as the optical data in Table 29, wherein the difference between FIG. 29A and FIG. 29B is that FIG. 29A indicates the unfolded prism path of FIG. 29B. The unfolded prism path is called a tunnel diagram which can be used to determine the angular field of the prism and the size of the beam which will pass through the prism. The use of the prism 1580 therefore can change the directions of the incident light of the photographing optical lens assembly and the emerging light which is for imaging on the image surface 1570. Therefore, it is favorable for applying to various image capturing apparatus or electronic devices.

In the 15th embodiment, the equation of the aspheric surface profiles of the aforementioned lens elements is the same as the equation of the 1st embodiment. Also, the definitions of these parameters shown in the following table are the same as those stated in the 1st and 13th embodiments with corresponding values for the 15th embodiment, so an explanation in this regard will not be provided again.

Moreover, these parameters can be calculated from Table 29 and Table 30 as the following values and satisfy the following conditions:

| 15th Embodiment | | | |
|---|---|---|---|
| f [mm] | 10.69 | |f1/f4| | 0.45 |
| Fno | 2.82 | ΣAT/BL | 0.21 |
| HFOV [deg.] | 15.1 | |Y52/Y11| | 0.91 |
| |tan(HFOV)| | 0.27 | |(2 × Y52)/EPD| | 0.91 |
| (V2 + V3 + V4 + V5)/4 | 23.1 | SD/TD | 0.93 |
| CT4/CT2 | 0.26 | ImgH/EPD | 0.77 |
| (T23 + T34)/CT2 | 0.17 | (10 × Yc41)/f | 0.99 |
| T34/T45 | 0.46 | (10 × Yc42)/f | 0.23 |
| TD/CT2 | 3.87 | (10 × Yc51)/f | — |
| (R3 + R4)/(R3 − R4) | −0.65 | (10 × Yc52)/f | 0.30 |
| f1/CT2 | 2.21 | TD/TP | 1.26 |

According to the 15th embodiment of the present disclosure, when a refractive power of the first lens element 1510 is P1 (which is f/f1, a ratio value of the focal length of the photographing optical lens assembly f and the focal length of the first lens element f1), a refractive power of the second lens element 1520 is P2 (which is f/f2, a ratio value of the focal length of the photographing optical lens assembly f and a focal length of the second lens element f2), a refractive power of the third lens element 1530 is P3 (which is f/f3, a ratio value of the focal length of the photographing optical lens assembly f and a focal length of the third lens element f3), a refractive power of the fourth lens element 1540 is P4 (which is f/f4, a ratio value of the focal length of the photographing optical lens assembly f and the focal length of the fourth lens element f4), a refractive power of the fifth lens element 1550 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 15th embodiment of the present disclosure, when at least three of the first lens element 1510, the second lens element 1520, the third lens element 1530, the fourth lens element 1540 and the fifth lens element 1550 have an Abbe number smaller than 30.0. In detail, all of the Abbe numbers of the second lens element 1520, the third lens element 1530, the fourth lens element 1540 and the fifth lens element 1550 are smaller than 30.0.

16th Embodiment

Figure 31A:
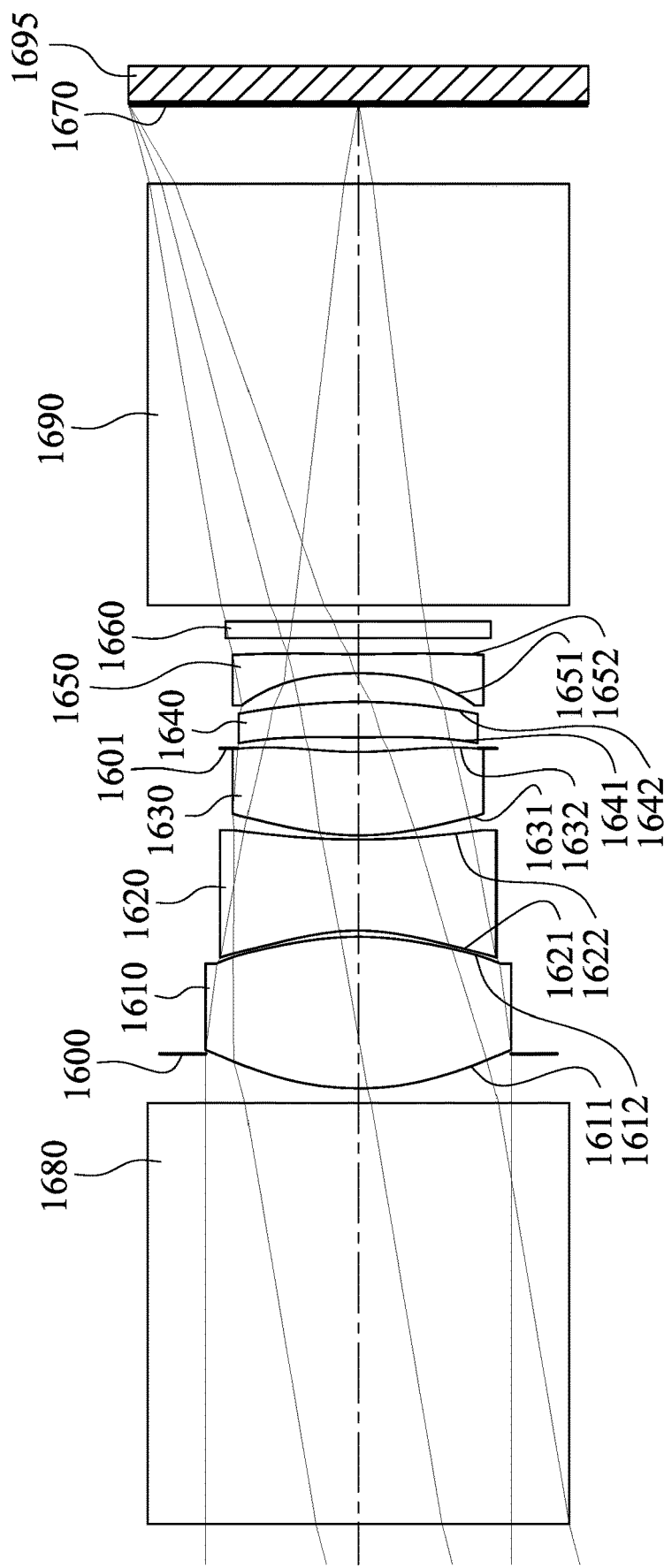
FIG. 31A is a schematic view of an image capturing apparatus according to the 16th embodiment of the present disclosure.
Figure 32:
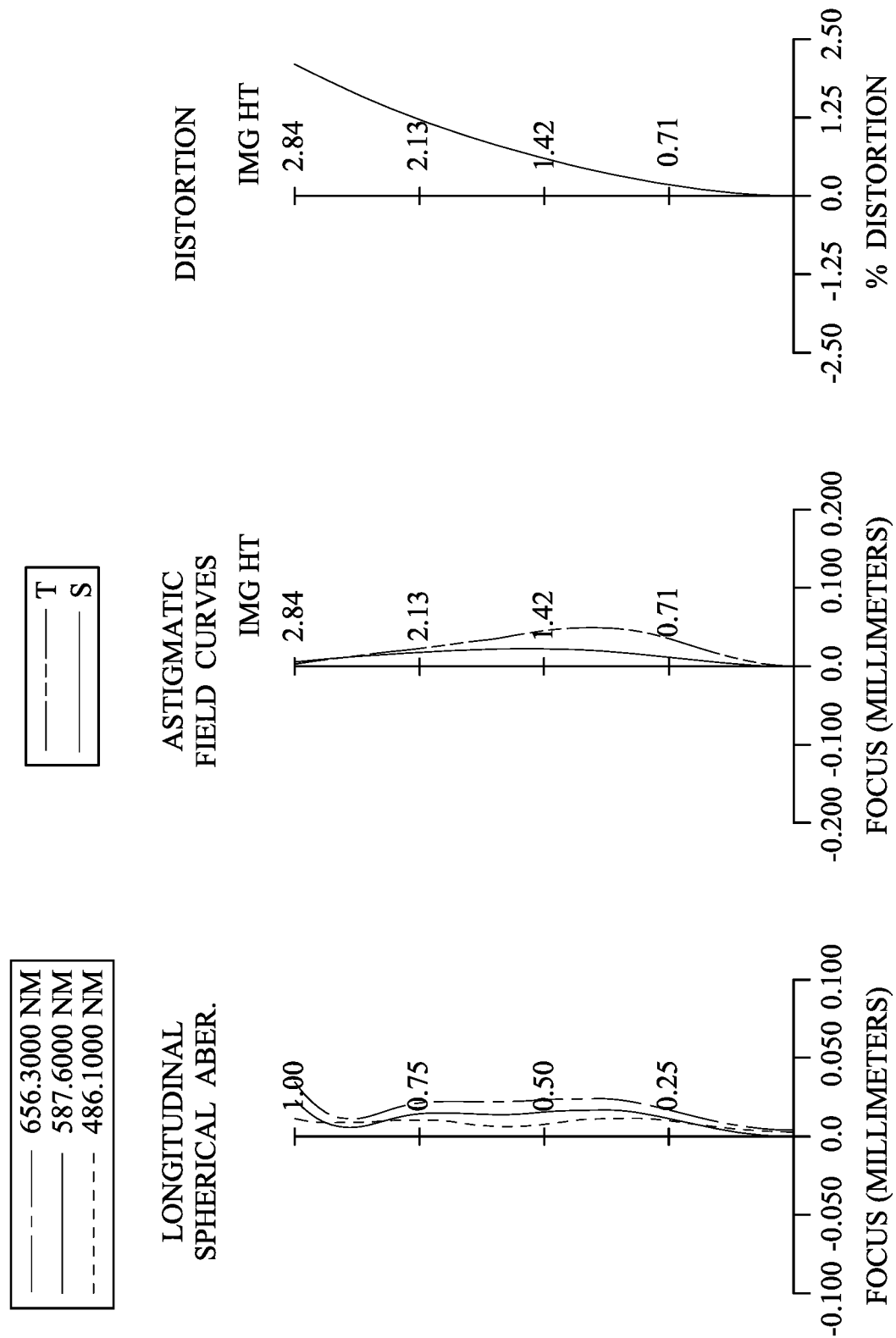
FIG. 32 shows spherical aberration curves, astigmatic field curves and a distortion curve of the image capturing apparatus according to the 16th embodiment.

FIG. 31A is a schematic view of an image capturing apparatus according to the 16th embodiment of the present disclosure. FIG. 32 shows spherical aberration curves, astigmatic field curves and a distortion curve of the image capturing apparatus according to the 16th embodiment. In FIG. 31A, the image capturing apparatus includes a photographing optical lens assembly (its reference numeral is omitted) and an image sensor 1695. The photographing optical lens assembly includes, in order from an object side to an image side along an optical axis, a prism 1680, an aperture stop 1600, a first lens element 1610, a second lens element 1620, a third lens element 1630, a stop 1601, a fourth lens element 1640, a fifth lens element 1650, a filter 1660, a prism 1690 and an image surface 1670, wherein the image sensor 1695 is disposed on the image surface 1670 of the photographing optical lens assembly. The photographing optical lens assembly has a total of five lens elements (1610-1650), and there is an air space between every two lens elements of the first lens element 1610, the second lens element 1620, the third lens element 1630, the fourth lens element 1640 and the fifth lens element 1650 that are adjacent to each other.

The first lens element 1610 with positive refractive power has an object-side surface 1611 being convex in a paraxial region thereof and an image-side surface 1612 being convex in a paraxial region thereof. The first lens element 1610 is made of a plastic material, and has the object-side surface 1611 and the image-side surface 1612 being both aspheric. Furthermore, the object-side surface 1611 of the first lens element 1610 includes at least one inflection point.

The second lens element 1620 with negative refractive power has an object-side surface 1621 being concave in a paraxial region thereof and an image-side surface 1622 being concave in a paraxial region thereof. The second lens element 1620 is made of a plastic material, and has the object-side surface 1621 and the image-side surface 1622 being both aspheric.

The third lens element 1630 with positive refractive power has an object-side surface 1631 being convex in a paraxial region thereof and an image-side surface 1632 being concave in a paraxial region thereof. The third lens element 1630 is made of a plastic material, and has the object-side surface 1631 and the image-side surface 1632 being both aspheric. Furthermore, the image-side surface 1632 of the third lens element 1630 includes at least one inflection point.

The fourth lens element 1640 with positive refractive power has an object-side surface 1641 being convex in a paraxial region thereof and an image-side surface 1642 being convex in a paraxial region thereof. The fourth lens element 1640 is made of a plastic material, and has the object-side surface 1641 and the image-side surface 1642 being both aspheric. Furthermore, the object-side surface 1641 of the fourth lens element 1640 includes at least one inflection point.

The fifth lens element 1650 with negative refractive power has an object-side surface 1651 being concave in a paraxial region thereof and an image-side surface 1652 being concave in a paraxial region thereof. The fifth lens element 1650 is made of a plastic material, and has the object-side surface 1651 and the image-side surface 1652 being both aspheric. Furthermore, the image-side surface 1652 of the fifth lens element 1650 includes at least one inflection point.

The filter 1660 is made of a glass material and located between the fifth lens element 1650 and the prism 1690, and will not affect the focal length of the photographing optical lens assembly.

According to the 16th embodiment of the present disclosure, the photographing optical lens assembly includes two prisms 1680, 1690 which are made of glass materials. The prism 1680 is located between an imaged object (its reference numeral is omitted) and the aperture stop 1600 on an optical path (which is located on an optical axis of the photographing optical lens assembly according to the 16th embodiment). The prism 1690 is located between the filter 1660 and the image surface 1670 on the optical path (which is located on the optical axis of the optical photographing assembly according to the 16th embodiment).

The detailed optical data of the 16th embodiment are shown in Table 31 and the aspheric surface data are shown in Table 32 below.

TABLE 31

16th Embodiment
f = 10.69 mm, Fno = 2.83, HFOV = 14.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Prism | Plano | | 5.220 | Glass | 1.517 | 64.2 | — |
| 2 | | Plano | | 0.611 | | | | |
| 3 | Ape. Stop | Plano | | −0.431 | | | | |
| 4 | Lens 1 | 3.550 | ASP | 1.875 | Plastic | 1.545 | 56.0 | 3.69 |
| 5 | | −3.761 | ASP | 0.080 | | | | |
| 6 | Lens 2 | −2.507 | ASP | 1.130 | Plastic | 1.584 | 28.2 | −3.69 |
| 7 | | 17.944 | ASP | 0.050 | | | | |
| 8 | Lens 3 | 3.547 | ASP | 1.030 | Plastic | 1.660 | 20.4 | 16.32 |
| 9 | | 4.677 | ASP | 0.044 | | | | |
| 10 | Stop | Plano | | 0.137 | | | | |
| 11 | Lens 4 | 12.153 | ASP | 0.441 | Plastic | 1.660 | 20.4 | 8.41 |
| 12 | | −10.065 | ASP | 0.357 | | | | |
| 13 | Lens 5 | −4.993 | ASP | 0.235 | Plastic | 1.639 | 23.5 | −5.45 |
| 14 | | 11.694 | ASP | 0.200 | | | | |
| 15 | Filter | Plano | | 0.210 | Glass | 1.517 | 64.2 | — |
| 16 | | Plano | | 0.200 | | | | |
| 17 | Prism | Plano | | 5.220 | Glass | 1.517 | 64.2 | — |
| 18 | | Plano | | 0.994 | | | | |
| 19 | Image | Plano | | — | | | | |

Reference wavelength is 587.6 nm (d-line).
Effective radius of stop on surface 10 is 1.490 mm.
Both of prisms (1680, 1690) have reflective surface.

TABLE 32

Aspheric Coefficients

| Surface # | 4 | 5 | 6 | 7 | 8 |
|---|---|---|---|---|---|
| k= | 1.4412E+00 | −2.0084E+00 | −2.0595E+00 | 4.1827E+01 | −9.5776E−01 |
| A4= | −5.2345E−03 | 2.2460E−02 | 5.6715E−02 | 5.6507E−02 | 1.0502E−02 |
| A6= | −2.5537E−03 | −8.0153E−03 | −2.3840E−02 | −5.2088E−02 | −2.8648E−02 |
| A8= | 1.2542E−03 | 3.6125E−03 | 8.9829E−03 | 1.8970E−02 | 7.4603E−03 |
| A10= | −6.6591E−04 | −1.8841E−03 | −2.7894E−03 | −1.3330E−03 | 2.4487E−03 |
| A12= | 1.5396E−04 | 4.2317E−04 | 4.5680E−04 | −8.0616E−04 | −1.3521E−03 |
| A14= | −1.6481E−05 | −3.2737E−05 | −2.5488E−05 | 1.5334E−04 | 1.7520E−04 |

| Surface# | 9 | 11 | 12 | 13 | 14 |
|---|---|---|---|---|---|
| k= | 4.9185E+00 | 1.2229E+01 | −2.8473E+01 | −4.6562E+00 | 4.4032E+01 |
| A4= | −8.9788E−02 | −1.1924E−01 | −7.8898E−02 | −1.2215E−01 | −7.8658E−02 |
| A6= | 4.4448E−02 | 8.7227E−02 | 8.5274E−02 | 1.4211E−01 | 9.3138E−02 |
| A8= | −1.6722E−02 | −7.2580E−03 | −1.9141E−02 | −1.2374E−01 | −9.0391E−02 |
| A10= | 1.6559E−03 | −2.0512E−02 | −1.6152E−02 | 6.1230E−02 | 5.4653E−02 |
| A12= | −3.9334E−04 | 6.0102E−03 | 7.7102E−03 | −1.8127E−02 | −1.9443E−02 |
| A14= | 2.6757E−04 | 6.3929E−04 | −2.6530E−04 | 3.4249E−03 | 3.7639E−03 |
| A16= | | −2.3842E−04 | −1.9952E−04 | −3.7964E−04 | −3.1457E−04 |

Figure 31B:
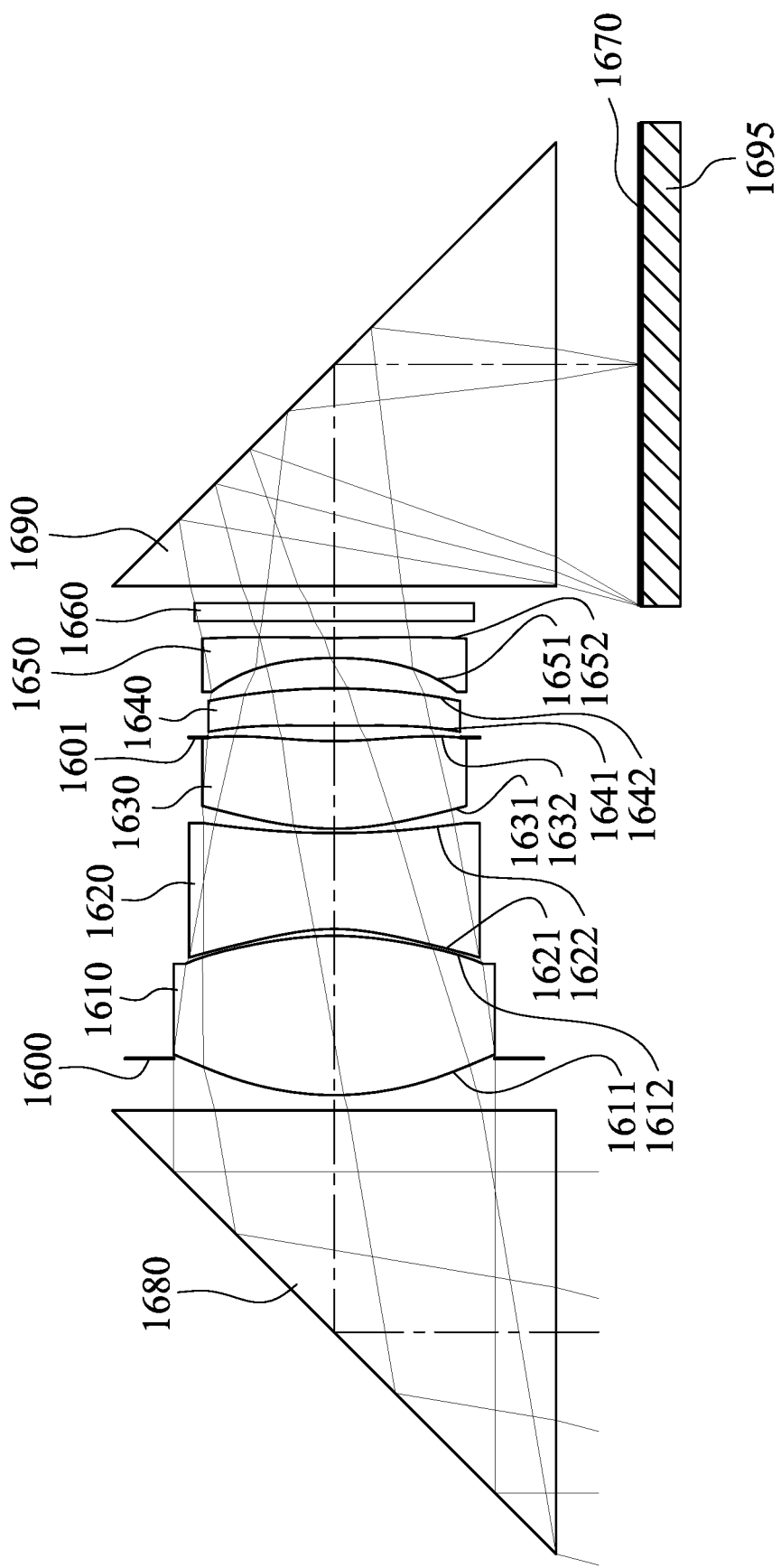
FIG. 31B is a schematic view of the image capturing apparatus according to the 16th embodiment of FIG. 31A in which the optical axis is folded twice by the prisms.
Figure 31C:
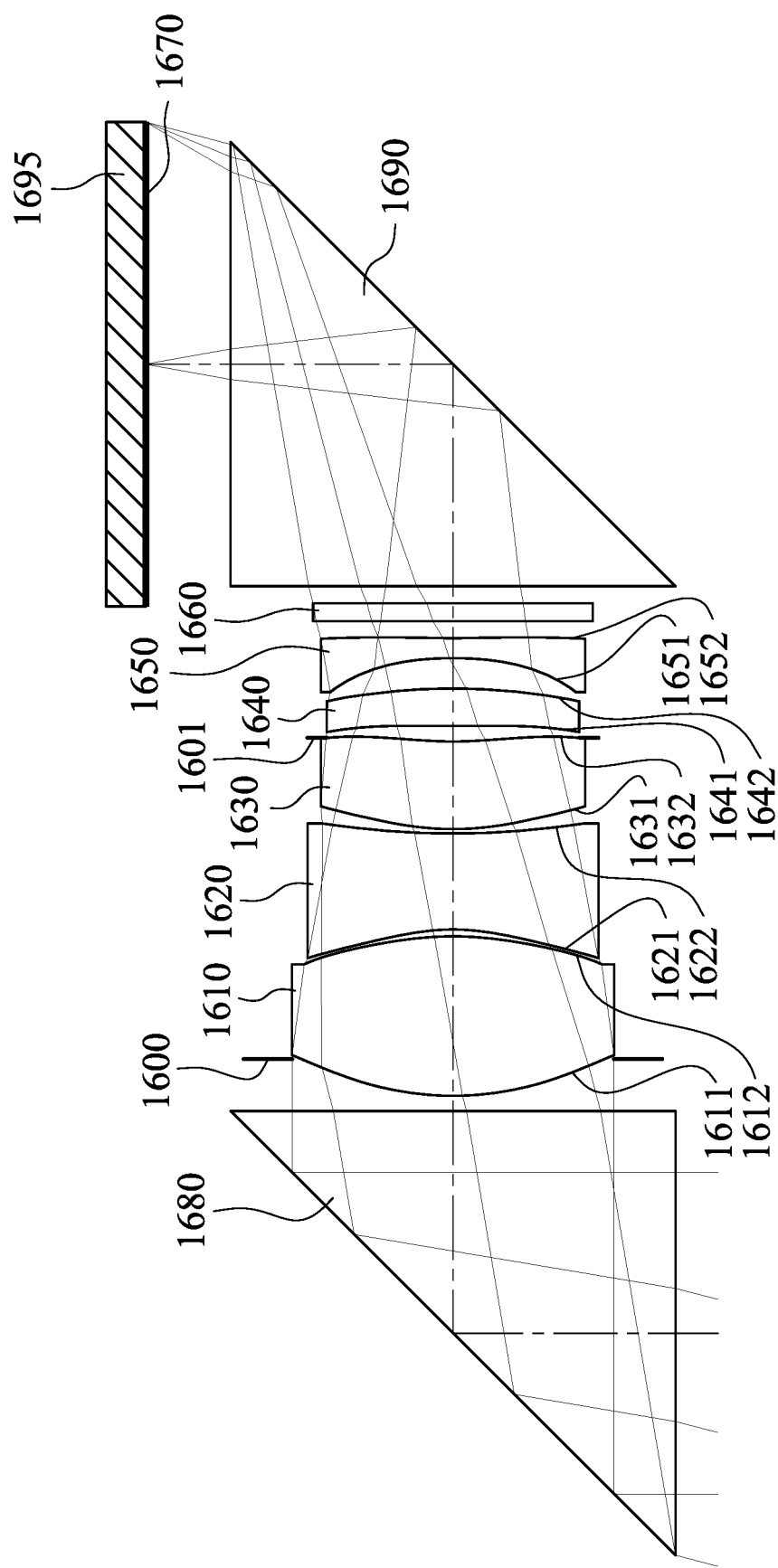
FIG. 31C is another schematic view of the image capturing apparatus according to the 16th embodiment of FIG. 31A in which the optical axis is folded twice by the prisms.

Furthermore, FIG. 31B and FIG. 31C are schematic views of the image capturing apparatus according to the 16th embodiment of FIG. 31A in which the optical axis is folded by the prisms 1680, 1690. In FIG. 31B and FIG. 31C, the optical data of the prisms 1680, 1690 are the same as the optical data in Table 31, wherein the difference between FIG. 31A and FIG. 31B or FIG. 31A and FIG. 31C is that FIG. 31A indicates the unfolded prism path of FIG. 31B or FIG. 31C.

The unfolded prism path is called a tunnel diagram which can be used to determine the angular field of the prism and the size of the beam which will pass through the prism. The use of the prisms 1680, 1690 therefore can change the directions of the incident light of the photographing optical lens assembly and the emerging light which is for imaging on the image surface 1670. Therefore, it is favorable for applying to various image capturing apparatus or electronic devices.

In the 16th embodiment, the equation of the aspheric surface profiles of the aforementioned lens elements is the same as the equation of the 1st embodiment. Also, the definitions of these parameters shown in the following table are the same as those stated in the 1st and 13th embodiment with corresponding values for the 16th embodiment, so an explanation in this regard will not be provided again.

Moreover, these parameters can be calculated from Table 31 and Table 32 as the following values and satisfy the following conditions:

| 16th Embodiment | | | |
|---|---|---|---|
| f [mm] | 10.69 | |f1/f4| | 0.44 |
| Fno | 2.83 | ΣAT/BL | 0.10 |
| HFOV [deg.] | 14.6 | |Y52/Y11| | 0.82 |
| |tan(HFOV)| | 0.26 | |(2 × Y52)/EPD| | 0.82 |
| (V2 + V3 + V4 + V5)/4 | 23.1 | SD/TD | 0.92 |
| CT4/CT2 | 0.39 | ImgH/EPD | 0.75 |
| (T23 + T34)/CT2 | 0.20 | (10 × Yc41)/f | 0.24 |
| T34/T45 | 0.51 | (10 × Yc42)/f | — |
| TD/CT2 | 4.76 | (10 × Yc51)/f | — |
| (R3 + R4)/(R3 − R4) | −0.75 | (10 × Yc52)/f | 0.36 |
| f1/CT2 | 3.26 | TD/TP | 1.03 |

According to the 16th embodiment of the present disclosure, when a refractive power of the first lens element 1610 is P1 (which is f/f1, a ratio value of the focal length of the photographing optical lens assembly f and the focal length of the first lens element f1), a refractive power of the second lens element 1620 is P2 (which is f/f2, a ratio value of the focal length of the photographing optical lens assembly f and a focal length of the second lens element f2), a refractive power of the third lens element 1630 is P3 (which is f/f3, a ratio value of the focal length of the photographing optical lens assembly f and a focal length of the third lens element f3), a refractive power of the fourth lens element 1640 is P4 (which is f/f4, a ratio value of the focal length of the photographing optical lens assembly f and the focal length of the fourth lens element f4), a refractive power of the fifth lens element 1650 is P5 (which is f/f5, a ratio value of the focal length of the photographing optical lens assembly f and a focal length of the fifth lens element f5), and |P1| and |P2| are two largest absolute values among |P1|, |P2|, |P3|, |P4| and |P5|.

According to the 16th embodiment of the present disclosure, when at least three of the first lens element 1610, the second lens element 1620, the third lens element 1630, the fourth lens element 1640 and the fifth lens element 1650 have an Abbe number smaller than 30.0. In detail, all of the Abbe numbers of the second lens element 1620, the third lens element 1630, the fourth lens element 1640 and the fifth lens element 1650 are smaller than 30.0.

17th Embodiment

Figure 33A:
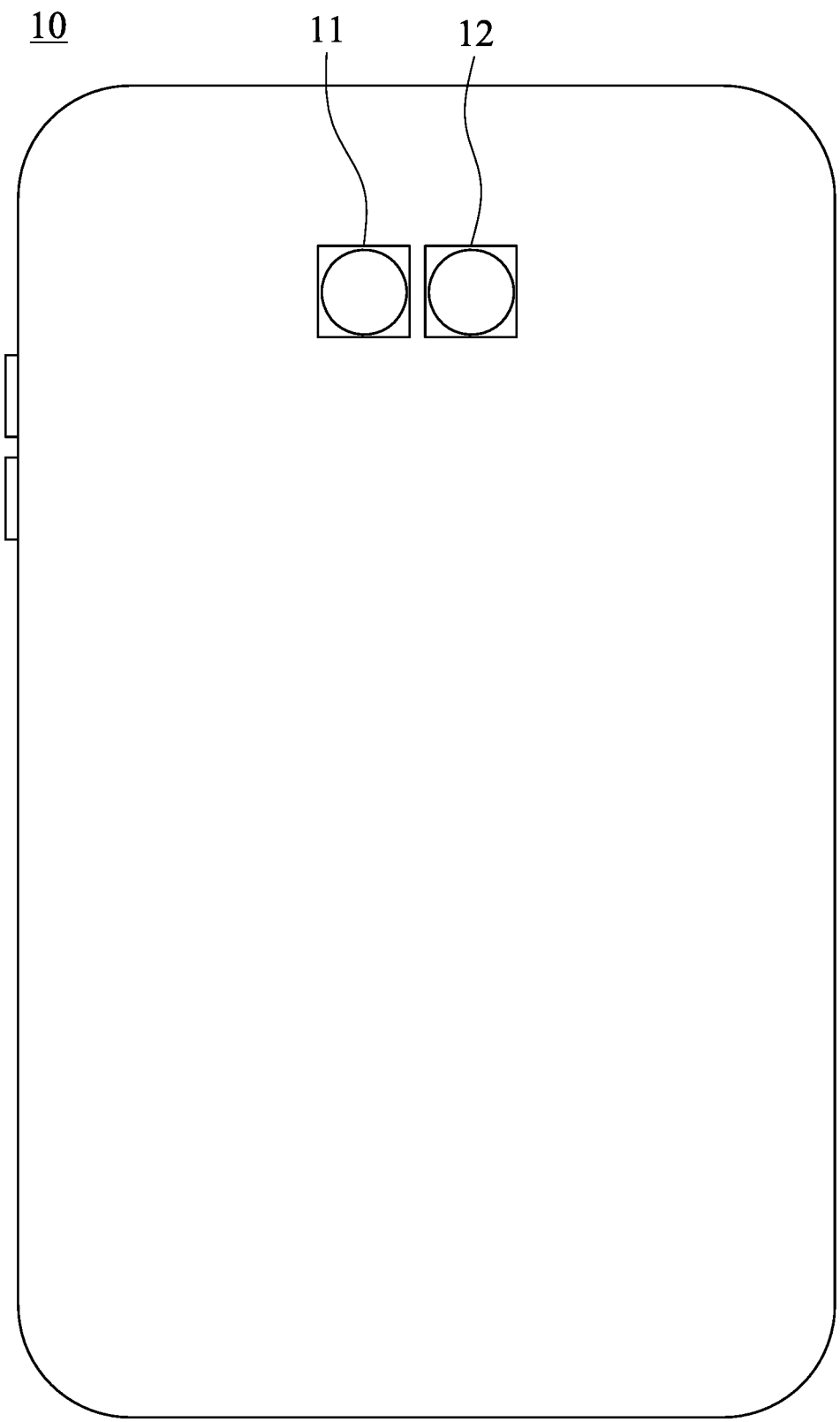
FIG. 33A is a schematic view of an electronic device according to the 17th embodiment of the present disclosure.
Figure 33B:
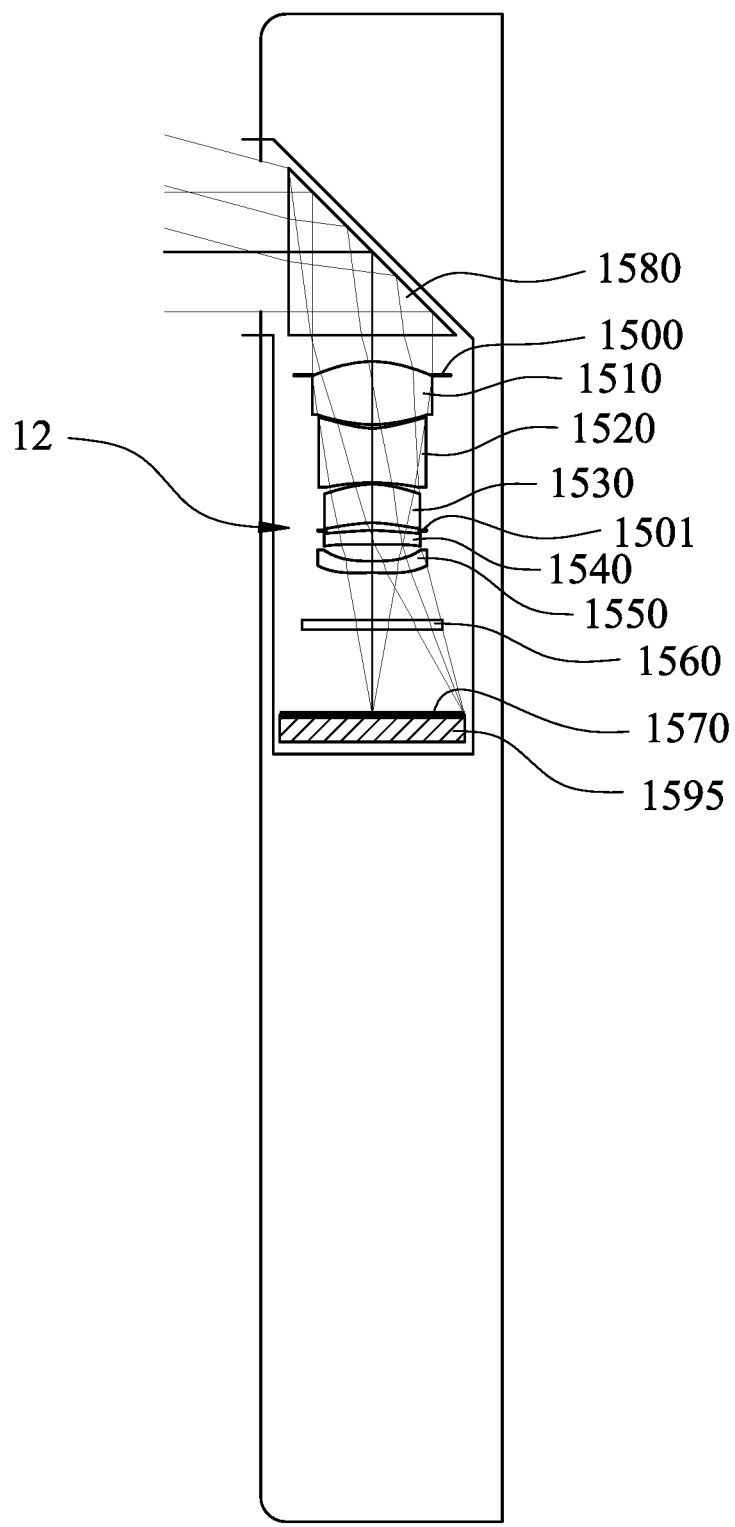
FIG. 33B is a schematic view of an image capturing apparatus of the electronic device of FIG. 33A.

FIG. 33A is a schematic view of an electronic device 10 according to the 17th embodiment of the present disclosure. FIG. 33B is a schematic view of an image capturing apparatus 12 of the electronic device 10 of FIG. 33A. According to the 17th embodiment, the electronic device 10 includes two image capturing apparatus 11, 12. In FIG. 33B, one of the image capturing apparatus 11, 12 is shown. In detail, the image capturing apparatus 12 includes a photographing optical lens assembly (its reference numeral is omitted) and an image sensor 1595, wherein the image sensor 1595 is disposed on the image surface 1570 of the photographing optical lens assembly. The photographing optical lens assembly of the image capturing apparatus 12 can be any one of the photographing optical lens assembly of the aforementioned 1st to 16th embodiments, and the photographing optical lens assembly according to the 17th embodiment is the same as the photographing optical lens assembly according to the 15th embodiment, and the detailed description referring to FIG. 29B is stated as follow.

In the photographing optical lens assembly according to the 17th embodiment, the photographing optical lens assembly includes, in order from an object side to an image side along an optical axis, a prism 1580, an aperture stop 1500, a first lens element 1510, a second lens element 1520, a third lens element 1530, a stop 1501, a fourth lens element 1540, a fifth lens element 1550, a filter 1560 and an image surface 1570, wherein the image sensor 1595 is disposed on the image surface 1570 of the photographing optical lens assembly. The photographing optical lens assembly has a total of five lens elements (1510-1550), and there is an air space between every two lens elements of the first lens element 1510, the second lens element 1520, the third lens element 1530, the fourth lens element 1540 and the fifth lens element 1550 that are adjacent to each other. In the 17th embodiment, shape, optical characteristic and data of each element are the same as the description of the 15th embodiment, and will not describe again herein.

Figure 33C:
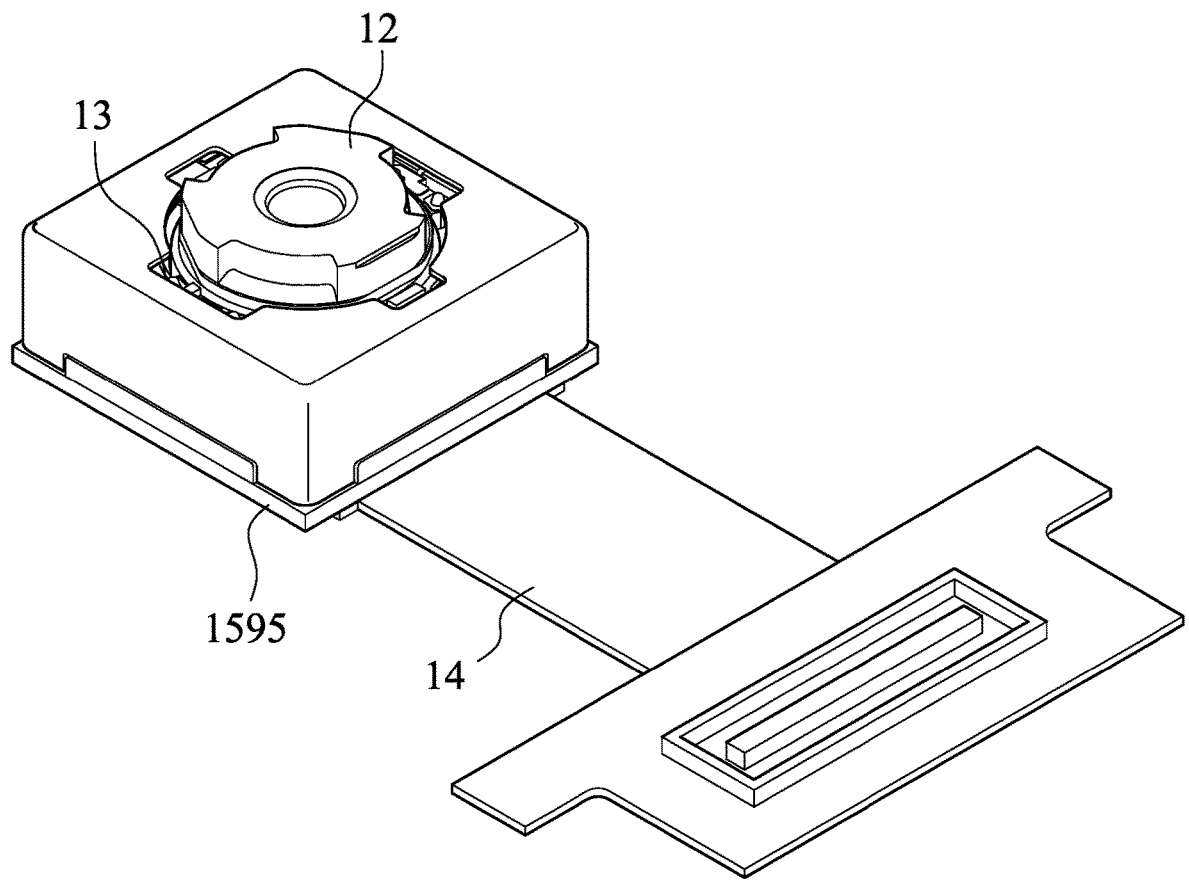
FIG. 33C shows a three-dimensional view of the image capturing apparatus of the electronic device of FIG. 33A.

Furthermore, FIG. 33C shows a three-dimensional view of the image capturing apparatus 12 of the electronic device 10 of FIG. 33A. In FIG. 33C, the photographing optical lens assembly of the image capturing apparatus 12 further includes an optical image stabilizer 13, and the image capturing apparatus 12 further includes a wire circuit 14. Thus, when the photographing optical lens assembly is movable in the image capturing apparatus 12, the optical image stabilizer 13 can stabilize an image on the image sensor 1595, and the image can be outputted by the wire circuit 14.

18th Embodiment

Figure 34:
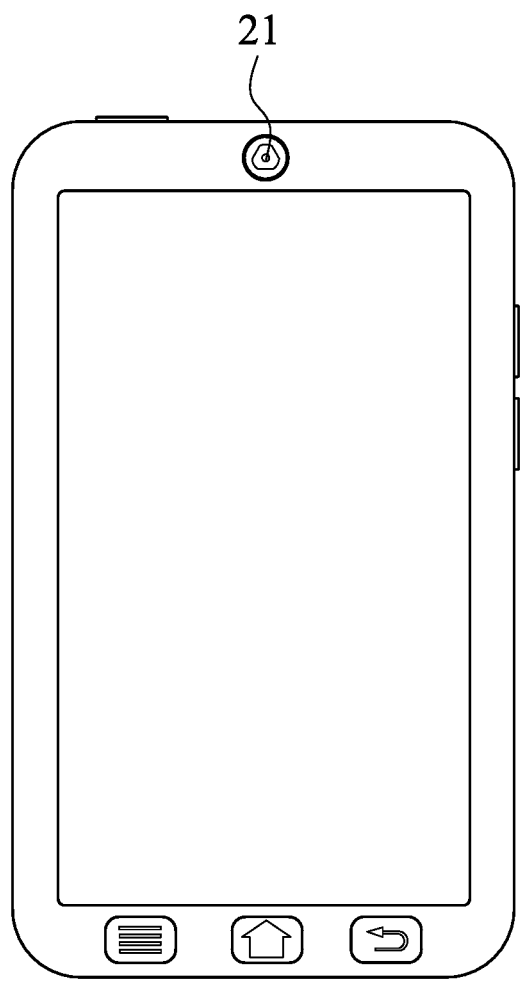
FIG. 34 is a schematic view of an electronic device according to the 18th embodiment of the present disclosure.

FIG. 34 is a schematic view of an electronic device 20 according to the 18th embodiment of the present disclosure. The electronic device 20 of the 18th embodiment is a smartphone, wherein the electronic device 20 includes an image capturing apparatus 21. The image capturing apparatus 21 includes a photographing optical lens assembly (its reference numeral is omitted) according to the present disclosure and an image sensor (its reference numeral is omitted), wherein the image sensor is disposed on an image surface of the photographing optical lens assembly.

19th Embodiment

Figure 35:
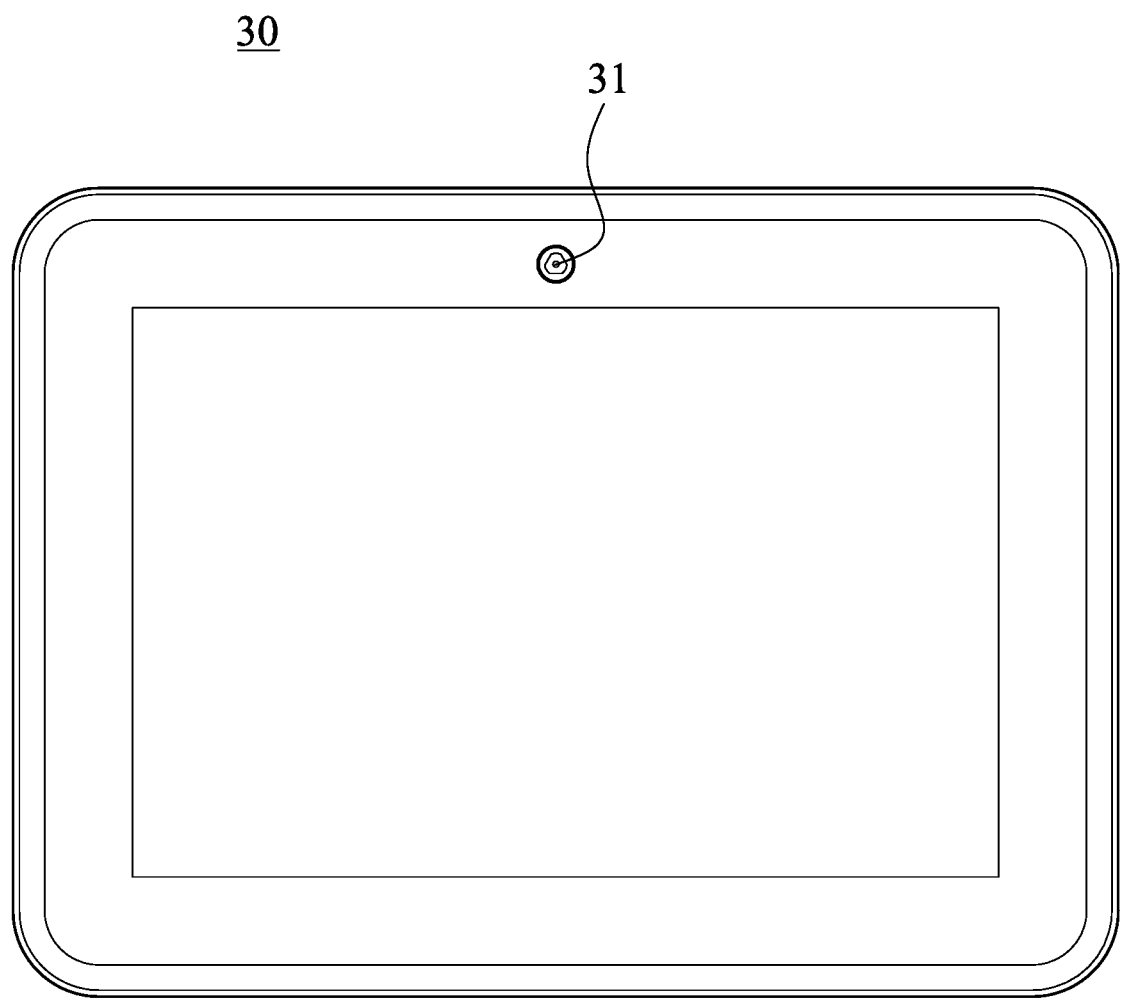
FIG. 35 is a schematic view of an electronic device according to the 19th embodiment of the present disclosure.

FIG. 35 is a schematic view of an electronic device 30 according to the 19th embodiment of the present disclosure. The electronic device 30 of the 19th embodiment is a tablet personal computer, wherein the electronic device 30 includes an image capturing apparatus 31. The image capturing apparatus 31 includes a photographing optical lens assembly (its reference numeral is omitted) according to the present disclosure and an image sensor (its reference numeral is omitted), wherein the image sensor is disposed on an image surface of the photographing optical lens assembly.

20th Embodiment

Figure 36:
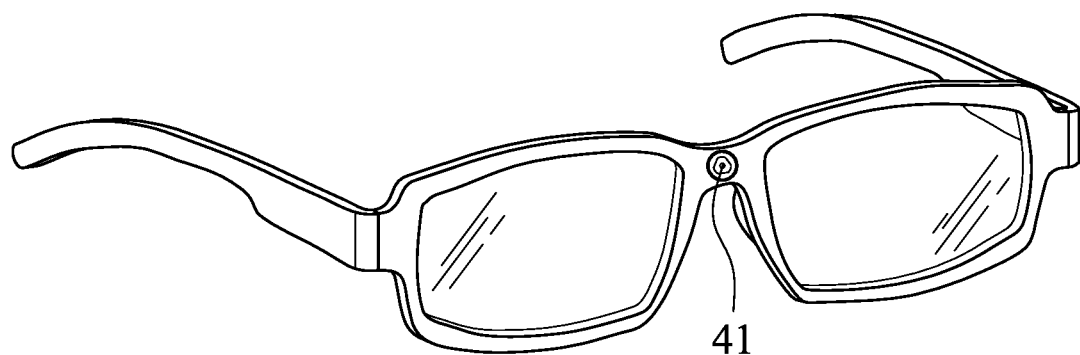
FIG. 36 is a schematic view of an electronic device according to the 20th embodiment of the present disclosure.

FIG. 36 is a schematic view of an electronic device 40 according to the 20th embodiment of the present disclosure. The electronic device 40 of the 20th embodiment is a wearable device, wherein the electronic device 40 includes an image capturing apparatus 41. The image capturing apparatus 41 includes a photographing optical lens assembly (its reference numeral is omitted) according to the present disclosure and an image sensor (its reference numeral is omitted), wherein the image sensor is disposed on an image surface of the photographing optical lens assembly.

The foregoing description, for purpose of explanation, has been described with reference to specific embodiments. It is to be noted that Tables 1-32 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly for telephoto comprising five lens elements, the five lens elements being, in order from an object side to an image side along an optical axis:

a first lens element, a second lens element, a third lens element, a fourth lens element and a fifth lens element; each of the five lens elements having an object-side surface facing towards the object side and an image-side surface facing towards the image side;

wherein the first lens element has positive refractive power;

the second lens element has negative refractive power; and the third lens element has the image-side surface being concave in a paraxial region thereof;

wherein a sum of axial distances between every two of the lens elements of the photographing optical lens assembly that are adjacent to each other is $\Sigma AT$, an axial distance between an image-side surface of the fifth lens element and an image surface is BL, a refractive power of the first lens element is P1, a refractive power of the third lens element is P3, an axial distance between the third lens element and the fourth lens element is T34, an axial distance between the fourth lens element and the fifth lens element is T45, a central thickness of the second lens element is CT2, a central thickness of the fourth lens element is CT4, and the following conditions are satisfied:

$0<\Sigma/BL<0.40$;

$|P3|<|P1|$;

$0.30<T34/T45<5.500$; and $0<CT4/CT2<0.58$.

2. The photographing optical lens assembly of claim 1, wherein the fifth lens element has the image-side surface being convex in a paraxial region thereof.

3. The photographing optical lens assembly of claim 1, wherein the five lens elements of the photographing optical lens assembly are made of plastic material; both of the object-side surface and the image-side surface of each of the lens elements of the photographing optical lens assembly are aspheric; there is an air space between each of adjacent lens elements of the photographing optical lens assembly; the photographing optical lens assembly further comprises at least one reflective element on the optical axis.

4. The photographing optical lens assembly of claim 1, wherein the refractive power of the first lens element is P1, a refractive power of the fourth lens element is P4, a refractive power of the fifth lens element is P5, and the following conditions are satisfied:

$|P4|<|P1|$; and $P5|<|P1|$.

5. The photographing optical lens assembly of claim 1, wherein a maximum optical effective radius of an image-side surface of the fifth lens element is Y52, an entrance pupil diameter of the photographing optical lens assembly is EPD, and the following condition is satisfied:

$0<|(2\times Y52)/EPD|<1.0$.

6. The photographing optical lens assembly of claim 1, wherein a half of a maximum field of view of the photographing optical lens assembly is HFOV, and the following condition is satisfied:

$|\tan(HFOV)|<0.50$.

7. The photographing optical lens assembly of claim 1, wherein an Abbe number of the second lens element is V2, an Abbe number of the third lens element is V3, an Abbe number of the fourth lens element is V4, an Abbe number of the fifth lens element is V5, and the following condition is satisfied:

$0<(V2+V3+V4+V5)/4<35.0$.

8. The photographing optical lens assembly of claim 1, wherein a maximum image height of the photographing optical lens assembly is ImgH, an entrance pupil diameter of the photographing optical lens assembly is EPD, and the following condition is satisfied:

$0.30<ImgH/EPD<1.20$.

* * * * *

UNITED STATES PATENT AND TRADEMARK OFFICE
CERTIFICATE OF CORRECTION

| | | |
|---|---|---|
| PATENT NO. | : 12,372,756 B2 | Page 1 of 1 |
| APPLICATION NO. | : 18/414630 | |
| DATED | : July 29, 2025 | |
| INVENTOR(S) | : Cheng-Chen Lin, Hsin-Hsuan Huang and Shu-Yun Yang | |

It is certified that error appears in the above-identified patent and that said Letters Patent is hereby corrected as shown below:

In the Claims

Column 70, Line 9 Claim 1, please delete "$0<\Sigma/BL<0.40$", and substitute therefore:
--$0<\Sigma AT/BL<0.40$--.

Column 70, Line 35 Claim 4, please delete "$P5|<|P1|$", and substitute therefore: --$|P5|<|P1|$--.

Signed and Sealed this
Twentieth Day of January, 2026

John A. Squires
*Director of the United States Patent and Trademark Office*